(12) United States Patent
Morse et al.

(10) Patent No.: US 12,493,296 B2
(45) Date of Patent: Dec. 9, 2025

(54) MOBILITY PLATFORM FOR AUTONOMOUS NAVIGATION OF WORKSITES

(71) Applicant: Rugged Robotics Inc., Houston, TX (US)

(72) Inventors: Derrick Morse, Houston, TX (US); Logan Farrell, Houston, TX (US); Kevin Chen, Austin, TX (US); Dikshya Swain, Humble, TX (US)

(73) Assignee: Rugged Robotics Inc., Houston, TX (US)

( * ) Notice: Subject to any disclaimer, the term of this patent is extended or adjusted under 35 U.S.C. 154(b) by 286 days.

(21) Appl. No.: 18/452,159

(22) Filed: Aug. 18, 2023

(65) Prior Publication Data

US 2024/0069560 A1   Feb. 29, 2024

Related U.S. Application Data

(60) Provisional application No. 63/399,439, filed on Aug. 19, 2022.

(51) Int. Cl.
G05D 1/00 (2024.01)

(52) U.S. Cl.
CPC ......... *G05D 1/0236* (2013.01); *G05D 1/0094* (2013.01); *G05D 1/0248* (2013.01); *G05D 1/0272* (2013.01)

(58) Field of Classification Search
None
See application file for complete search history.

(56) References Cited

U.S. PATENT DOCUMENTS

| 5,453,931 A | 9/1995 | Watts, Jr. |
|---|---|---|
| 5,755,072 A | 5/1998 | Lingafelter |

(Continued)

FOREIGN PATENT DOCUMENTS

| CN | 104296733 A | 1/2015 |
|---|---|---|
| CN | 108700876 A | 10/2018 |

(Continued)

OTHER PUBLICATIONS

International Search Report and Written Opinion mailed Dec. 5, 2023 in connection with International Application No. PCT/US2023/030601.

(Continued)

*Primary Examiner* — Daniel L Greene
*Assistant Examiner* — Robert L Pinkerton
(74) *Attorney, Agent, or Firm* — Wolf, Greenfield & Sacks, P.C.

(57) ABSTRACT

A mobility platform is configured to execute one or more tasks in a worksite including a first passive landmark and a second passive landmark. The mobility platform may include a chassis, a drive system supporting the chassis, a first laser rangefinder disposed on the chassis at a first location, a second laser rangefinder disposed on the chassis at a second location, and at least one processor. The at least one processor may be configured to determine a position and orientation of the chassis based on a first distance measured by the first laser rangefinder between the first location and a first known landmark position, a second distance measured by the second laser rangefinder between the second location and a second known landmark position, and yaw angle information from at least one of the first and second laser rangefinders.

20 Claims, 20 Drawing Sheets

(56) References Cited

U.S. PATENT DOCUMENTS

| | | | |
|---|---|---|---|
| 6,064,940 A | 5/2000 | Rodgers et al. | |
| 6,330,503 B1 | 12/2001 | Sharp et al. | |
| 7,610,687 B2 | 11/2009 | Stegmaier | |
| 8,060,344 B2 | 11/2011 | Stathis | |
| 8,115,439 B2 | 2/2012 | Yourlo et al. | |
| 8,291,855 B2 | 10/2012 | Hoerl, Jr. et al. | |
| 9,747,698 B2 | 8/2017 | Stathis | |
| 9,858,712 B2 | 1/2018 | Stathis | |
| 11,090,672 B2 | 8/2021 | Schaumberger | |
| 11,706,507 B2 * | 7/2023 | Feng | H04N 23/62 348/207.1 |
| 2005/0055142 A1 | 3/2005 | McMurtry et al. | |
| 2007/0059098 A1 | 3/2007 | Mayfield et al. | |
| 2007/0100496 A1 | 5/2007 | Forell | |
| 2011/0039021 A1 | 2/2011 | Persson et al. | |
| 2011/0153338 A1 | 6/2011 | Anderson | |
| 2012/0028649 A1 | 2/2012 | Gupta et al. | |
| 2013/0310971 A1 | 11/2013 | Prouty | |
| 2014/0267703 A1 * | 9/2014 | Taylor | G05D 1/0274 348/139 |
| 2017/0278030 A1 | 9/2017 | Pettersson et al. | |
| 2018/0339409 A1 | 11/2018 | Williams et al. | |
| 2018/0339410 A1 | 11/2018 | Williams et al. | |
| 2018/0347982 A1 | 12/2018 | Nam et al. | |
| 2019/0235088 A1 | 8/2019 | Tanaka et al. | |
| 2020/0117201 A1 | 4/2020 | Oetken et al. | |
| 2020/0159227 A1 | 5/2020 | Cohen et al. | |
| 2020/0284887 A1 * | 9/2020 | Wachter | G01S 7/4815 |
| 2020/0356102 A1 | 11/2020 | Morse et al. | |
| 2021/0000006 A1 * | 1/2021 | Ellaboudy | A01B 69/001 |
| 2024/0157557 A1 * | 5/2024 | Christen | B25J 9/1612 |
| 2024/0418841 A1 * | 12/2024 | Dgani | G01S 7/4972 |

FOREIGN PATENT DOCUMENTS

| | | |
|---|---|---|
| CN | 108797669 A | 11/2018 |
| DE | 19755324 A1 | 6/1999 |
| JP | 2018-538647 A | 12/2018 |
| KR | 20100024572 A | 3/2010 |

OTHER PUBLICATIONS

Thrun et al., A Real-Time Algorithm for Mobile Robot Mapping With Applications to Multi- Robot and 3D Mapping. IEEE International Conference on Robotics. Apr. 2000. 8 pages.

* cited by examiner

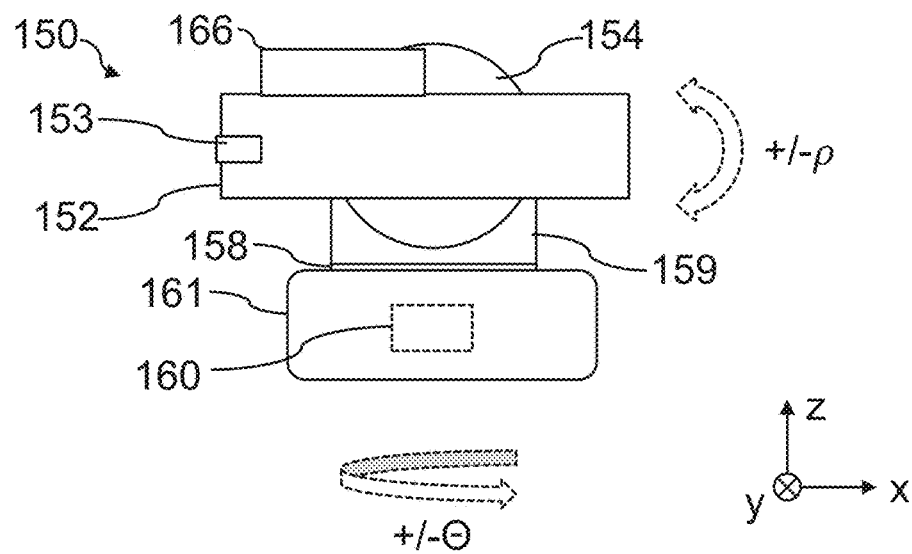
FIG. 7
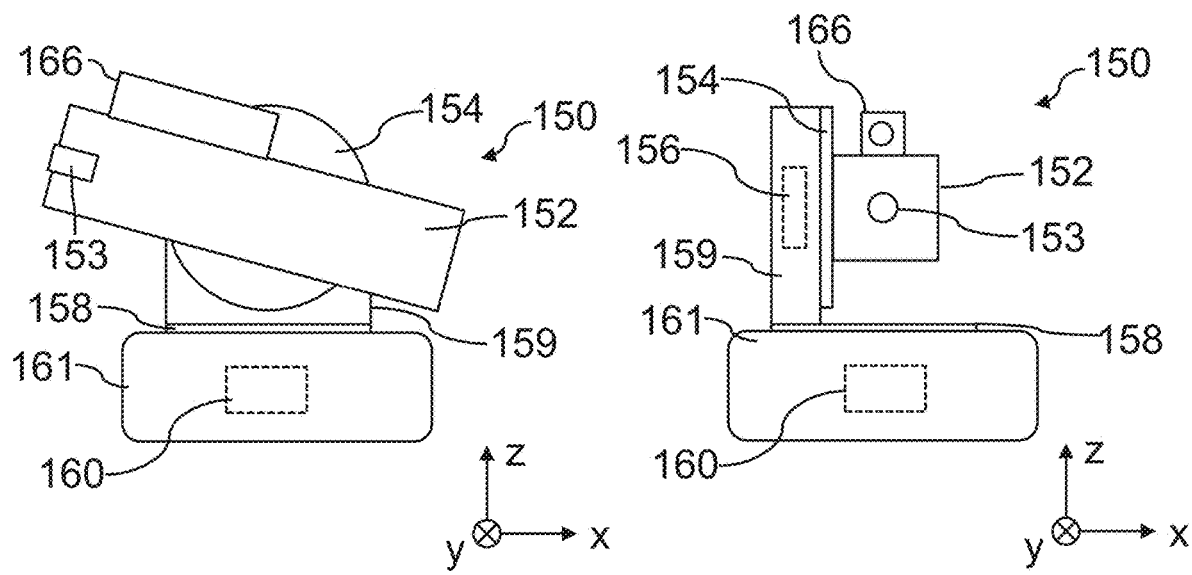
FIG. 8
FIG. 9

MOBILITY PLATFORM FOR AUTONOMOUS NAVIGATION OF WORKSITES

RELATED APPLICATIONS

This application claims priority under 35 U.S.C. § 119 to U.S. Provisional Application Ser. No. 63/399,439, filed Aug. 19, 2022, entitled "MOBILITY PLATFORM FOR AUTONOMOUS NAVIGATION OF WORKSITES" which is herein incorporated by reference in its entirety.

FIELD

Disclosed embodiments are related to mobility platforms configured to perform one or more tasks at a worksite and related methods of use.

BACKGROUND

Some attempts have been made to deploy autonomous or semi-autonomous systems service areas which may perform area coverage tasks. These conventional systems typically employ beaconed navigation systems which require the placement of powered navigational equipment external to the autonomous or semi-autonomous system in known locations in a worksite. Alternatively, come conventional systems require use of external position determination sensors, such as a global navigation satellite system (GNSS), for example, a global positioning system (GPS).

SUMMARY

In some aspects, the techniques described herein relate to a mobility platform configured to execute one or more tasks in a worksite including a first passive landmark disposed at a first known landmark position and a second passive landmark disposed at a second known landmark position, the mobility platform including: a chassis; a drive system supporting the chassis, where the drive system includes at least two wheels, where the drive system is configured to move the mobility platform within the worksite; a first laser rangefinder disposed on the chassis at a first location; a second laser rangefinder disposed on the chassis at a second location different than the first location; and at least one processor configured to: acquire the first passive landmark with the first laser rangefinder, acquire the second passive landmark with the second laser rangefinder, determine a first position of the chassis based on: a first distance measured by the first laser rangefinder between the first location and the first known landmark position, and a second distance measured by the second laser rangefinder between the second location and the second known landmark position, and determine a first orientation of the mobility platform based on first yaw angle information from at least one of the first laser rangefinder and the second laser rangefinder.

In some aspects, the techniques described herein relate to a method for operating a mobility platform in a worksite, the mobility platform including a chassis, a first laser rangefinder disposed at a first location on the chassis, a second laser rangefinder disposed at a second location on the chassis, and a drive system, the method including: acquiring a first passive landmark disposed at a first known landmark position with the first laser rangefinder; acquiring a second passive landmark disposed at a second known landmark position with the second laser rangefinder; determine a first position of the chassis based on: a first distance measured by the first laser rangefinder between the first location and the first known landmark position, and a second distance measured by the second laser rangefinder between the second location and the second known landmark position, and determine a first orientation of the mobility platform based on first yaw angle information from at least one of the first laser rangefinder and the second laser rangefinder.

In some aspects, a method of placing landmarks in a worksite, the method including: obtaining obstacle information within the worksite; with at least one processor: computing a drive path for a mobility platform through the worksite based on one or more tasks to be performed in the worksite at one or more task locations, computing a first landmark position for a first passive landmark within the worksite, computing a second landmark position for a second passive landmark within the worksite, computing a line of sight between the mobility platform and the first passive landmark at the first landmark position and the second passive landmark at the second landmark position for each location on the drive path, computing if there is a portion of the drive path where there is a line of sight to less than both of the first passive landmark and the second passive landmark, and upon determining there is a portion of the drive path where there is line of sight to less than both the first passive landmark and the second passive landmark, computing a third landmark position for a third passive landmark at the worksite. The method may also include signifying the first landmark position, second landmark position and third landmark position to a user.

In some aspects, the techniques described herein relate to a method for operating a mobility platform in a worksite, the mobility platform including a chassis, a first laser rangefinder disposed on the chassis, and a drive system including at least one wheel, the method including: acquiring a first passive landmark with the first laser rangefinder; move the mobility platform along a drive path with the drive system; change a first rangefinder pitch of the first laser rangefinder to maintain the first laser rangefinder at a first target elevation range on the first passive landmark as the mobility platform moves along the drive path; determine a chassis pitch of the mobility platform for each position of the mobility platform along the drive path based on the change in the first rangefinder pitch of the first laser rangefinder; and for each position of the mobility platform along the drive path, determine an elevation of the worksite at the at least one wheel based on the chassis pitch.

In some aspects, the techniques described herein relate to at least one non-transitory computer-readable medium including instructions thereon that, when executed by at least one processor, perform a method described according to exemplary embodiments herein.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 7 is a side schematic of an exemplary embodiment of a laser rangefinder of a mobility platform in a first position;

FIG. 8 is a side schematic of the laser rangefinder of FIG. 8 in a second orientation;

FIG. 9 is a side schematic of the laser rangefinder of FIG. 8 in a third orientation;

DETAILED DESCRIPTION

Figure 1:
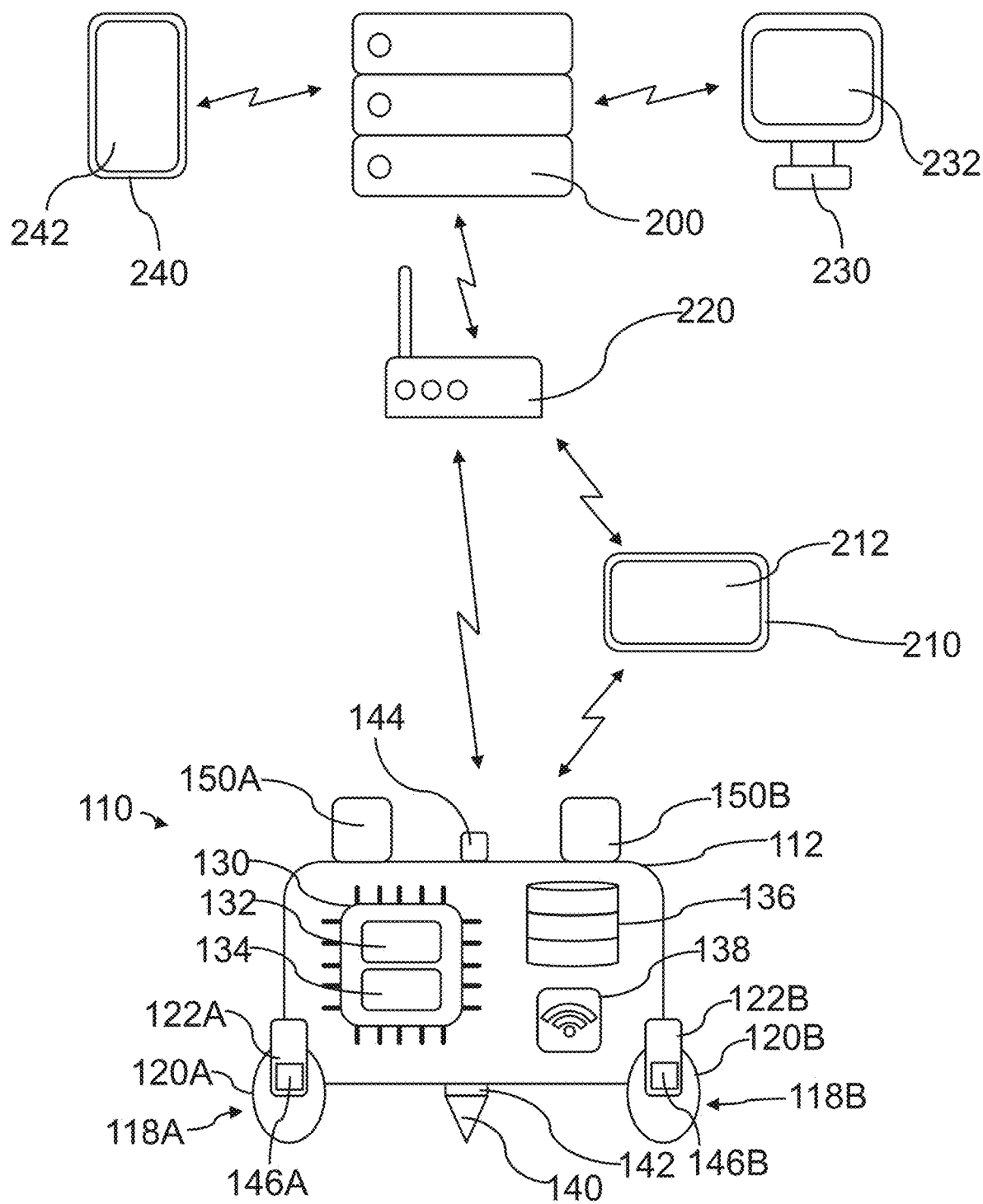
FIG. 1 is a schematic of an exemplary embodiment of a construction assistance system with a mobility platform for navigation in a worksite.

Construction productivity, measured in value created per hour worked, has steadily declined in the US. Low productivity, combined with a shortage of craft labor and higher labor costs, are major pain points for the construction industry. Some conventional efforts have been made to automate or semi-automate tasks in a worksite (e.g., a construction site, building, room, etc.), but these conventional systems require constant human supervision, are susceptible to navigation errors, and have limited mobility in tight spaces, all of which restrict the ability of such conventional system to perform useful tasks in a worksite. Additionally, many conventional systems require placement of active, powered equipment or beacons (e.g., RF emitting beacons) that aid in navigation in a worksite which complicates employing automated platforms rapidly and at scale. One such task that is time consuming and subject to inconsistencies is marking layouts on a worksite floor In view of the above, the inventors have recognized techniques for the design and operation of a mobility platform that can support a variety of tools and can navigate precisely and repeatedly in a workspace to enable automated tasks to be performed with the tool. A system using a mobility platform to autonomously position a tool within a construction worksite using one or more of the techniques described herein, may increase construction productivity by overcoming one or more of the disadvantages of prior efforts to automate construction tasks. In particular, the mobility platform may be configured to navigate through the use of passive landmarks that are identifiable by the mobility platform which may be simply placed in a workspace. Such passive landmarks may lack communication equipment, such that the landmarks are inexpensive and easy to place and configure for an end user. A mobility platform may navigate by monitoring its position relative to the placed passive landmarks, as discussed further herein. A mobility platform according to exemplary embodiments herein may include a marking device such that layouts may be marked on a worksite floor with high precision and accuracy.

According to one aspect, a mobility platform may employ multiple sensors which are used to determine comparable positioned within a worksite. The inventors have appreciated the benefits of a mobility platform employing laser rangefinders and odometry (e.g., from one or more odometry sensors) to determine a highly accurate and precise location of the mobility platform for performing one or more tasks in the worksite at one or more task locations. In some embodiments, the mobility platform may include a first laser rangefinder and a second laser rangefinder. The first laser rangefinder and the second laser rangefinder may be configured to collect distance information between each respective rangefinder and a passive landmark disposed in the workspace. In some embodiments, the distance information from the first laser rangefinder and the second laser rangefinder may be provided to at least one processor of the mobility platform (e.g., a controller). The first laser rangefinder may be disposed at a first location on a chassis of the mobility platform. The second laser rangefinder may be disposed at a second location on the chassis of the mobility platform, where the first location and second location are different from one another. The mobility platform may be configured to determine a first distance between a passive landmark and the first location based on the distance information from the first laser rangefinder and a second distance between a passive landmark and the second location based on the distance information from the second laser rangefinder. Using the first distance and the second distance, the mobility platform may determine an orientation of the chassis in the plane of the worksite. In some embodiments, the odometry may be used to determine an expected position of the first location and the second location, as well as an expected orientation of the chassis. The odometry may be based odometry information obtained from one or more odometry sensors, including, but not limited to, one or more wheel odometers and an inertial measurement unit.

The expected position and expected orientation may be employed to track one or more passive landmarks with the first laser rangefinder and the second laser rangefinder. The distance information from the first laser rangefinder and the second laser rangefinder may be employed to verify, correct, or calibrate the expected position and the expected orientation, as discussed further herein.

According to another aspect, a mobility platform may acquire a passive landmark with a laser rangefinder to obtain useful distance information from the laser rangefinder. In some embodiments, acquiring a passive landmark refers to a method of orienting a laser rangefinder toward a passive landmark such that an accurate distance measurement may be taken by the laser rangefinder relative to the passive landmark. In some embodiments, the laser rangefinder may emit an infrared and/or visual light toward a passive landmark (e.g., a laser). The light emitted toward the passive landmark may be reflected back to the laser rangefinder. The rangefinder may determine a distance to the passive landmark based on a travel time of the light emitted toward the passive landmark. Accordingly, the distance determination is based on the accurate targeting of the passive landmark such that the passive landmark reflects the light and not another object in the worksite. In some embodiments, the mobility platform may be configured to sweep a worksite with a laser rangefinder to collect sweep information. As used herein a "sweep" may be an angular movement of the laser rangefinder within a plane of the worksite across an angular range. In some embodiments, the angular range may be 45 degrees, 90 degrees, 180 degrees, 270 degrees, 360 degrees, or another appropriate angle. The sweep information may include a plurality of distances measured across the angular range. In some embodiments, the mobility system may acquire a passive landmark may detecting a shape of the landmark in the sweep information. For example, in some embodiments a passive landmark may be cylindrical, and the sweep information may include distance measurements that in series correspond to the shape of the cylindrical passive landmark. As another example, in some embodiments passive landmark may have the shape of a rectangular prism, which may be similarly detectable based on serial distance measurements within the sweep information. In other embodiments any shape for a passive landmark may be employed, as the present disclosure is not so limited. In some embodiments, detecting a passive landmark may include detecting a reflectivity of the passive landmark greater than a reflectivity threshold. For example, a passive landmark may be more reflective than a surrounding worksite for certain frequencies of light, such than an increase in signal intensity detected at a laser rangefinder may be indicative of the signal reflecting off the passive landmark. In some embodiments, detecting a passive landmark may include detecting a color of the passive landmark. For example, a passive landmark of a certain color may change a signal intensity of a reflected light signal, such than an increase or decrease in signal intensity detected at a laser rangefinder may be indicative of the signal reflecting off the passive landmark. Once a passive landmark is acquired, the mobility platform may determine a position of the passive landmark and/or a distance between the location of the laser rangefinder on the mobility platform and the location of the passive landmark in the worksite.

According to yet another aspect, a mobility platform according to exemplary embodiments herein may employ passive landmarks for position tracking, verification, and calibration within a worksite. In some embodiments, the placement of passive landmarks at known points within a worksite may be planned in advance of operation of the mobility platform. The mobility platform may be operated autonomously according to a drive path, which may include changes in position and/or orientation to enable the mobility platform to accomplish one or more tasks at one or more corresponding task locations within a worksite. As discussed further herein, the drive path may be based on task efficiency and/or several alternative factors, including, but not limited to, progressive completion of a task field (e.g., working across a worksite), consistent readability of markings (e.g., orienting text in the same direction), and reducing motion between tasks. In some embodiments, once a drive path is determined, a method of planning operation of the mobility platform may include determining landmark locations for a plurality of passive landmarks. In some embodiments, passive landmarks may be placed in a manner to maximize or otherwise increase line of sight between the passive landmarks and portions of the drive path. In this manner, fewer landmarks may be employed to provide complete navigational coverage for a particular drive path. In some embodiments, first and second passive landmarks may be placed at predetermined positions (e.g., a first landmark position and a second landmark position, respectively) in a worksite (e.g., at corners, adjacent a periphery of the worksite, etc.). The method may include determining a line of sight between the mobility platform and the first passive landmark at the first landmark position and the second passive landmark at the second landmark position for each projected location of the mobility platform on the drive path. If there is a portion of the drive path with line of sight to less than both the first landmark and the second landmark (e.g., one of the first landmark and second landmark, or neither the first landmark nor second landmark), a third landmark may be positioned in the worksite at a third landmark position. The third landmark position may be configured to have line of sight to the portion(s) of the drive path where there is not line of sight to both the first landmark and the second landmark. In some embodiments, this process may repeat to ensure enough passive landmarks are placed in the worksite to ensure line of sight to at least two passive landmarks for any position and/or orientation on the drive path.

According to yet another aspect, a mobility platform according to exemplary embodiments described herein may be employed to determine (and optionally map) an elevation of a worksite. In some embodiments, a laser rangefinder may be configured to change in pitch to maintain the laser rangefinder at a desired elevation range on an acquired passive landmark. As the mobility platform moves along a drive path, the change in pitch of the laser rangefinder may correspond to a change in chassis pitch of the mobility platform. Accordingly, in some embodiments a method may comprise determining a chassis pitch for each position of the mobility platform along a drive path. From the chassis pitch, an elevation of the worksite at a wheel of the mobility platform may be determined. In some embodiments where the mobility platform includes four wheels, four elevations corresponding to the positions of each of the four wheels may be determined. In some embodiments, a second laser rangefinder may be employed to determine a chassis roll for each position of the mobility platform along a drive path. In this manner, the elevation of each wheel of the mobility platform may be determined based on roll and pitch of the chassis at each position along a drive path. In some embodiments, the elevation information may be employed to generate a topographical map of the worksite.

According to yet another aspect, the mobility platform may include a holonomic drive system for a platform that navigates a worksite. The holonomic drive system may allow the mobility platform to move in three degrees of freedom (e.g., translation within a plane and rotation within the plane) so that a tool mounted on the mobility platform may reach the extremities of a worksite to perform one or more tasks. In some embodiments, the holonomic drive may allow the mobility platform to move omnidirectionally in the three degrees of freedom. In one embodiment, the holonomic drive system includes four wheels which are independently actuatable and independently swivel to allow the mobility platform to translate in a plane, rotate about a central axis, or a combination of the two (e.g., three degrees of freedom). In some embodiments, a drive system of a mobility platform may include four wheel assemblies, wherein each of the four wheel assemblies includes a wheel configured to rotate about a wheel axis, a first actuator (e.g., a first motor) configured to rotate the wheel about the wheel axis, and a second actuator (e.g., a second motor) configured to rotate the wheel about a pivot axis perpendicular to the wheel axis. The first actuator and second actuator may be independently controllable to allow the wheel assembly to move the mobility platform in any of the three degrees of freedom when correspondingly operated with other wheel assemblies. In other embodiments, more than four wheel assemblies or less than four wheel assemblies may be employed, as the present disclosure is not so limited. In some embodiments, each wheel of the mobility platform may include a wheel odometer configured to measure a distance traveled by the wheel. In some embodiments, the wheel odometer may be a rotary encoder. In another embodiments, the wheel odometry may be based on use of a stepper motor for driving the wheel, where the stepper motor rotational position and change in position are determinable. In some embodiments, a wheel assembly may also include a swivel sensor (e.g., rotary encoder, potentiometer, stepper motor, etc.) configured to provide information regarding the rotation of the wheel about the pivot axis. Combined, the swivel sensor and wheel odometer may provide information allowing the position and orientation of the wheel to be estimated as the mobility platform moves throughout a worksite. Correspondingly, a position and orientation of the mobility platform itself may be estimated based on information from the swivel sensor and the wheel odometer.

According to some embodiments, a construction assistance system may include a mobility platform and one or more communicating devices. For example, a construction assistance system may include a mobility platform, remote server, local device, and/or mobile device. The construction assistance system may include one or more processors that may generate task commands to control the mobility platform. These processors may be programmed to implement a design file processing tool, which generates relevant navigational information for the mobility platform from a standardized computer-aided design (CAD) file of the worksite used in the construction industry, including, but not limited to, .csv, .dwg, .dxf, .dwg, .rvt, .nwd, and .ifc. The design file may be processed for existing or anticipated features in a worksite, such as survey control points, survey control lines, structural elements, or other structural features, which may be identified as one or more features or obstacles to be used during drive path generation and passive landmark placement. For example, in some cases, "obstacles" may relate to structural elements of a building (e.g., load bearing wall, column, stairwell, elevator shaft, etc.) that interferes with the motion of the mobility platform and/or the line of sight between the mobility platform and one or more passive landmarks placed in the worksite. A control point or control line may be a point marked in a worksite (e.g., on a floor of a worksite) and used conventionally by surveyors as a known point for relative measurements between other items to be placed or constructed in the worksite. In some embodiments, passive landmarks may be configured to be placed on control points or control lines. The design file processing tool may be implemented on a mobility platform or on a remote server in communication with the mobility platform, or both. In some embodiments, the server may be accessible to a user via the internet or other network who may upload a CAD file and provide other inputs relating to tasks to be performed autonomously.

According to some embodiments, a construction assistance system may include a human operated workstation located at a worksite to improve path optimization, calibrate a navigation controller, verify placement of passive landmarks, verify, add, or remove obstacles, change a drive path according to changes in a worksite, and/or allow for manual control in some cases. The workstation may communicate with a mobility platform and/or a remote server. When a drive path is generated by the remote server and/or mobility platform, the drive path may be sent to a graphical user interface at the workstation for inspection by a human user. The user may reject the drive path, causing it to be recomputed by the mobility platform and/or remote server, modify the drive path manually, or accept the path. Upon initial or final acceptance of the drive path, the mobility platform may autonomously navigate along the drive path and perform its assigned one or more tasks at one or more task locations within the worksite. Such an arrangement may allow a human user to check the drive path of a mobility platform before movement or any task completion, as well as fine tune the path for variable conditions in a worksite.

As used herein, a "passive landmark" refers to a landmark lacking equipment that provides navigational signals to a mobility platform. In some embodiments a "passive landmark" may reflect a signal (e.g., visual and/or infrared light such as a laser) originating from onboard the mobility platform. In some embodiments, a passive landmark may be completely unpowered, such that the passive landmark is a physical object with no power source. In some embodiments, a passive landmark may include an illumination source (e.g., one or more lights). The illumination source may be configured to illuminate the landmark to improve reliability of identification by a mobility platform (e.g., by providing a consistently colored landmark for visual processing). In some embodiments, light from the illumination source may be received by the mobility platform for tracking the passive landmark or otherwise identify the passive landmark compared with other objects within a worksite. However, light from an illumination source of the passive landmark may not be a navigational signal employed for the determination of position of the mobility platform relative to the passive landmark. In this manner, a passive landmark may remain relatively simple and inexpensive compared to complex RF beacons or surveying equipment employed in conventional systems, as the navigational hardware may reside solely on the mobility platform, and navigational signals sensed by the mobility platform may originate on the mobility platform.

The mobility platform of exemplary embodiments described herein may be capable of performing various tasks and services through the transportation, positioning, and operation of automated tools, without human users. Tasks which may be performed include translating digital designs into real-world layouts (e.g., accurately marking the location of specific architectural/engineering features on the job site), material handling (transporting materials and equipment to the appropriate locations), performing portions of installation work (e.g., marking mounting locations, drilling holes, installing hangers, fabricating materials, preparing equipment, etc.), and/or installing various building systems (e.g., wall systems, mechanical systems, electrical systems, plumbing systems, sprinkler systems, telephone/data systems, etc.). A mobility platform may be fitted with one or more tools, including, but not limited to: marking devices (e.g., printers, brushes, markers, etc.), material handling and manipulation systems (arms, grapples, grippers, etc.), rotary tools (e.g., drills, impact wrenches, saws, grinders, etc.), reciprocating tools (e.g., saws, files, etc.), orbital tools (e.g., sanders, cutters, etc.), impact tools (e.g., hammers, chipping tools, nailers, etc.), and other power tools, including the equipment required to support them (e.g., compressors, pumps, solenoids, actuators, presses, etc.).

The embodiments below will describe various systems (e.g., mobility platforms) and portions of systems in terms of their state in three-dimensional space. As used herein, the term "position" refers to the location of an object or a portion of an object in a three-dimensional space (e.g., three degrees of translational freedom along Cartesian x-, y-, and z-coordinates). As used herein, the term "orientation" refers to the rotational placement of an object or a portion of an object (three degrees of rotational freedom—e.g., roll, pitch, and yaw).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic of one embodiment of a construction assistance system including a mobility platform 110 for navigation in a worksite. As shown in FIG. 1, the system may include one or more computer processors that interpret various types of data. Those computer processors may be programmed to implement functions such as extracting information about a worksite from a design file, receiving input specifying one or more tasks to be performed at one or more task locations, determining or executing a path for the mobility platform to traverse to perform tasks, determining landmark locations for one or more landmarks, and generating commands to the mobility platform to perform the tasks to be performed. Those processors may be in the same location or distributed across multiple locations. In some embodiments, some processors may be on the mobility platform 110 and others may be in one or more remote devices that may be connected to the internet or other wired and/or wireless communication network.

As shown in FIG. 1, the mobility platform may navigate and operate autonomously or semi-autonomously and may communicate with one or more remote or local devices. In the embodiment of FIG. 1, the mobility platform includes a variety of controllers and sensors mounted on a chassis 112 which enable high precision navigation in a worksite based on passive landmarks placed in the worksite. In some embodiments as shown in FIG. 1, the mobility platform 110 of FIG. 1 includes a controller 130 having a motion control unit 132 and a tool control unit 134.

Figure 2:
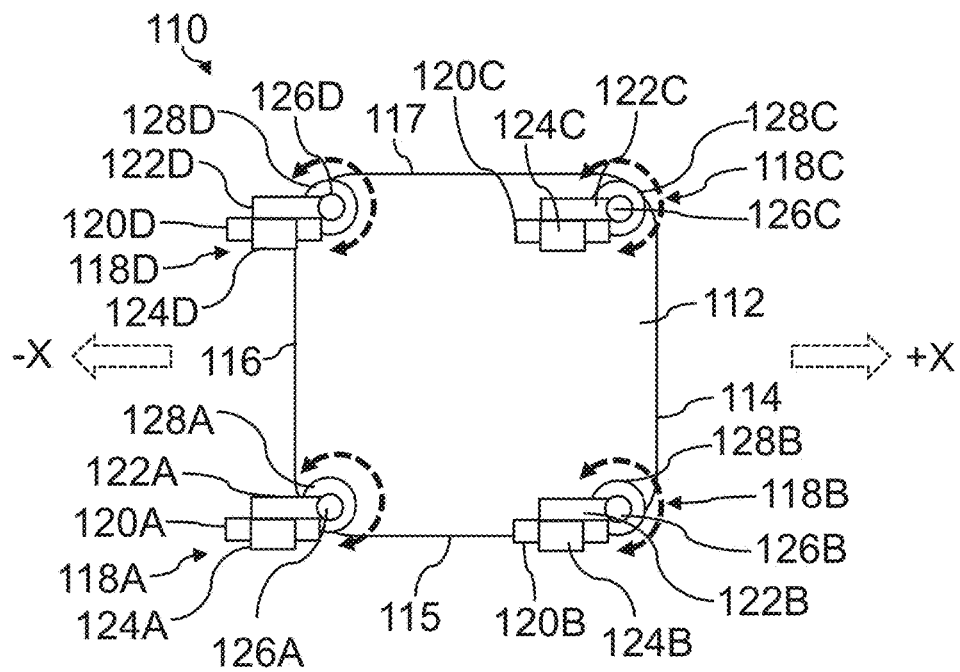
FIG. 2 is a top schematic view of an exemplary embodiment of a mobility platform chassis in a first state.
Figure 3:
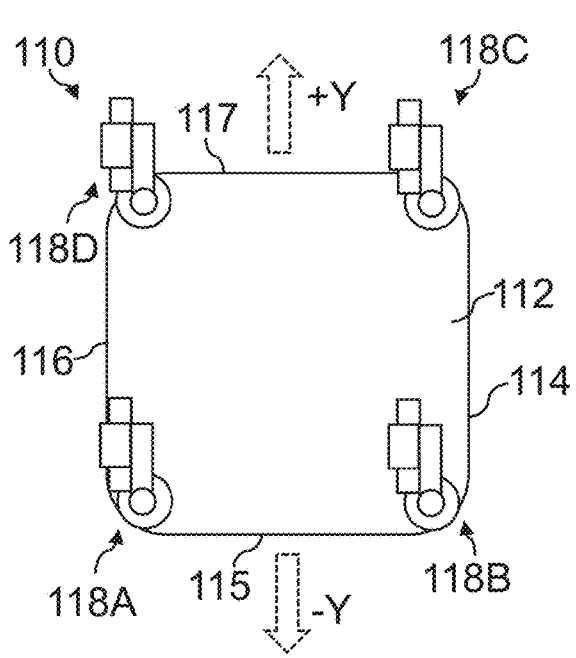
FIG. 3 is a top schematic view of the mobility platform of FIG. 2 in a second state.
Figure 4:
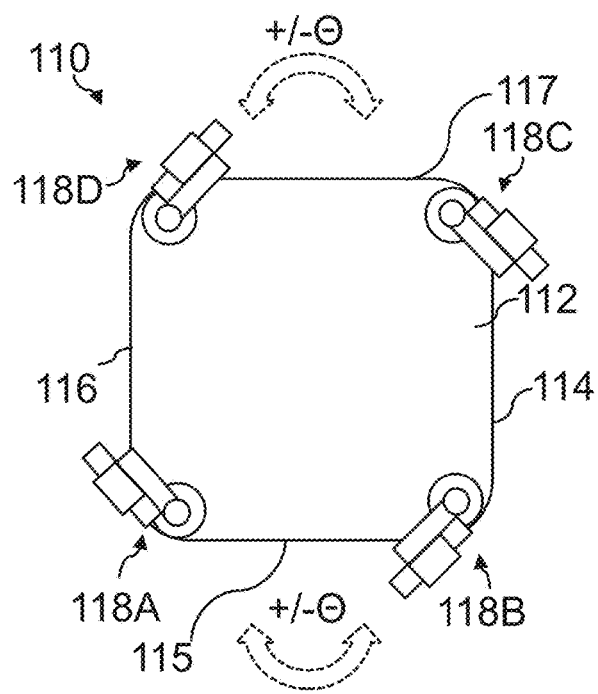
FIG. 4 is a top schematic view of the mobility platform of FIG. 2 in a third state.

The motion control unit 132 is configured to control a drive system including at least a first wheel 120A driven by a first actuator and a second wheel 120B driven by a second actuator (for example, see FIGS. 2-4). In some embodiments, the drive system is a holonomic drive system, which in the illustrated embodiment, allows the mobility platform to move omnidirectionally in three degrees of freedom, as will be discussed further with reference to FIGS. 2-4.

The tool control unit 134 is configured to control the activation and/or motion of one or more tools mounted on the mobility platform 110. The tool control unit may issue one or more commands to an associated tool to perform one or more tasks. In the configuration shown in FIG. 1, the mobility platform includes a marking device 140 mounted on a carriage 142 which allows the marker to reach the extremities of the chassis 112 of the mobility platform. The tool control unit is configured to control the movement of the marking device on the carriage and deposit inks, powders, or other effective marking materials to layout a worksite according to a design file. The marking device may make marks on features in the worksite, such as walls and floors, pillars, ceilings etc. in response to commands from the tool control unit. The carriage may position the marking device in an appropriate task location in response to commands from the tool control unit. Other commands from the tool control unit may control parameters of marking such as line thickness, color, material, etc. In some embodiment, the carriage may move the marking device to allow the marking device to reach desired positioned relative to the chassis 112. In some embodiments, the carriage may be stationary and may not move the marking device. In some embodiments, the marking device 140 may be a printer configured to make multiple markings at once. An exemplary marking device 140 is discussed further with reference to FIG. 6.

As shown in FIG. 1, the mobility platform 110 includes a plurality of sensors configured to acquire and/or output information regarding the surroundings of the mobility platform so that the mobility platform may navigate autonomously using passive landmarks placed or otherwise pre-existing in a worksite. According to the depicted embodiment, the mobility platform includes a first wheel odometer 146A, a second wheel odometer 146B, a first laser rangefinder 150A, and a second laser rangefinder 150B. As will be discussed further below, the information acquired and/or output by each of the sensors may be fused by the controller 130 as the mobility platform navigates through a worksite. In some embodiments, information from the first wheel odometer 146A and the second wheel odometer 146B may be used for real-time navigation within a worksite, including determinations of an estimated position and orientation of the mobility platform. In some embodiments, information from the first laser rangefinder 150A and the second laser rangefinder 150B may be used to verify a position and orientation of the mobility platform within the worksite. In some embodiments, the information from the first laser rangefinder 150A and the second laser rangefinder 150B may be employed to reset error in the estimated position or orientation and may be employed to calibrate the estimations of position and orientation based on information from the first wheel odometer 146A and the second wheel odometer 146B. In some embodiments, an independent local position and orientation may be determined through integration of the information from the first and second wheel odometers 146A, 146B, while global positions are generated through passive landmark measurement via the first and second laser rangefinders 150A, 150B. In some embodiments, an independent local position may be based on odometry information including measurements from sensors other than wheel odometers, such as measurements an inertial measurement unit. Comparison of the independently generated local position and global position may allow the mobility platform to self-test positional accuracy and recalibrate one or more parameters used in local position determination as the mobility platform navigates the worksite. Any suitable number or type of sensors may be employed, and their data fused, combined, or compared to improve the accuracy and/or precision of autonomous navigation in a worksite, as the present disclosure is not so limited. For example, an inertial measurement unit 144 may be employed in addition to or instead of the wheel odometers. In such embodiment, acceleration information may be integrated over time to determine changes in position and/or orientation of the mobility platform. Such a computation may be prone to error such as drift, which may be corrected by the information from the first and second laser rangefinders 150A, 150B.

While a specific combination of odometry sensors is shown and described with reference to the embodiment of FIG. 1 (e.g., wheel odometers and an inertial measurement unit), in some embodiments other odometry sensors may be employed alone or in combination. Odometry sensors employed to obtain odometry information used in determining an estimated position and/or orientation according to methods herein may include, but are not limited to, one or more wheel odometers (e.g., rotary encoders, stepper motors, potentiometers, etc.), inertial measurement units, accelerometers, and optical flow sensors. In some embodiments, a single odometer sensor or sensor type may be employed. For example, in some embodiments, odometry information may be sourced solely from one or more wheel odometers. As another example, in some embodiments, odometry information may be sourced solely from an inertial measurement unit. In other embodiments, multiple odometry sensors of different types may be employed and fused to provide odometry information.

In the embodiment shown in FIG. 1, the mobility platform 110 also includes additional external devices that cooperate with the controller 130 to allow the mobility platform to navigate and perform tasks autonomously in a worksite. For example, the mobility platform includes a storage device 136 such as a hard drive, solid state drive, or other memory for storing instructions or other data, as well as a wireless communicator 138 which communicates to various local or remote devices wirelessly through any appropriate communication protocol (e.g., satellite, cellular, Wi-Fi, 802.15.4, etc.). While the mobility platform of FIG. 1 communicates wirelessly, any suitable wired communication interface may also be employed, such as a wired serial port, Ethernet port, etc. The combination of the storage device and the wireless communicator enables the mobility platform to send, receive, and store data from one or more external devices, such as a remote server 200 (i.e., cloud server), remote computer 230, mobile device 240, or local workstation 210 (e.g., a portable or handheld device such as a laptop, tablet, or mobile phone, a desktop computer, or any other appropriate device which is within wireless or wired range of the mobility platform and/or network access point so that the workstation can communicate with or control the mobility platform from the worksite). Such an arrangement may allow a file served from a remote server to be analyzed by one or more of the remote server, remote computer, mobile device, or local workstation to generate paths, tasks, task locations, landmark locations and other relevant information that the mobility platform 110 may use to perform tasks autonomously or semi-autonomously in a worksite.

As noted above, the mobility platform 110 of FIG. 1 is configured to communicate with a plurality of external devices to simplify navigating autonomously and performing one or more tasks. The external devices that communicate directly or indirectly with the mobility platform include a remote server 200, workstation 210, router 220, remote computer 230, and mobile device 240. In some embodiments, the remote server, which may be located in a data center as part of a cloud computing service, is employed to manage the files used by the mobility platform to navigate and perform tasks. That is, the remote server may coordinate file management, path generation, path correction, task planning, and any other desirable functions. In some embodiments, path correction may be coordinated onboard the mobility platform 110. The remote server allows designers, such as contractors, consultants, engineers and architects, to provide design files and task information which may be employed by the mobility platform. In some embodiments, the remote server may automatically generate drive paths for performing tasks at a variety of locations in a worksite by extracting information from a design file such as a 2D or 3D drawing or CAD file. Engineers, architects, or other remote workers may interface with the remote server from industry-standard file management platforms, or via web interface where files are uploaded, either of which may be on the mobile device 240 or remote computer 230. A mobile device graphical user interface 242 or a remote computer graphical user interface 232 may be used to transmit or download files from the remote server and modify files using CAD or Building Information Management (BIM) software platforms. The file management system employed on the remote server may include a database for storage of drawings, plans, and relevant data, and may also be fitted to provide users with modification history of files in store. The remote server also enables contractors, tradesmen, or other workers locally available at the worksite to provide feedback to paths, task locations, landmark locations, or control parameters. In particular, the remote server may communicate with the workstation 210 having a graphical user interface 212. The graphical user interface 212 may allow a user to confirm, modify, or deny navigation and task plans generated by the remote server onsite before the mobility platform begins operating autonomously. In some cases, the workstation may also be used to manually override or manually control the mobility platform. According to the embodiment of FIG. 1, the router 220 may be configured as a modem, satellite, cellular tower, or other suitable interface suitable to coordinate data transmissions between the remote server, mobility platform, and/or workstation.

It should be noted that while a remote server 200 is shown and described with reference to FIG. 1, any appropriate server or processor may be used, including servers and processors located locally (e.g., onboard the mobility platform) or in close proximity to a worksite, as the present disclosure is not so limited.

FIG. 2 is a top schematic view of one embodiment of a mobility platform 110 including a holonomic drive system enabling the mobility platform to move in three degrees of freedom and reach the extremities of a worksite. The holonomic drive system allows the mobility platform to position a tool mounted on the mobility platform in a region flush with an extremity of a worksite, such as a corner or adjacent an obstacle, which may otherwise necessitate multiple movements to reach or be inaccessible. The holonomic drive system allows the mobility platform 110 to translate in any direction in a plane, as well as rotate within that plane to change a position and/or orientation of the mobility platform. The drive system of the mobility platform 110 includes a four wheel assemblies 118A, 118B, 118C, 118D coupled to a chassis 112 of the mobility platform. Each of the wheel assemblies includes a respective wheel 120A, 120B, 120C, 120D coupled to a respective support 122A, 122B, 122C, 122D. The wheels 120A, 120B, 120C, 120D are each coupled to a first actuator 124A, 124B, 124C, 124D that is configured to rotate the wheel about a wheel axis to move the mobility platform 110. According to the embodiment of FIG. 2, each the wheel assemblies 118A, 118B, 118C, 118D includes a respective swivel axle 126A, 126B, 126C, 126D. Each of the four wheels rotates about a respective swivel axle independently, which allows the wheels to be angled at any angle (e.g., 0 to 360 degrees) relative to a chassis 112 of the mobility platform. The wheel assemblies also each include an axis actuator 128A, 128B, 128C, 128D configured to rotate a respective wheel about a respective swivel axle. In some embodiments, an axis actuator may be a servomotor. The axis actuators allow the wheel axis of each of the wheels to be adjusted (e.g., swiveled) independently, so that the mobility platform may move freely in three degrees of freedom. This arrangement provides complete motion flexibility in 2D plane environments (e.g., along a planar floor of a worksite) and enables execution of complex motion patterns for the accomplishment of certain tasks. As discussed further below, one such benefit is the ability to mark continuous curves on a worksite floor. While independently rotatable wheels are shown in FIG. 2, any suitable holonomic drive system may be employed such as omnidirectional wheels in other embodiments. In other embodiment, a drive system that is not holonomic may be employed, as the present disclosure is not so limited.

According to the embodiment of FIG. 2, the mobility platform 110 includes a chassis 112 for mounting a variety of tools or payloads. The chassis 112 is coupled to the wheel assemblies 118A, 118B, 118C, 118D, which support and move the chassis. The chassis may have a plurality of hard mounting points which allow tools or payloads to be mounted modularly to the mobility platform. An exemplary chassis is shown and described further with reference to FIGS. 5-6.

FIG. 2 is a top schematic view of the mobility platform 110 in a first state, FIG. 3 is a top schematic view of the mobility platform in a second state, and FIG. 4 is a top schematic view of the mobility platform in a third state which shows the degrees of freedom provided by the holonomic drive system including the wheel assemblies 118A, 118B, 118C, 118D. As shown in FIG. 2, the four wheels 120A, 120B, 120C, 120D have parallel wheel axes. Accordingly, the mobility platform may move in the +X or −X direction as shown in FIG. 2 by rotating the four wheels with the actuators 124A, 124B, 124C, 124D.

As shown in FIG. 3, the wheels have been rotated to facilitate movement of the mobility platform along the +Y or −Y direction. That is, each of the axes of rotation of the wheels has been moved by the respective axis actuator, so that the wheel axes are parallel to one another and are rotated approximately 90 degrees relative to the state shown in FIG. 2. Accordingly, the mobility platform may move in the +Y or −Y direction as shown in FIG. 3 by rotating the four wheels with the actuators 124A, 124B, 124C, 124D. To reach the state shown in FIG. 3, a drive path may include commands that specify which wheel axis to rotate and the magnitude of the desired rotation. Alternatively, controller of the mobility platform (e.g., a motion control unit) may generate corresponding commands to each of the wheel actuators and axis actuators to control the mobility platform to that location. In some embodiments, a server, motion control unit, or any other suitable processor or controller may use any suitable task command to control the motion of the mobility platform, including combinations of the task commands described above, as the present disclosure is not so limited. Accordingly, the mobility platform may move easily along either the +/−X direction or the +/−Y direction.

As shown in FIG. 4, the holonomic drive system is in the third state, where the wheel axes of rotation for the first wheel 120A and the third wheel 120C are aligned, and the wheel axes of rotation for the second wheel 120B and the fourth wheel 120D are aligned and perpendicular to the axes of the first and third wheels. In the configuration shown in FIG. 2, the mobility platform is capable of moving in three degrees of freedom by varying direction of rotation of the wheels about their various axes of rotation. Additionally, the state shown in FIG. 4 allows the wheels to be driven to rotate the mobility platform in a plane in the +θ or −θ direction. Accordingly, the holonomic drive system is capable of moving the mobility platform along a first axis (+/−X), a second axis perpendicular to the first axis (+/−Y), and also change the orientation of the mobility platform about a third axis (+/−θ). The axes of the wheels may be adjusted without moving the mobility platform itself from an initial position, allowing the mobility platform to be moved in any of the three degrees of freedom from an initial position. For example, one or more axis actuators may adjust the axes of the wheels upon command from a motion control unit. Additionally, an orientation of the mobility platform may be changed without changing a position of the mobility platform, where the position of the mobility platform is represented as an average position (e.g., a geographic center, center of mass) or other point position.

According to the embodiment of FIGS. 2-4, the holonomic drive system may enable the mobility platform to move in any of the three degrees of freedom described above concurrently. For example, the drive system may allow the mobility platform to move in the +X direction and +θ direction at the same time. Any combination of movement in any of the three degrees of freedom may be provided by the holonomic drive system of FIGS. 2-4, as the present disclosure is not so limited.

Figure 5:
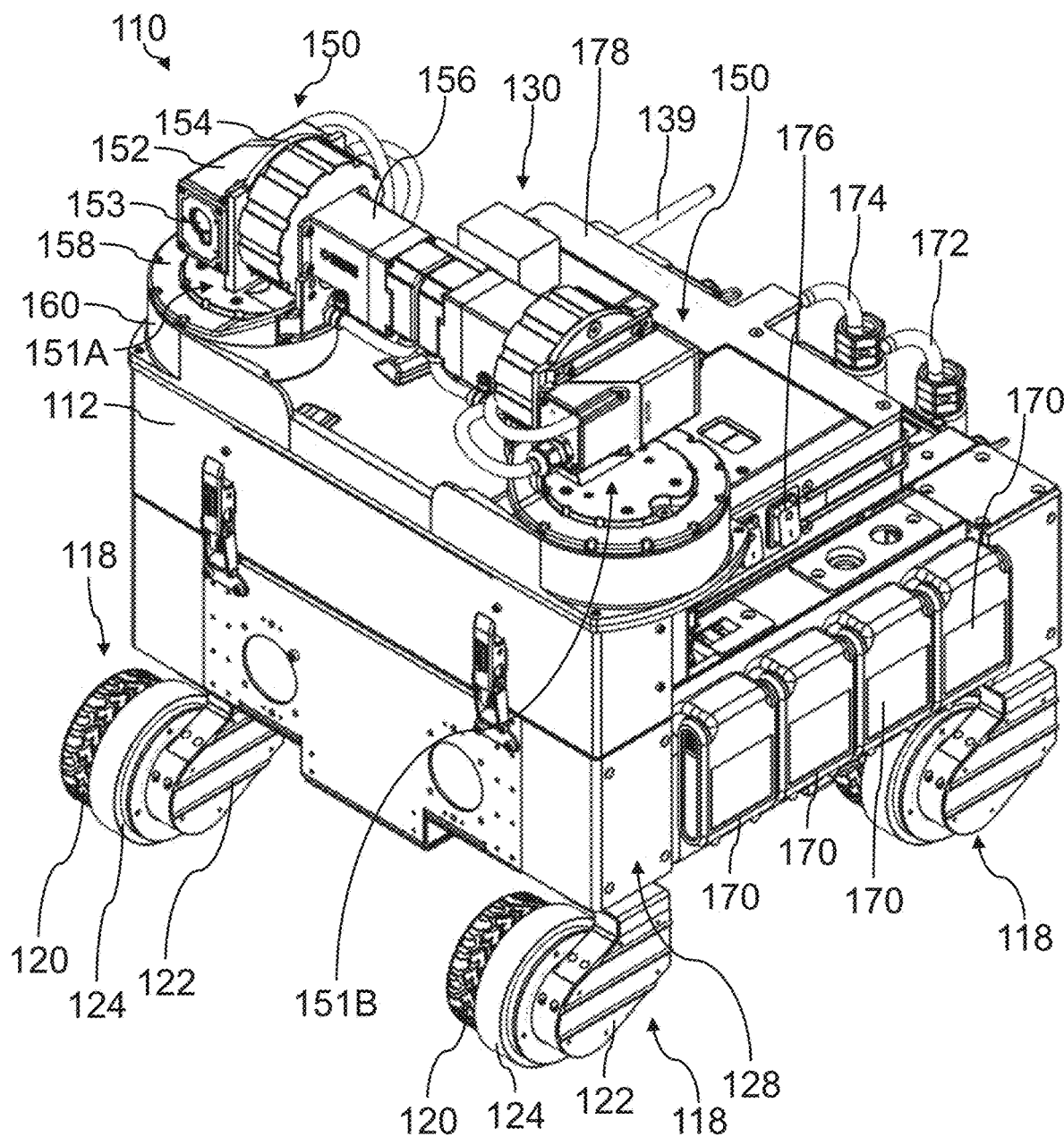
FIG. 5 is a perspective view of an exemplary embodiment of a mobility platform.
Figure 6:
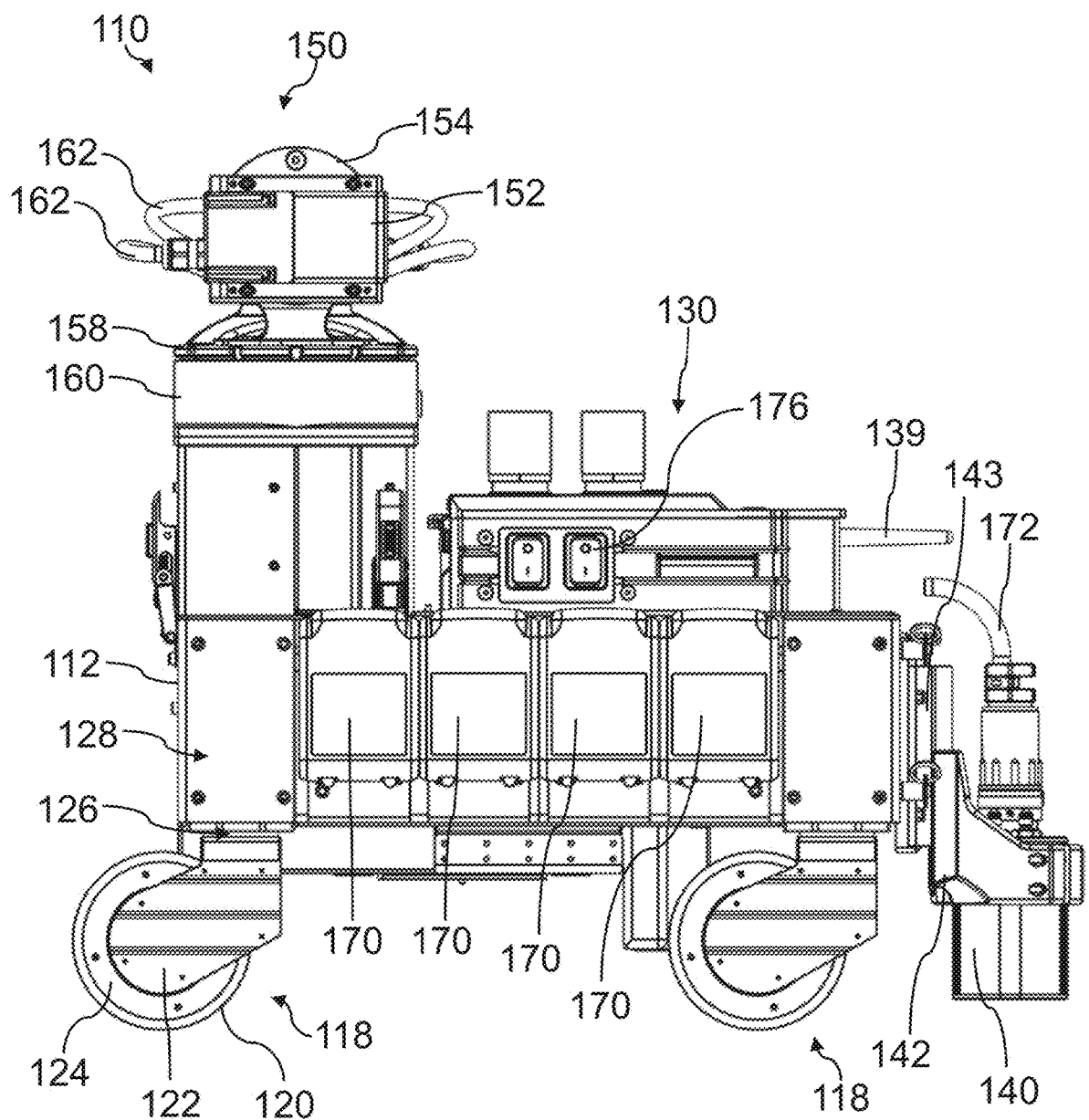
FIG. 6 is a side view of the mobility platform of FIG. 5.

FIG. 5 is a perspective view and FIG. 6 is a side view of an exemplary embodiment of a mobility platform 110. As shown in FIGS. 5-6, the mobility platform 110 includes a chassis 112. The chassis 112 is supported by a drive system including a plurality of wheel assemblies 118A, 118B, 118C, 118D. The wheel assemblies each include a wheel 120, a support 122, a wheel actuator 124, a swivel axle 126, and a swivel actuator 128. The drive system of FIGS. 5-6 is holonomic, such that the chassis 112 is moveable in any direction within a plane, as discussed above with reference to FIGS. 2-4. The wheel assemblies may each include a wheel odometer configured to measure a distance traveled by the wheels.

As shown in FIGS. 5-6, the mobility platform 110 includes a controller 130 that is mounted to the chassis 112 in a controller housing 178. The controller 130 may include one or more processors configured to execute computer-readable instructions to perform exemplary methods described herein. The controller 130 may include an antenna 139, which may be used by a wireless communicator 138 to allow the controller to communicate wirelessly with other external devices. In some embodiments, a laser rangefinder 150 may include one or more processors. In some embodiments, methods described herein or portions of methods described herein may be performed in firmware on a laser rangefinder 150.

The mobility platform 110 of FIGS. 5-6 also include a power source. The power source of FIGS. 5-6 comprises a plurality of batteries 170. The batteries 170 may be modular, such that one or more batteries may be selectively coupled to the chassis 112 for providing power to the various components of the mobility platform 110. In the embodiment of FIGS. 5-6, the chassis 112 may be configured to accommodate up to eight batteries. In other embodiments, non-modular batteries may be employed, as the present disclosure is not so limited. In some embodiments, a wired power source may be employed, as the present disclosure is not so limited. As shown in FIGS. 5-6, in some embodiments a mobility platform may include one or more switches 176 that may be used by a user to selectively power the mobility platform.

As shown in FIGS. 5-6, the mobility platform 110 includes a marking device 140. The marking device 140 is disposed on a rear of the chassis 112. The marking device is mounted to a rail 143 of the chassis by a carriage 142. In the embodiment of FIGS. 5-6, the marking device 140 does not move, and the carriage forms a stationary connection between the marking device 140 and the chassis 112 once set. In some embodiments, the carriage is configured to move up and down along the rail 143 to allow the height of the marking device 140 to be adjusted by a user. As shown in FIGS. 5-6, a first marking device cable 172 and a second marking device cable 174 may be used to connect the marking device to the controller 130 and/or batteries 170 (or another power source). In some embodiments, the first marking device cable 172 may be used for power only. In some embodiments, the second marking device cable 174 may be used for data transmission only.

In some embodiments, the marking device 140 includes at least one reservoir, at least one air compressor or pump, an electronic control system (ECS), and at least one print head, all appropriately interconnected with tubes, hoses, pipe, values, connectors, wiring, switches, etc. The reservoir(s) may hold sufficient volumes of marking fluid for the printing tool kit to operate for a desired working period. The reservoir(s) may connect to the remainder of the print system, both upstream and downstream, in a way that delivers the marking fluid to the next component required to control and execute the desired mark. In some embodiments, the reservoir(s) holds a marking fluid, such as a pigmented ink, in tanks that can be opened to the atmosphere and filled by hand from bulk containers of marking fluid, but if desired, upon closure the reservoirs are capable of being pressurized. In some embodiments, the top of the reservoir(s) may be connected to the air compressor or air pump with tube, hose or pipe, allowing the air compressor or air pump to pressurize the head space at the top of the reservoir, above the marking fluid, and therefore positively pressurize the marking fluid and feeding it through an ink feed tube, hose, or pipe that connects the bottom of the reservoir to one or more of the print heads. In some embodiments, a reservoir may remain open to the atmosphere, with the bottom tube, hose, or pipe connected to a pump that is capable of drawing fluid from the reservoir and feeding it downstream through the ink feed tube, hose, or pipe to the print head.

In some embodiments, each of the print heads of the marking device 140 is configured to deposit the marking fluid onto the printing surface. In some embodiments, the print head may be formed of an ink feed tube connection to the reservoir or pump, a manifold distributing the marking fluid to key components within the print head, and at least one Piezo-electric pump that, when operated, displaces small increments of the marking fluid into droplet form. The Piezo-electric pump may utilize a disc(s) that is naturally flat, but upon activation, deforms into one of two positions, the draw position or the push position. In the draw position, the positive pressure of the fluid in the ink feed tube and manifold encourages the marking fluid into the Piezo-electric chamber. In the push position, a droplet is forced out of the piezo-electric chamber and deposited onto the floor surface. In some embodiments, an array of Piezo-Electric pumps is used, allowing droplets to be simultaneously deposited in a column, a row, a matrix, a diagonal line, or any combination thereof. Such an array allows the marking of complex shapes and patterns, including text.

In some embodiments, the marking device 140 may also include an electronic control system having a processor configured to execute computer readable instructions stored in memory. The electronic control system may be configured to command the plurality of prints heads and at least one pump to deposit droplets of marking fluid in column, a row, a matrix, a horizontal line, a vertical line, a diagonal line, or any combination thereof. The electronic control system may also communicate with the controller 130 of the mobility platform 110 (e.g., the tool control unit 134) to receive position and velocity information to coordinate the deposits of marking fluid. In some embodiments, the mobility platform and print system may allow the marking of text, or other complex shapes or patterns. In some embodiments, marking fluid is deposited as the mobility platform is in motion. The electronic control system may interface with the task control unit of the mobility platform to receive triggers that activate specific actions required for placing accurate markings on the floor. Additionally, the marking device may provide feedback to the mobility platform through the same interface to provide real-time information about printer performance and status. In this manner, the marking device may be a self-contained system that automates the process of releasing a marking fluid based on some external input related to mobility platform timing, location, or other signal.

According to the embodiment of FIG. 1, the printing capability provided by the marking device 140, and specifically the ability to print text, allows the marking device 140 to deliver unique digitally replicated information on the unfinished floor of a worksite. When deployed on a mobility platform 110 of exemplary embodiments described herein, the marking device can mark the intended location of various building systems, components, and equipment, which allows contractors to accurately install their respective materials. While installation locations are currently marked by hand with points and lines, the marking device may have complex marking capabilities, including an ability to print text, which may be used to differentiate between trades, communicate non-intuitive installation instructions (e.g., denote material sizes, identify specific parts or equipment, detail configuration or orientation, and specify installation heights above the floor), and identify prefabricated part numbers. The ability to communicate prefabricated part numbers may be desirable as prefabricated construction techniques become more widespread. Accordingly, the marking device of FIG. 1 in concert with mobility platforms of exemplary embodiments described herein provides the capability of communicating the exact installation location, the exact part number, and the exact installation orientation and configuration, allowing contractors to quickly and correctly install a component where it was intended.

According to the embodiment of FIGS. 5-6, the mobility platform 110 includes two laser rangefinders 150. A first laser rangefinder is disposed at a first location 151A on the chassis. A second laser rangefinder is disposed at a second location 151B on the chassis, which is spaced from the first location. The laser rangefinders are configured to measure a distance from the first location 151A and the second location 151B to a passive landmark disposed in a worksite. As discussed further herein, the use of two laser rangefinders at distinct locations on the chassis allows the orientation of the chassis to be determined based on the distance and yaw angle measurements provided by the laser rangefinders. In the depicted embodiment, a laser rangefinder 150 includes an emitter/receiver 152 configured to emit light through a lens 153 and receive reflected light from an object in the worksite (e.g., a passive landmark). The emitter/receiver is supported by a bracket 154. The bracket includes a base 158 configured to couple the emitter/receiver to the chassis 112. In some embodiments as shown in FIG. 5, a laser rangefinder may be movable in one or more degrees of freedom. As shown in FIG. 5, the laser rangefinder includes a pitch actuator 156 configured to rotate the emitter/receiver about a pitch axis. Additionally, the laser rangefinder includes a yaw actuator 160 configured to rotate the emitter/receiver about a yaw axis. The yaw actuator 160 may be configured to rotate the emitter/receiver within a plane parallel to a plane of the worksite. In some embodiments, the pitch axis may be optional. In such embodiments, the emitter/receiver 152 may be movable relative to the chassis 112 about only the yaw axis. The motion of the laser rangefinder and associated exemplary methods is described further herein with reference to FIGS. 10-14 and 24-25. The emitter/receiver 152 may be connected to the controller 130 via power connections and/or data connections 162.

FIG. 7 is a side schematic of an exemplary embodiment of a laser rangefinder 150 of a mobility platform in a first orientation, FIG. 8 is a side schematic of the laser rangefinder in a second orientation, and FIG. 9 is a side schematic of the laser rangefinder in a third orientation. As shown in FIGS. 7-9, the laser rangefinder includes an emitter/receiver 152. The emitter/receiver 152 is configured to emit light through a lens 153 and receive reflected light from an object in the worksite (e.g., a passive landmark). The laser rangefinder may determine a range based on the time taken for the emitted light to be received back at the emitter/receiver. The emitter/receiver is supported by a bracket 154. The bracket is coupled to a base 158 configured to couple the emitter/receiver to a chassis of a mobility platform. The laser rangefinder of FIGS. 7-9 is movable in two degrees of freedom. As shown in FIGS. 8-9, the laser rangefinder includes a pitch actuator 156 disposed in a pitch actuator housing 159 configured to rotate the emitter/receiver about a pitch axis. In particular, the pitch actuator 156 may rotate the bracket 154. Additionally, the laser rangefinder includes a yaw actuator 160 configured to rotate the emitter/receiver about a yaw axis. The yaw actuator 160 is configured to rotate the base 158 about the yaw axis. The yaw actuator 160 may be disposed in a yaw actuator housing 161, as shown in FIGS. 7-9. In some embodiments, the pitch actuator 156 and yaw actuator 160 may provide feedback information regarding the orientation of the emitter/receiver about one or more of the pitch axis and yaw axis to at least one processor of a mobility platform. In some embodiments, a laser rangefinder may include one or more sensors (e.g., potentiometers, rotary encoders, accelerometers, etc.) that provide information regarding the orientation of the laser rangefinder relative to the chassis or a worksite reference frame.

As shown in FIG. 7, the emitter/receiver 152 is configured to change in orientation about a pitch axis and a yaw axis based on forces applied to the emitter/receiver by the pitch actuator 156 and the yaw actuator 160. In the state shown in FIG. 7, the pitch axis is parallel to the y-axis, and may be always parallel to an xy plane. Accordingly, the pitch actuator 156 may adjust an angle of the emitter/receiver about the pitch axis in a +ρ or −ρ direction. In the state shown in FIG. 7, the yaw axis is parallel to the z-axis, and may be always perpendicular to an xy plane. Accordingly, the yaw actuator 160 may adjust an angle of the emitter/receiver about the pitch axis in a +θ or −θ direction. FIG. 8 depicts the emitter/receiver 152 with an orientation changed in the +ρ direction relative to the state shown in FIG. 7, such that the emitter/receiver is inclined relative to a horizontal plane. FIG. 8 depicts the emitter/receiver 152 with an orientation changed in the +θ direction relative to the state shown in FIG. 7, such that the emitter/receiver is oriented in a different direction with the xy plane.

In some embodiments as shown in FIGS. 7-9, a laser rangefinder may include a camera 166. The camera may collect visual information regarding a worksite. Information from the camera 166 may be provided to at least one processor of a mobility platform, which may use the information to identify a passive landmark for landmark acquisition. Various image processing techniques may be applied to the information to identify a passive landmark. For example, shape recognition, machine vision, or machine learning may be applied to information obtained by a camera for recognition and identification of a passive landmark. In some embodiments, a passive landmark may be a color that may be identifiable in the information provided by the camera. In some embodiments, an illumination source of a passive landmark may emit light that is identifiable in the information provided by the camera. In some embodiments, a reflectivity of a passive landmark may be identifiable in the information provided by the camera. As the camera 166 is mounted to the emitter/receiver 152, information regarding the reference frame of an image obtained by the camera may be known based on orientation information of the emitter/receiver. Similarly, a position of the camera may be known based on position information of an associated mobility device. Accordingly, processing an image obtained by a camera with a known orientation and position may allow at least one processor to estimate a position of a passive landmark included in the image.

In some embodiments, the camera 166 may be used to "sight" the emitter/receiver. For example, an image from the camera 166 may be processed such that a passive landmark is identified in the image. Once the passive landmark is identified, the orientation of the emitter/receiver may be changed to center the passive landmark within the image or otherwise position the passive landmark in a desired location within the image. Once the passive landmark is within the desired portion of the image, the emitter/receiver may be oriented at the passive landmark. In some embodiments, correct orientation of the emitter/receiver toward the passive landmark may be verified with distance measurements from the laser rangefinder. In some embodiments a camera may be positioned on another portion of a mobility platform, as the present disclosure is not so limited. In some embodiments, a mobility platform may not include a camera, or may otherwise not employ image processing for landmark identification, as the present disclosure is not so limited.

Figure 10:
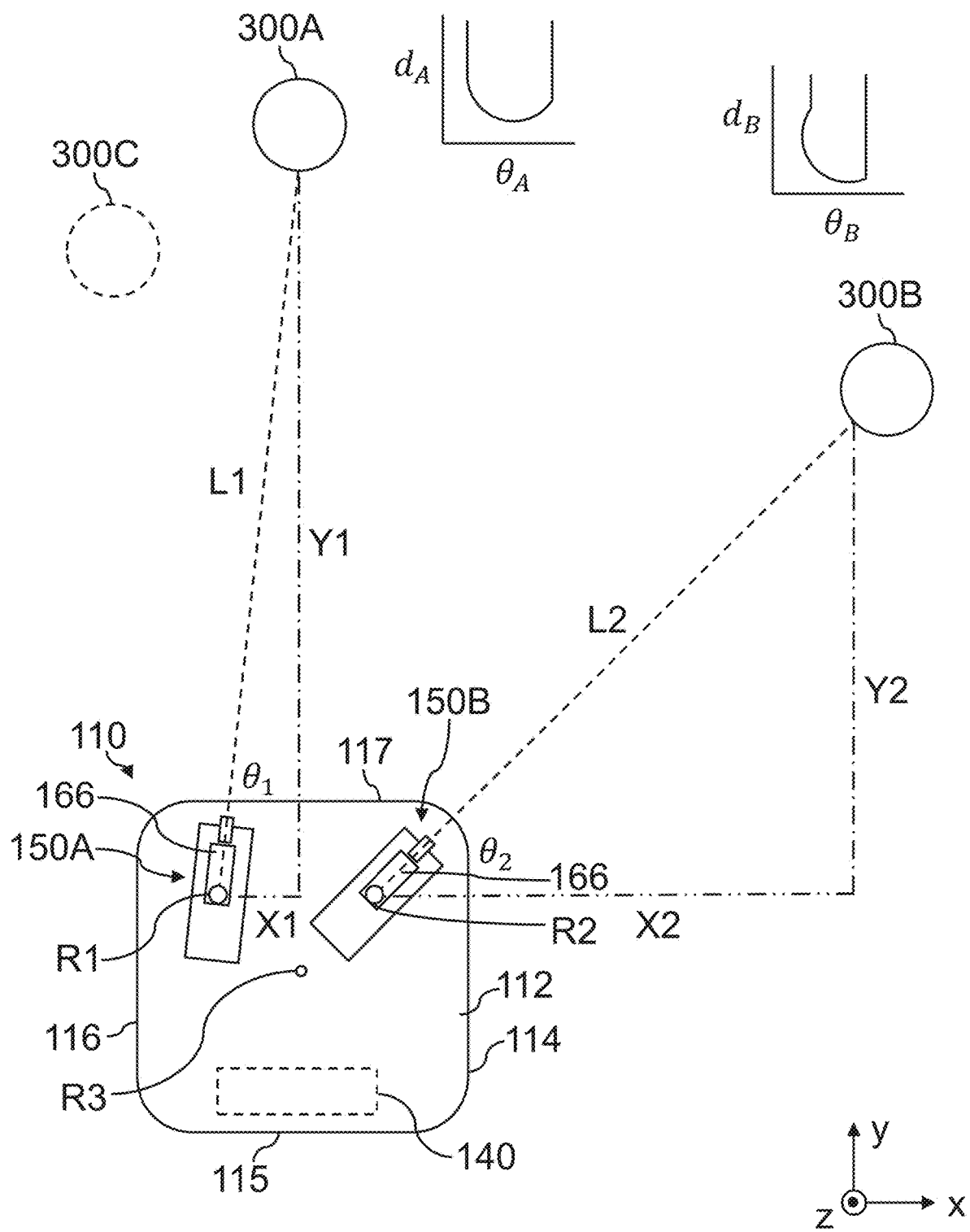
FIG. 10 is a top schematic view of an exemplary embodiment of a mobility platform and a plurality of passive landmarks.

FIG. 10 is a top schematic view of an exemplary embodiment of a mobility platform 110 and a plurality of passive landmarks 300A, 300B. As shown in FIG. 10, the mobility platform includes a chassis 112. The chassis includes a first side 114, a second side 115, a third side 116, and a fourth side 117. The directions of the sides of the chassis may be representative of an orientation of the chassis 112. The chassis 112 may be supported by a drive system (for example, see FIGS. 5-6), which is omitted from FIG. 10 for the sake of clarity. The chassis may also support a marking device 140 configured to mark a floor of a worksite.

According to the embodiment of FIG. 10, the mobility platform includes a first laser rangefinder 150A and a second laser rangefinder 150B. The first laser rangefinder is disposed at a first location R1 on the chassis 112 and is configured to measure a distance between the first location R1 and an object in a worksite. The second laser rangefinder is disposed at a second location R2 on the chassis 112 and is configured to measure a distance between the second location R2 and an object in the worksite. As shown in FIG. 10, a first passive landmark 300A and a second passive landmark 300B are placed in the worksite. The first laser rangefinder 150A is oriented at the first passive landmark 300A, and the second laser rangefinder 150B is oriented at the second passive landmark 300B. Accordingly, the first laser rangefinder 150A is configured to measure a distance L1 between the first passive landmark and the first location R1, shown in dashed lines. Likewise, the second laser rangefinder 150B is configured to measure a distance L2 between the second passive landmark and the second location R2, also shown in dashed lines.

The distances L1 and L2 may be employed to determine the positions of the first location R1 and the second location R2 within a plane of the worksite (e.g., an xy plane). As shown in FIG. 10, information regarding a yaw angle $\theta$ of the first laser rangefinder 150A and the second laser rangefinder 150B may be measured (e.g., by one or more yaw angle sensors) relative to a reference yaw direction. In the embodiment shown in FIG. 10, the reference direction may be parallel to the x axis. In other embodiments, any suitable direction within the xy plane may be employed, as the present disclosure is not so limited. As shown in FIG. 10, the first laser rangefinder 150A is disposed at an angle $\theta_1$ relative to the reference direction and the first laser rangefinder 150B is disposed at an angle $\theta_2$ relative to the reference direction. Based on the angle $\theta_1$ and the distance L1, the xy coordinates of the first landmark 300A may be determined using trigonometry. For example, a distance Y1 shown in a dash-dot line in the y direction may be determined as Y1=sin($\theta_1$)*L1. As another example, a distance X1 shown in a dash-dot-dot line in the x direction may be determined as X1=cos($\theta_1$)*L1. Accordingly, at least one processor of a mobility platform may receive the distance L1 and the angle $\theta_1$ and may be able to determine a position of the first location R1 within the xy plane relative to the first landmark 300A. If the position of the first landmark 300A is known, the first location R1 may be determined. Like the first location, the position of the second location R2 may be determined based on the distance L2 and the yaw angle $\theta_2$. For example, a distance Y2 shown in a dash-dot line in the y direction may be determined as Y2=sin($\theta_2$)*L2. As another example, a distance X2 shown in a dash-dot-dot line in the x direction may be determined as X2=cos($\theta_2$)*L2. Accordingly, at least one processor of a mobility platform may receive the distance L2 and the angle $\theta_2$ and may be able to determine a position of the second location R2 within the xy plane relative to the second landmark 300B. If the location of the second landmark 300B is known, the second location R2 may be determined. The same process may be completed to determine a position of a laser rangefinder and any landmark where the position is known. With two locations on the chassis 112 fixed in position, the orientation of the chassis 112 may be determined so long as the two locations are uniquely identified and are not the same location (e.g., are spaced from one another).

Notably, the distances L1 and L2 measured by the first laser rangefinder 150A and the second laser rangefinder 150B are to an exterior surface of the first passive landmark 300A and the second passive landmark 300B. In some embodiments, it may be desirable to measure a location relative to a point which each landmark represents (e.g., a control point). In some embodiments, such a point may be disposed at a center of a passive landmark. In the embodiment of FIG. 10, the first landmark 300A and the second landmark 300B are cylindrical, and accordingly a center of each landmark is equidistance from the exterior surface of the landmark off which light measured by a laser rangefinder reflects. Accordingly, in some embodiments, the radius of a cylindrical landmark may be added to the measured distance L1 for use in determination of position of the first location R1 and the second location R2. Such an addition may be suitable if the distances L1, L2 are measured from the surfaces of the cylindrical landmark closest to the locations R1, R2. However, depending on the yaw angle of a laser rangefinder, such an addition may be inappropriate in some circumstances.

As shown in the graphs of FIG. 10, the distances measured by a laser rangefinder may change depending on the yaw angle of the laser rangefinder and the particular passive landmark. For example, a measured distance may increase relative to the true distance between a landmark and laser rangefinder if the yaw angle is not appropriately set. As shown in FIG. 10, the distance $d_A$ is minimized where the first laser rangefinder 150A is oriented at a center of the first landmark 300A such that the external surface of the first landmark is closest to the first location R1. For other yaw angles $\theta_A$, the distance measured increases until there is a discontinuity once the light from the laser rangefinder no longer reflects off the first landmark 300A. In the graph for the first landmark 300A shown in FIG. 10, such a discontinuity is represented as a stepwise increase to infinite distance, though such an increase may be to another object in the worksite or a range limit of the first laser rangefinder 150A. The graph shown in FIG. 10 with reference to the first landmark 300A may represent sweep information. As shown in FIG. 10, a similar graph may be shown for a distance $d_B$ measured by the second rangefinder 150B against change in yaw angle $\theta_B$, which represents sweep information. As shown in FIG. 10, the distance $d_B$ is minimized where the second laser rangefinder 150B is oriented at a center of the second landmark 300B such that the external surface of the second landmark is closest to the second location R2. For other yaw angles $\theta_B$, the distance measured increases until there is a discontinuity once the light from the laser rangefinder no longer reflects off the second landmark 300B.

In some embodiments, during a landmark acquisition process a processor may command a laser rangefinder to "sweep" a worksite within a predetermined angular range while the mobility platform is stationary. The processor may obtain distance information similar to the graphs shown in FIG. 10 of distance measured relative to yaw angle, which may be used to determine an appropriate yaw angle for the laser rangefinder. In some embodiments, to determine a position of a location on a chassis, the processor may orient a laser rangefinder to minimize a distance measured from a cylindrical landmark. At the minimized distance, the processor may add the radius of the cylindrical landmark to determine the distance to the center of the landmark. In some embodiments, a processor may identify a shape of a passive landmark in the distance measurements. For example, a partial ellipse shape as shown in the graphs of FIG. 10 may correspond to a cylindrical landmark. Based on the particular shape, the center of a landmark may be determined. Other shapes for landmarks may be identifiable, including prismatic, faceted, or curved passive landmark shapes. In some embodiments, a successful acquisition may result in a laser rangefinder being oriented toward a geometric center of a passive landmark in the xy plane (or another point used as a known reference point for the determination of position of a location on the chassis 112). In some embodiments, a landmark acquisition process may be completed before moving the mobility platform 110 (e.g., as a part of a startup procedure). In some embodiments, a landmark acquisition process may be performed before the mobility platform performs any task at a task location. Such an arrangement may be beneficial to ensure the mobility platform is in the appropriate task location and in the correct orientation before performing the task. In some embodiments, a landmark acquisition process may be performed to calibrate and/or correct error in position estimation from other sensor sources (e.g., acceleration integration, odometry, etc.). As discussed above, in some embodiments, a camera 166 associated with each laser rangefinder may be employed to perform a landmark acquisition process. Use of a camera 166 may be alternative to other processes described herein (e.g., a "sweep" process) or in addition to such processes. In some embodiments, a "sweep" may be employed while the mobility platform is moving to ensure that a landmark remains acquired through the duration of the movement of the mobility platform. In some embodiments, the camera 166 may be employed to control the laser rangefinders to maintain acquisition of the respective landmarks while the mobility platform is moving.

In some embodiments, as the mobility platform 110 moves or changes in orientation, the first laser rangefinder 150A and the second laser rangefinder 150B may track the first landmark 300A and the second landmark 300B, respectively. In some embodiments, the first laser rangefinder and the second laser rangefinder may be driven to track their respective landmarks based on feedback provided by other sensors of the mobility platform. For example, odometry information from at least one wheel odometer, inertial measurement units, accelerometers, other sensors, or any combination thereof may be used to drive the laser rangefinders to track their acquired landmarks. In some such embodiments, the laser rangefinders may not provide internal feedback information, such that the tracking may be prone to error from the other position and orientation information sources. Accordingly, in some embodiments, laser rangefinders may reacquire the passive landmarks (e.g., stopping the mobility platform and performing a "sweep") at fixed distance or time intervals during movements of the mobility platform. In some embodiments, laser rangefinders may reacquire the passive landmarks at each task location to verify position and make corrections in position or orientation as appropriate to accomplish the task. In some embodiments, a camera 166 may be employed in feedback control of a laser rangefinder. In such embodiments, the feedback from the camera 166 may be used to maintain acquisition of a landmark, ensuring the reliability of distance measurements. In some such embodiments, no reacquisition process is performed, or fewer reacquisition processes are performed compared to a method including reacquisition at each task location or at fixed time or distance intervals.

In some embodiments, "reacquire" or "reacquisition" may refer to a method of ensuring that a laser rangefinder is appropriately oriented toward the passive landmark for a valid distance measurement. In some embodiments, reacquisition may include finding a passive landmark again according to methods described herein (e.g., a sweep, camera feedback, etc.). For example, during reacquisition of a passive landmark an acquisition process may be independently repeated even if previously completed to ensure the laser rangefinder is correctly targeting the passive landmark.

In some embodiments, at least one processor may detect a discontinuity in the range measurement of a laser rangefinder (e.g., information from a laser rangefinder) while the mobility platform is moving, which may trigger reacquisition of a passive landmark (e.g., passive landmarks 300A, 300B). In some embodiments, a discontinuity may be represented by stepwise increase or decrease in measured distance. In some embodiments, a discontinuity may be determined by a measured distance increasing stepwise above a range change threshold (e.g., 5 cm, 10 cm, 15 cm, 50 cm, 100 cm, etc.) that may be based on a particular worksite and passive landmark size and shape. In some embodiments, a discontinuity may be based on a loss of line of sight to a passive landmark from a laser rangefinder. In such a case, in some embodiments, the laser rangefinder may acquire a separate passive landmark that is within the line of sight of the laser rangefinder, as will be discussed further with reference to FIGS. 22-23.

In some embodiments, if a mobility platform changes position and/or orientation and no discontinuity is detected in the information from a laser rangefinder, the mobility platform may nevertheless reacquire a landmark before performing a task at a task location to verify the global position and orientation of the mobility platform and make any appropriate corrections in position or orientation before performing the task (e.g., marking a floor of a worksite). In some such embodiments, the reacquisition of a passive landmark to verify position where there is no discontinuity may employ a "sweep" through a reacquisition angular range that is smaller than an angular range for an initial acquisition sweep. For example, whereas an initial acquisition sweep may be approximately 180 degrees, a reacquisition angular range may be approximately 30 degrees. Such an arrangement may increase the speed of reacquisition compared to initial acquisition, which may increase the overall speed of task completion by the mobility platform. In some embodiments, a reacquisition angular range may be based on the detection of a discontinuity in range information from a laser rangefinder. For example, once a discontinuity is detected, a laser rangefinder may not move further in the direction of the discontinuity. Such an arrangement may ensure that the laser rangefinder is not oriented in directions in which the passive landmark is not present, avoiding collection of information that is not relevant to position and/or orientation determination, further speeding the position verification process. In some embodiments, a reacquisition angular range may be based on an estimated distance to a passive landmark, where a greater estimated distance reduces the reacquisition angular range. Conversely, a lesser estimated distance may increase the reacquisition angular range. In some embodiments, a reacquisition angular range may be approximately 5 degrees, 10 degrees, 15 degrees, 30 degrees, 45 degrees, or another appropriate angle. In some embodiments, reacquisition may be performed based on information from a camera associated with a laser rangefinder.

In some embodiments, a mobility platform 110 may be configured to determine a position of a third passive landmark 300C that may be optionally placed in a worksite. In some such embodiments, the mobility platform may be configured to determine a position of at least one of the first location R1 and the second location R2. While the mobility platform remains stationary, the laser rangefinder associated with the established position (e.g., the first laser rangefinder 150A for the first location R1 and the second laser rangefinder 150B for the second location R2) may acquire the third passive landmark 300C using methods described above. A distance measured from the established point and the third passive landmark may be used to determine the position of the third passive landmark 300C within the xy plane of the worksite. In some embodiments, a radius of the third passive landmark 300C may be added to the measures distance to determine a geometric center point of the third passive landmark where the third passive landmark is cylindrical. In this manner, additional passive landmarks may be placed within a worksite at unknown landmark positions, and the mobility platform may be configured to establish the landmark positions (e.g., at a center point of the passive landmark) based on measurements relative to at least one passive landmark at a known landmark location. In some embodiments, a position of both the first location R1 and the second location R2 may be determined before the third landmark position is determined to ensure greater accuracy of the third landmark position.

In some embodiments, the distances L1 and L2 measured by the first laser rangefinder 150A and the second laser rangefinder 150B may be employed to determine a distance to geometric center R3 of the mobility platform 110. The distance between the first location R1 and the geometric center R3 may be known based on the arrangement of the chassis 112 and the placement of the first location R1. Likewise, the distance between the second location R2 and the geometric center R3 may be known based on the arrangement of the chassis 112 and the placement of the second location R2. In some embodiments, the known distance(s) between the first location R1 and the geometric center R3, as well as the known distance(s) between the second location R2 and the geometric center R3 may be added to the measured distances L1 and L2, respectively. Such an addition may rectify the distances measured by the laser rangefinders to a single known point on the mobility platform (e.g., a geometric center R3). While a geometric center is employed in some embodiments, in other embodiments any point representative of a position of the mobility platform 110 may be employed, as the present disclosure is not so limited. For example, such a point may be a center of mass or a geometric center of the marking device 140.

Figure 11:
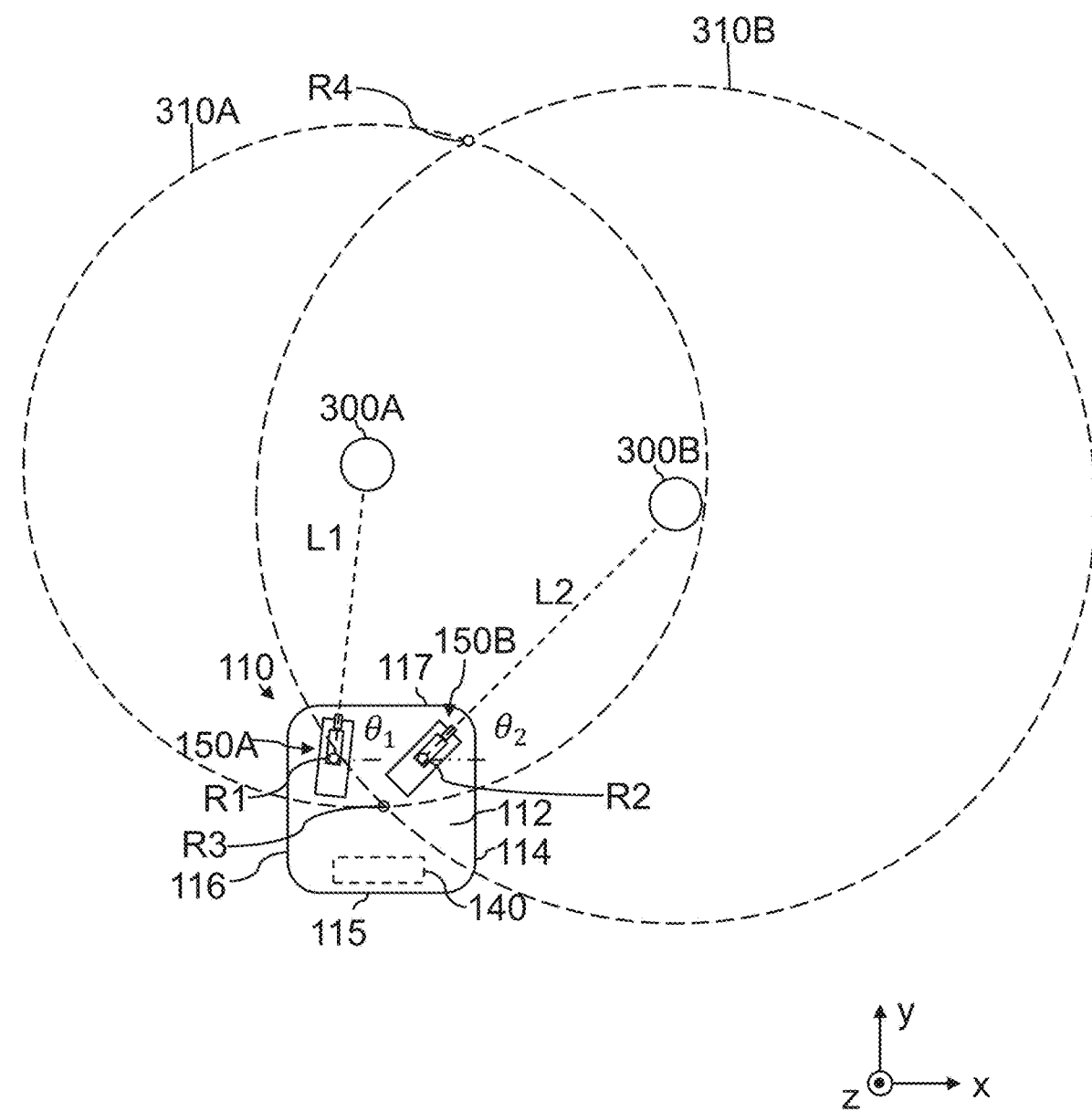
FIG. 11 is a top schematic view of an exemplary embodiment of a mobility platform and a plurality of passive landmarks.

In some embodiment, a position and/or orientation of a mobility platform may be performed according to a process alternative to that described with reference to FIG. 10. FIG. 11 depicts a mobility platform 110 disposed within a worksite. As shown in FIG. 11, the mobility platform includes a chassis 112. The chassis includes a first side 114, a second side 115, a third side 116, and a fourth side 117. The directions of the sides of the chassis may be representative of an orientation of the chassis 112. The chassis 112 may be supported by a drive system (for example, see FIGS. 5-6), which is omitted from FIG. 11 for the sake of clarity. The chassis may also support a marking device 140 configured to mark a floor of a worksite.

According to the embodiment of FIG. 11, the mobility platform includes a first laser rangefinder 150A and a second laser rangefinder 150B. The first laser rangefinder is disposed at a first location R1 on the chassis 112 and is configured to measure a distance between the first location R1 and an object in a worksite. The second laser rangefinder is disposed at a second location R2 on the chassis 112 and is configured to measure a distance between the second location R2 and an object in the worksite. As shown in FIG. 10, a first passive landmark 300A and a second passive landmark 300B are placed in the worksite. The first laser rangefinder 150A is oriented at the first passive landmark 300A, and the second laser rangefinder 150B is oriented at the second passive landmark 300B. Accordingly, the first laser rangefinder 150A is configured to measure a distance L1 between the first passive landmark and the first location R1, shown in dashed lines. Likewise, the second laser rangefinder 150B is configured to measure a distance L2 between the second passive landmark and the second location R2, also shown in dashed lines.

In some embodiments, the distances L1 and L2 measured by the first laser rangefinder 150A and the second laser rangefinder 150B may be employed to determine a distance to geometric center R3 of the mobility platform 110 or another point representative of the mobility platform position, as discussed above with reference to FIG. 10. In some embodiments as shown in FIG. 10, the rectified distances may be employed to determine a circle of possible positions based on the rectified distance measurement. For example, as shown in FIG. 11, a first circle 310A is centered on the first landmark 300A and represents all possible positions for the geometric center R3 of the mobility platform based on the distance measurement from the first laser rangefinder 150A. Additionally, as shown in FIG. 11, a second circle 310B is centered on the second landmark 300B and represents all possible positions for the geometric center R3 of the mobility platform based on the distance measurement from the second laser rangefinder 150B.

In some embodiments, an initial determination of position of the mobility platform 110 based on the distances measured by the first laser rangefinder 150A and the second laser rangefinder 150B may include independently generating the possible positions of the mobility platform based on the measured positions. For example, a first set of possible positions based on the distance measured by the first laser rangefinder 150A may be generated (e.g., first circle 310A). Additionally, a second set of possible position based on the distance measured by the second laser rangefinder 150B may be generated (e.g., second circle 310B). In some embodiments, one or more intersections between the first set of possible positions and the second set of possible positions. In the embodiment of FIG. 11, as there are two laser rangefinders, there will be two intersections between the first set of possible positions and the second set of possible positions. One of the two intersections will be the actual position of the mobility platform (e.g., geometric center R3). The other of the two intersections will be an alternative location R4 that is not the actual position of the mobility platform. Accordingly, in some embodiments using only distance information from the laser rangefinders, the position of the mobility platform may be narrowed to one of two positions within a workspace.

In some embodiments, to resolve the true position between the two intersections determined based on distance measurements from the first laser rangefinder 150A and the second laser rangefinder 150B, yaw angle information from at least one laser rangefinder measured relative to a reference direction may be used. For example, a yaw angle $\theta_1$ of the first laser rangefinder 150A may be employed to distinguish the geometric center R3 at the first of two intersections from the second intersection at alternative location R4. The yaw angle may be measured relative to a reference direction, which in some embodiments may be a Cartesian direction (such as the positive x direction in FIG. 11). Alternatively, a yaw angle $\theta_2$ of the second laser rangefinder 150B may be used to distinguish the geometric center R3 at the first of two intersections from the second intersection at alternative location R4. In some embodiments, only one yaw angle of a laser rangefinder may be employed to resolve the ambiguity between the two possible positions of the mobility platform 110. In some embodiments, both the yaw angle from the first laser rangefinder 150A and the second laser rangefinder 150B may be employed to determine a position of the mobility platform. Additionally, in some embodiments the yaw angles of the first laser rangefinder 150A and the second laser rangefinder 150B may be employed to determine the orientation of the mobility platform 110 within the worksite.

According to exemplary embodiments herein, "information" from a laser rangefinder may refer to one or more sensor outputs from the laser rangefinder itself or associated sensors configured to measure one or more states of the laser rangefinder. For example, information from a laser rangefinder may include measured distance information. As another example, a yaw angle sensor may measure a yaw angle of a laser rangefinder within a plane of the worksite, and such a measured yaw angle may be included in information from a laser rangefinder used in position and/or orientation determination or other methods described herein. As yet another example, a pitch angle sensor may measure a pitch angle of a laser rangefinder about an axis parallel to a plane of the worksite, and such a measured pitch angle may be included in information from a laser rangefinder used in position and/or orientation determination or other processes or other methods described herein.

Figure 12:
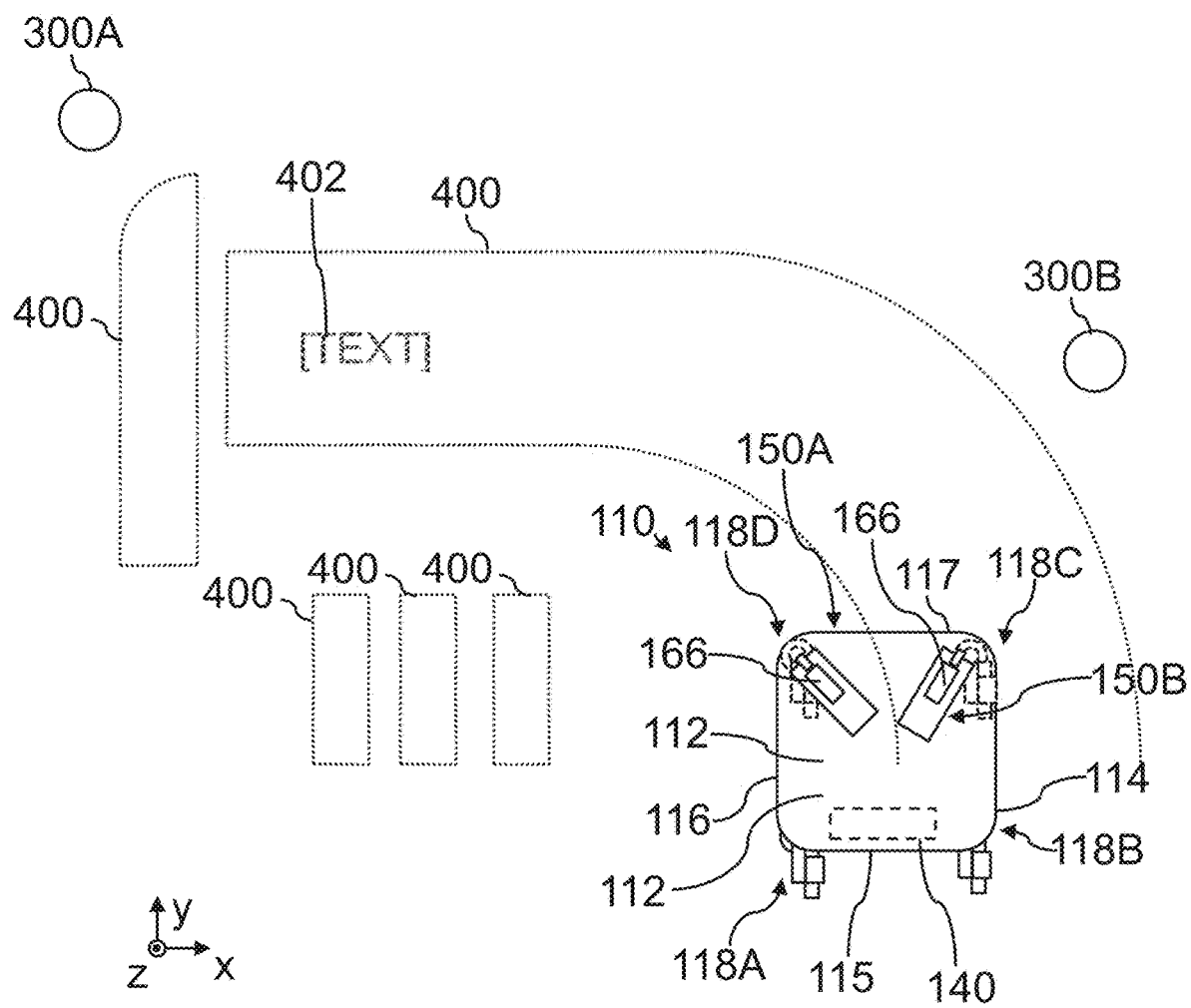
FIG. 12 is a top schematic view of an exemplary embodiment of a mobility platform in a first position, a worksite, and a plurality of passive landmarks.

FIG. 12 is a top schematic view of an exemplary embodiment of a mobility platform 110 in a first position, a worksite, and a plurality of passive landmarks 300A, 300B. The mobility platform 110 includes a chassis 112. The mobility platform 110 also includes a drive system including four wheel assemblies 118A, 118B, 118C, 118D that are configured to move and orient the chassis 112 within the worksite. The drive system of the mobility platform of FIG. 12 may be holonomic and may operate like the drive system described with reference to FIGS. 2-4. The wheel assemblies underlying the chassis 112 are shown in dashed lines for clarity of the orientation of the wheel assemblies. The mobility platform also includes a first laser rangefinder 150A and a second laser rangefinder 150B mounted to the chassis 112. The first laser rangefinder 150A and the second laser rangefinder 150B are configured to measure distances to respective landmarks so that a position and orientation of the mobility platform within the worksite may be determined (e.g., a position and orientation within the xy plane). The mobility platform of FIG. 12 is configured to mark a floor of a worksite and includes a marking device 140.

As shown in FIG. 12, the worksite includes a first passive landmark 300A and a second passive landmark 300B. The first passive landmark 300A and the second passive landmark 300B may be placed on known landmark position points (e.g., control points) within the worksite. Accordingly, the passive landmarks may be used to determine an absolute position and orientation of the mobility platform using distance measurements by the first and second laser rangefinders, 150A, 150B. Such a process is discussed further above with reference to FIG. 10. The mobility platform may also include at least one wheel odometer configured to provide odometry information used to determine a local position and orientation of the mobility platform. The local position may be verified against a position determined using the first laser rangefinder 150A and the second laser rangefinder 150B. Additional or alternative sensors may be employed in some embodiments, including and inertial measurement unit, as the present disclosure is not so limited.

As shown in FIG. 12, a plan for a layout is shown in the worksite in small, dashed lines. In particular, lines 400 indicate portions of the worksite to be marked with a marking fluid to form a visible line within the worksite. Additionally, the plan for markings in the worksite according to the embodiment of FIG. 12 includes text 402. The lines 400 and text 402 may be marked by positioning the marking device 140 over the region to be marked and commanding the marking device to deposit marking fluid in the desired locations according to the plan. A drive path for the mobility platform 110 may provide for changes in position and orientation to position the marking device 140 over all lines 400 and text 402 to be marked within the worksite. In some embodiments, the drive path may be generated according to task efficiency (e.g., the fastest way to mark all of the lines 400 and text 402 in the worksite). In some embodiments, a drive path may be generated at least in part based on progressive completion of a task field (e.g., working across a worksite), consistent readability of markings (e.g., orienting all text 402 in the same direction), and reducing motion between tasks to eliminate the need for reacquisition of the first landmark 300A and the second landmark 300B at various task locations.

Figure 13:
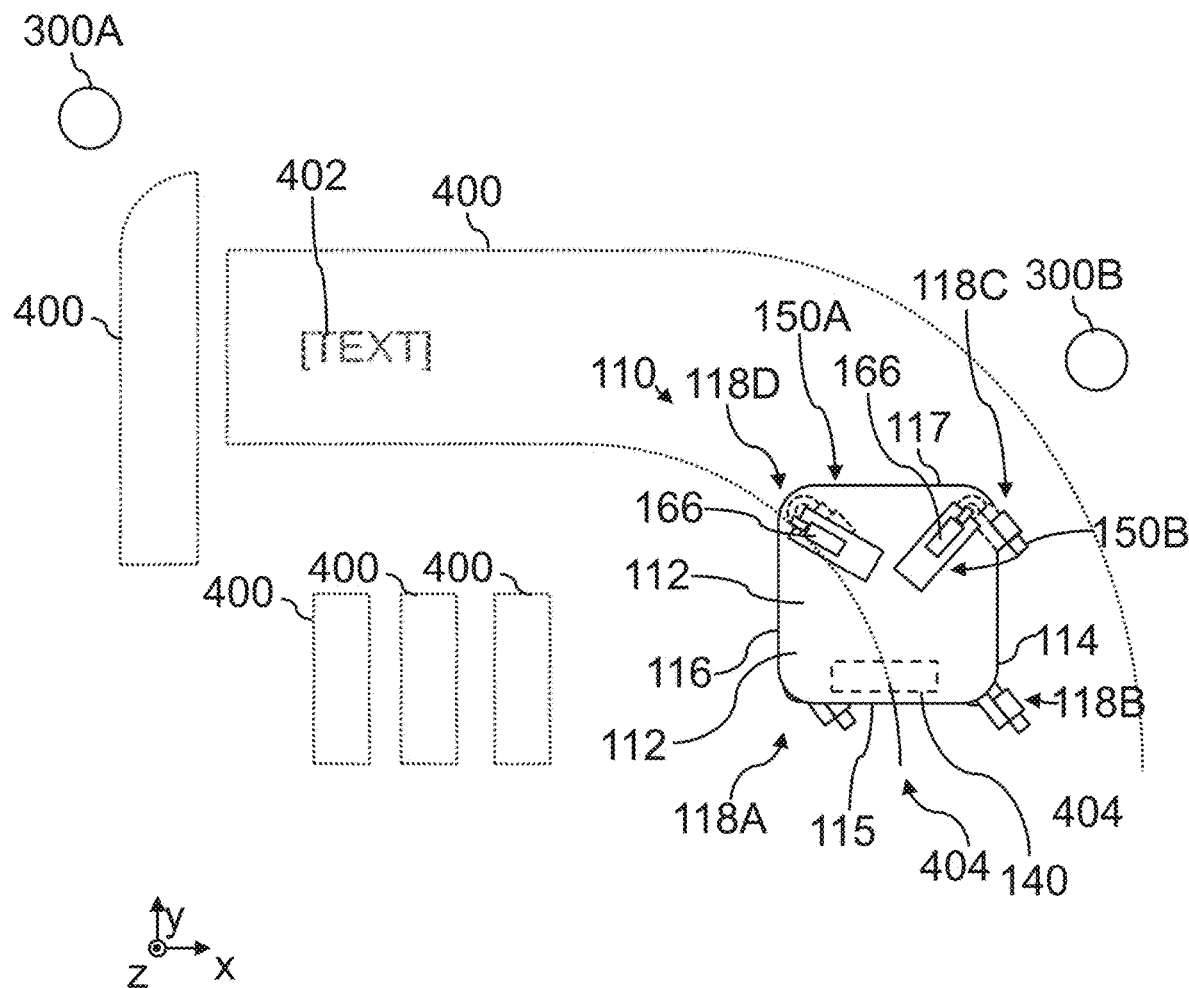
FIG. 13 is a top schematic view the mobility platform, worksite, and plurality of passive landmarks of FIG. 12 with the mobility platform in a second position.

FIG. 13 depicts the mobility platform 110 of FIG. 12 as it performs a task of marking a line 400 in the worksite. As shown in FIG. 13, as the marking device 140 is positioned over the planned line 400, a marking 404 may be made with marking fluid. As shown in FIG. 13, the mobility platform 110 may move along the planned line 400 to ensure the marking device 140 is able to make the marking 404. In some embodiments, the mobility platform 110 may move continuously over a length of a planned line 400. In some embodiments, before beginning to make a marking 404, the mobility platform may stop and verify its position using distance information from the first laser rangefinder 150A and the second laser rangefinder 150B. Additionally, in some embodiments the mobility platform may stop and verify its position at the end of marking a continuous line 400. In some embodiments, in between a start point and end point of a planned line 400, the mobility platform may move and make a marking 404 continuously. In some embodiments as discussed with reference to FIG. 15, the mobility platform may be able to mark continuous curved lines. In some embodiments, the mobility platform may stop at predetermined intervals in distance traveled or time to verify its position using distance measurements from the first laser rangefinder and the second laser rangefinder. During the verification of its position using the first laser rangefinder and second laser rangefinder, the laser rangefinders may perform a sweep, as discussed above. As shown in FIG. 13, as the mobility platform moves, the wheel assemblies 118A, 118B, 118C, 118D may change in orientation to allow the position of the mobility platform to change without changing its orientation. In some embodiments, both a position and orientation of the mobility platform may change as the mobility platform moves through a drive path. As shown in FIG. 13 compared with FIG. 12, a yaw angle of the first laser rangefinder 150A and the second laser rangefinder 150B may change to track the first passive landmark 300A and the second passive landmark 300B. The change in yaw angle of the first laser rangefinder and the second laser rangefinder may be based on information from one or more other sensors, such as a wheel odometer or an inertial measurement unit. In some embodiments, cameras 166 may be used to maintain the laser rangefinders orientated toward their respective passive landmarks, as discussed above.

Figure 14:
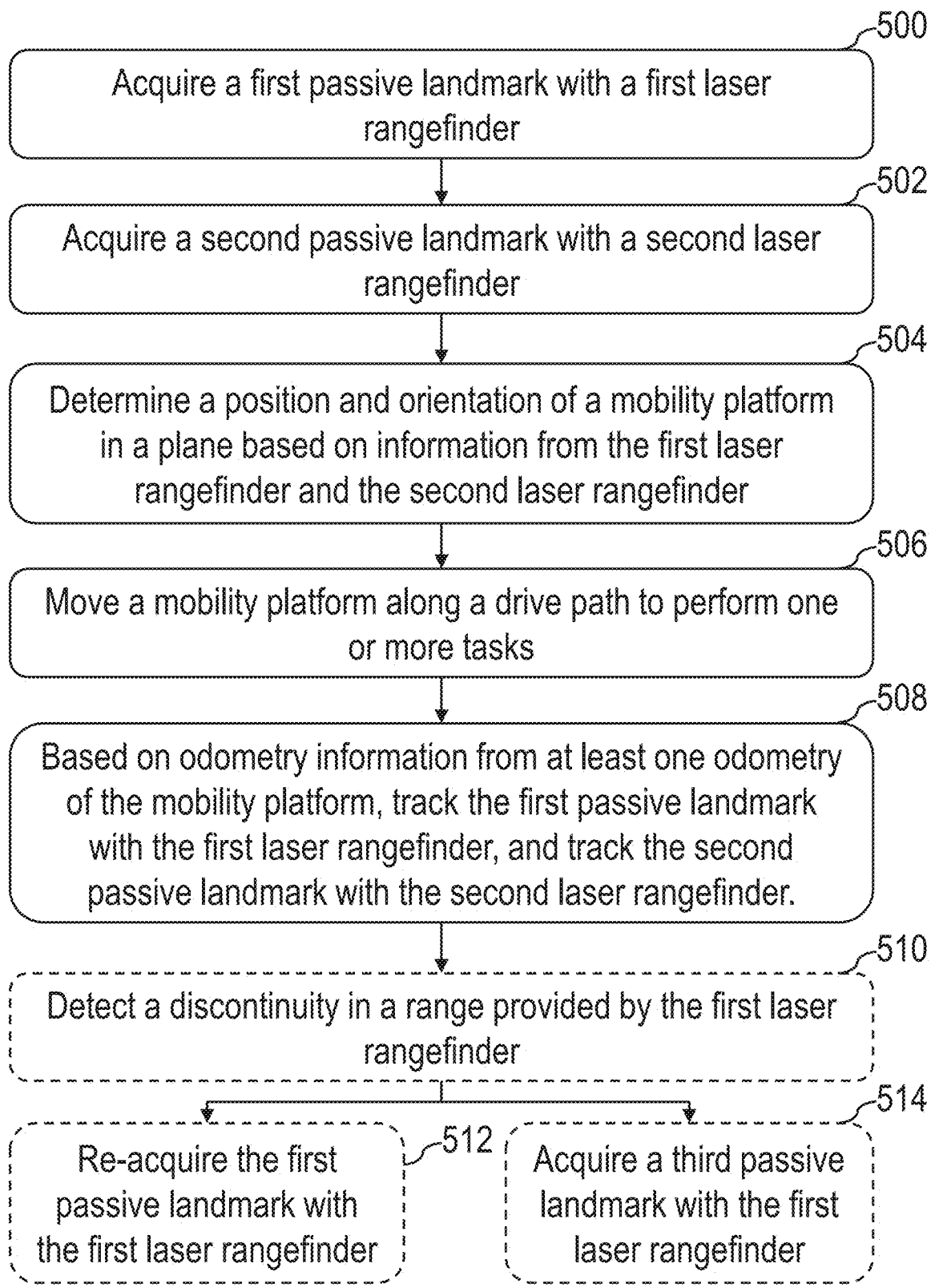
FIG. 14 is a block diagram for an exemplary embodiment of a method of operating a mobility platform.

FIG. 14 is a block diagram for an exemplary embodiment of a method of operating a mobility platform. In some embodiments, the method of FIG. 14 may be performed in whole or in part by at least one processor of a mobility platform. In block 500, a first passive landmark is acquired with a first laser rangefinder. In some embodiments, acquiring a first passive landmark may include determining from reflected light (e.g., infrared light, visual spectrum light, etc.) that a landmark is present in a region illuminated with light from the first laser rangefinder. For example, the first laser rangefinder may be configured to sweep a worksite to identify the first passive landmark, as discussed above. In block 502, a second passive landmark is acquired with a second laser rangefinder. In some embodiments, acquiring a second passive landmark may include determining from reflected light (e.g., infrared light, visual spectrum light, etc.) that the second passive landmark is present in the region illuminated with light from the second laser rangefinder. For example, the second laser rangefinder may be configured to sweep a worksite to identify the second passive landmark, as discussed above. In block 504, a position and orientation of the mobility platform is determined in a plane of the worksite based on information from the first and second laser rangefinders (e.g., distance information relative to the first and second passive landmarks). In block 506, a mobility platform is moved along a drive path to perform one or more tasks at one or more task locations with the worksite. In block 508, based on odometry information from at least one odometry sensor (e.g., a wheel odometer, inertial measurement unit, etc.) of the mobility platform, the method includes tracking the first passive landmark with the first laser rangefinder, and track the second passive landmark with the second laser rangefinder. In optional block 510, the method includes detecting a discontinuity in a range provided by the first laser rangefinder. For example, the discontinuity may be a stepwise increase or decrease in the measure range that may occur with light emitted by the first laser rangefinder no longer reflects off the first passive landmark back to the first laser rangefinder. As one option, in optional block 512 the first passive landmark may be reacquired with the first laser rangefinder, as discussed herein. As an alternative option, in optional block 514 a third passive landmark may be acquired with the first laser rangefinder. Optional block 514 may be implemented where the discontinuity is caused by a loss of line of sight between the first laser rangefinder and the first passive landmark.

Figure 15:
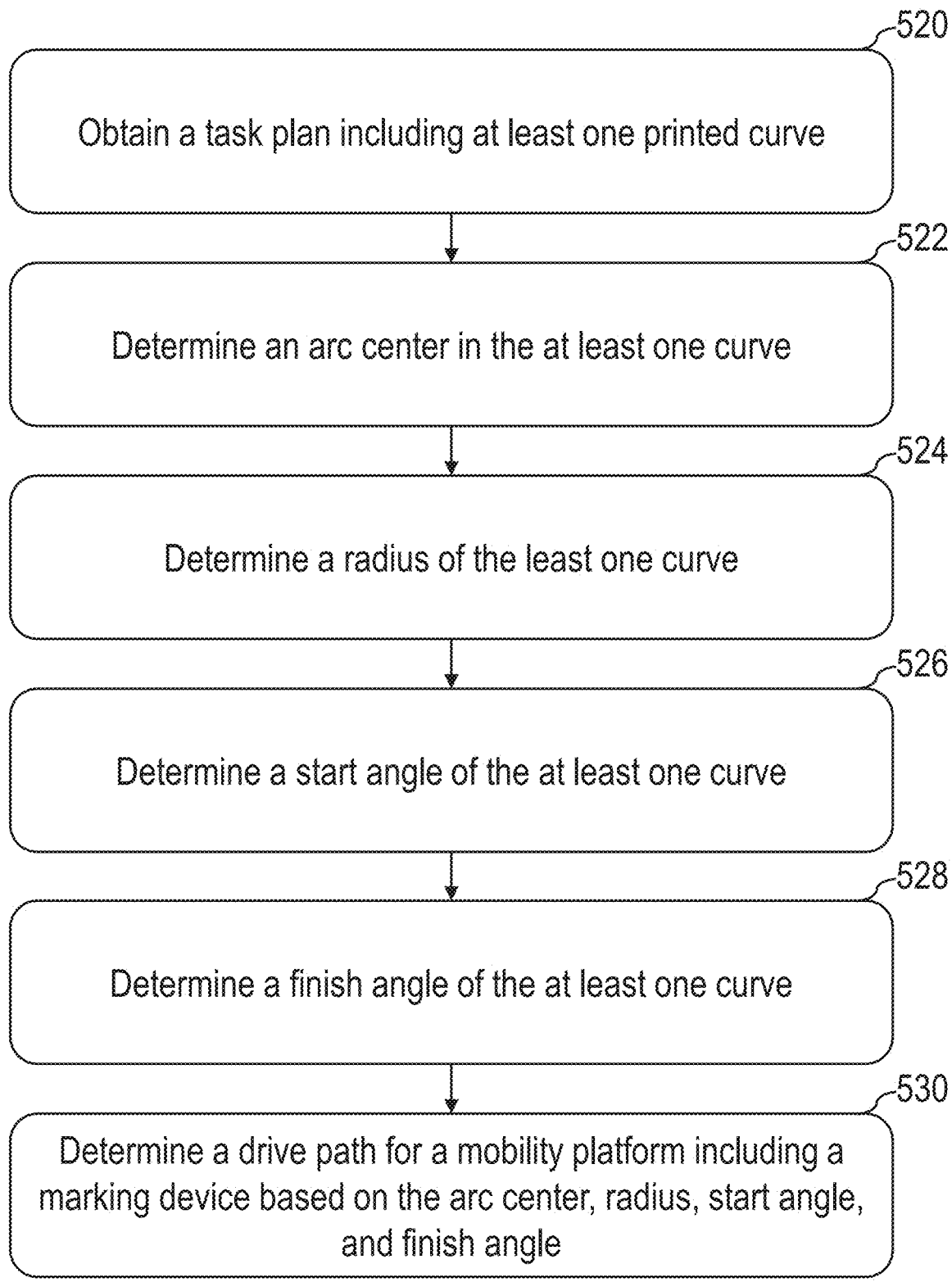
FIG. 15 is a block diagram for an exemplary embodiment of planning operation of a mobility platform.

FIG. 15 is a block diagram for an exemplary embodiment of planning operation of a mobility platform. In some embodiments, the method of FIG. 15 may be performed in whole or in part by a remote server of a construction assistance system, and the output of the method of FIG. 15 may be provided to a mobility platform for execution within a worksite. In block 520, the method includes obtaining a task plan including at least one printed curve (e.g., a curved line). The printed curve may be planned to be printed as a part of a construction layout in a worksite. In block 522, the method may include determining an arc center in the at least one curve. The arc center may be a point from which all points on the curve are equidistant. In block 524, a radius of the curve may be determined. The radius may be a distance between the arc center and all points on the at least one curve. In block 526, a start angle of the curve may be determined. The start angle may be measured relative to a reference direction in a plane of a worksite. For example, a Cartesian axis (e.g., an x axis or y axis) established in the worksite may be used to determine the start angle. In block 528, a finish angle of the at least one curve may be determined. The finish angle, like the start angle, may be determined relative to a reference direction within the plane of the worksite. In block 530, the method includes determining a drive path for the mobility platform including a marking device based on the arc center, radius, start angle, and finish angle. The drive path may include orienting one or more wheel assemblies of the mobility platform and a chassis of the mobility platform to allow the mobility platform to move continuously along the length of the at least one curve to mark the at least one curve with the marking device continuously.

Figure 16:
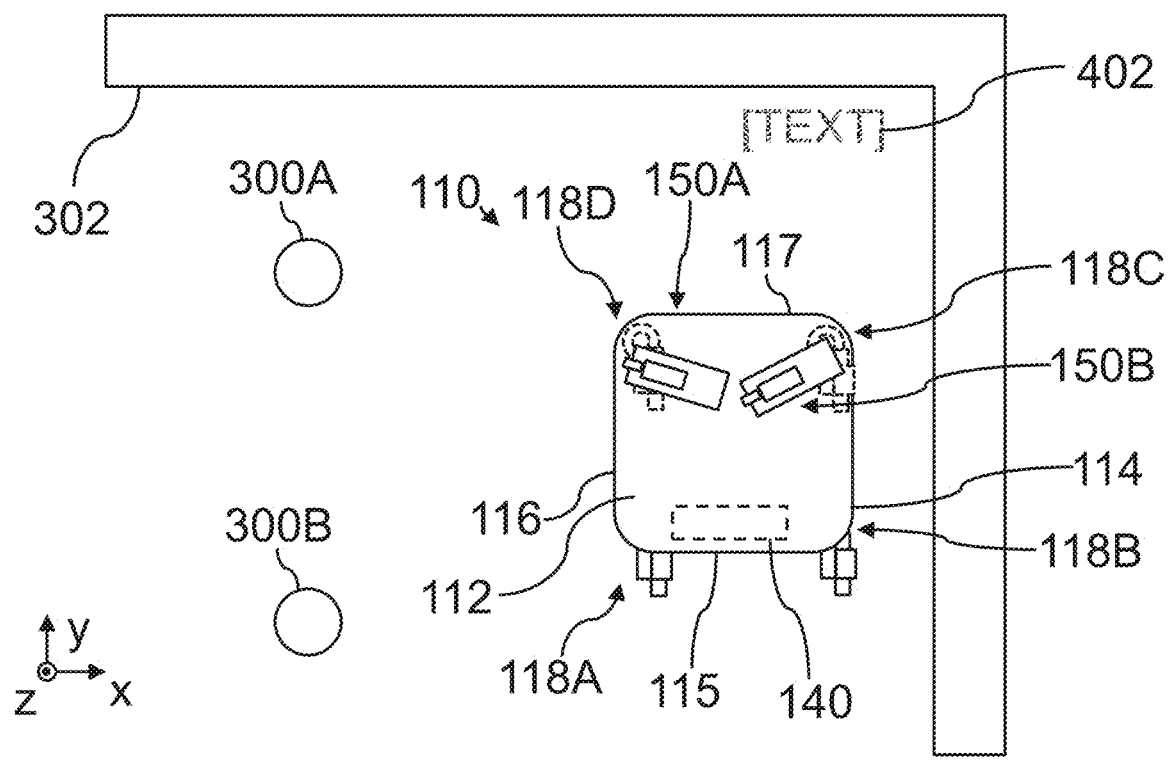
FIG. 16 is a top schematic view of an exemplary embodiment of a mobility platform in a first position and orientation and an obstacle.
Figure 17:
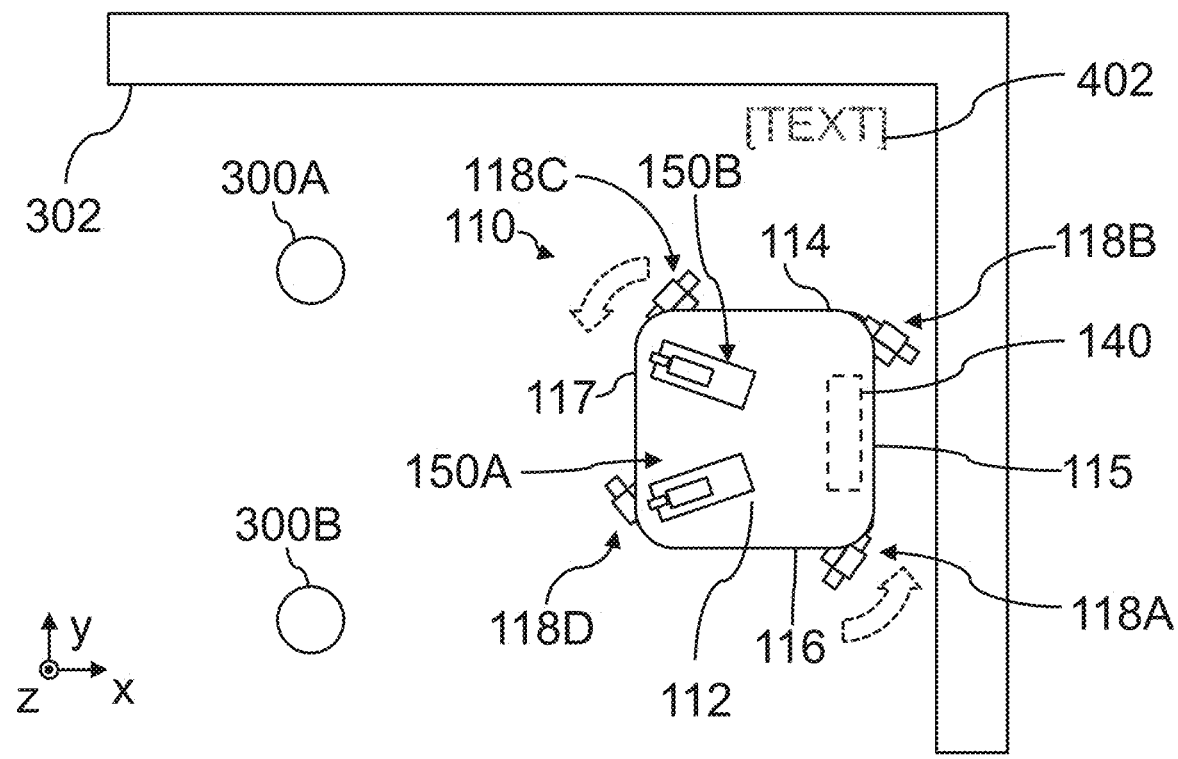
FIG. 17 is a top schematic view the mobility platform and obstacle of FIG. 16 with the mobility platform in a second orientation.
Figure 18:
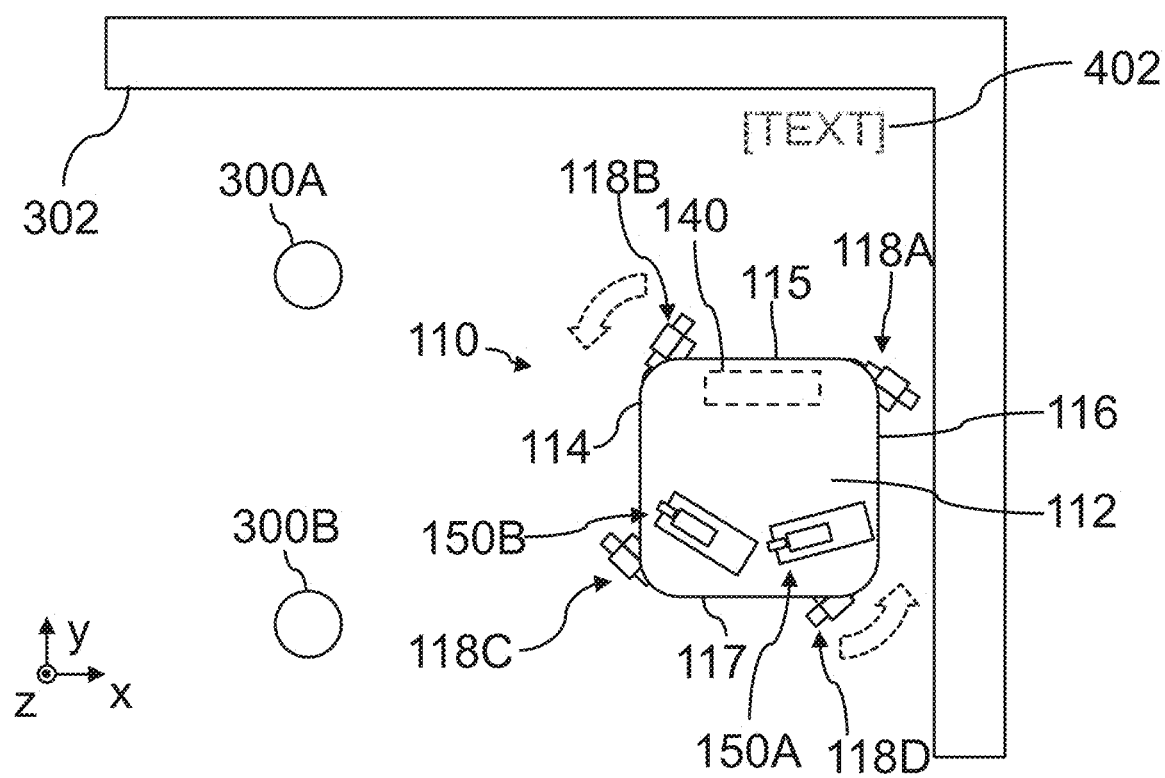
FIG. 18 is a top schematic view the mobility platform and obstacle of FIG. 16 with the mobility platform in a third orientation.
Figure 19:
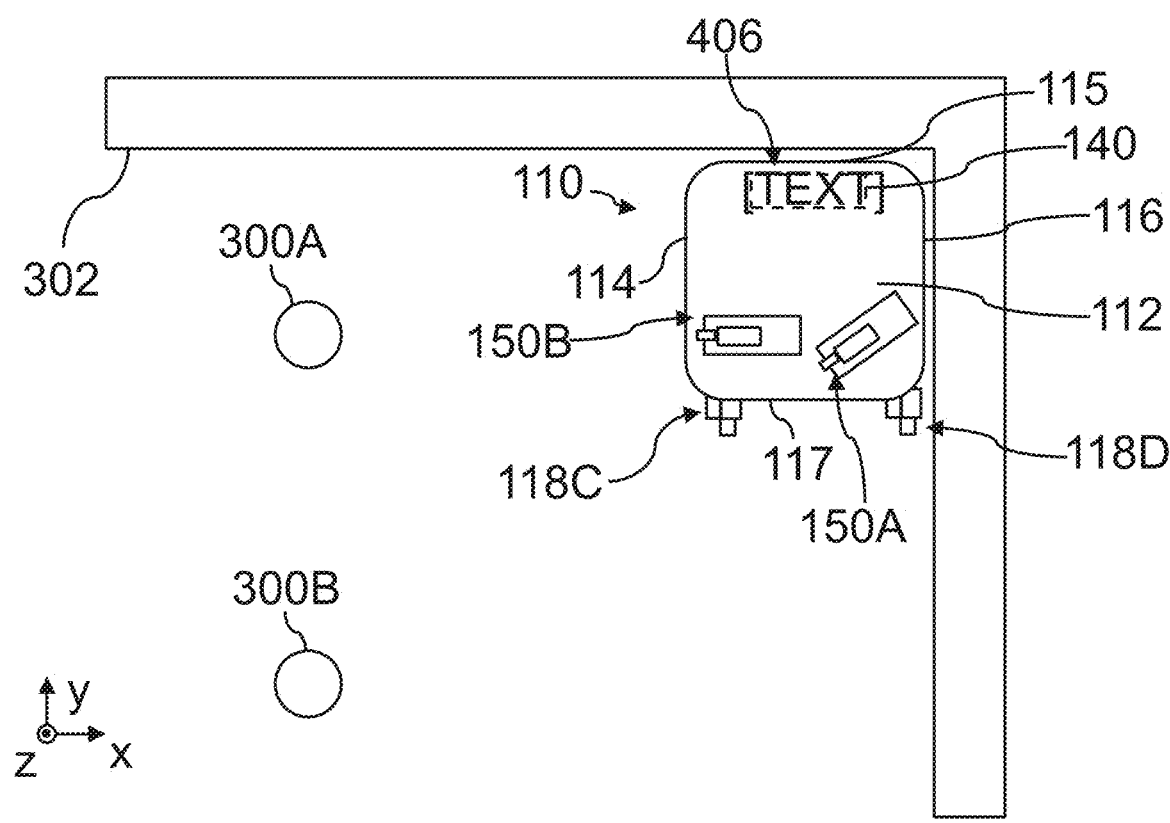
FIG. 19 is a top schematic view the mobility platform and obstacle of FIG. 16 with the mobility platform in the third orientation and a second position.

FIG. 16 is a top schematic view of an exemplary embodiment of a mobility platform 110 in a first position and orientation and an obstacle 302. FIGS. 17-19 depict changes in position and orientation of the mobility platform using a holonomic drive system to accomplish tasks in worksite that may be near obstacles 302 or a periphery of the worksite. Additionally, FIGS. 17-19 illustrate how multiple laser rangefinders may be employed on a mobility platform to track passive landmarks when changes in orientation of the mobility platform cause conflicts between the laser rangefinders. As shown in FIG. 16, a plan for a layout in a worksite includes text 402 which is disposed adjacent to an obstacle 302. The obstacle 302 of FIGS. 17-19 may be a wall. The mobility platform 110 includes a chassis 112 supported by a plurality of wheel assemblies 118A, 118B, 118C, 118D that may form a holonomic drive system as discussed elsewhere herein. The mobility platform also includes a marking device 140. The chassis of the mobility platform includes a first side 114, second side 115, third side 116, and fourth side 117. In the embodiment of FIGS. 16-19, the marking device 140 is disposed on the second side 115. Accordingly, the marking device is positioned asymmetrically about a center of the chassis 112. As a result, reorienting the chassis 112 so that the second side 115 is positioned toward an obstacle 302 allows the marking device 140 to reach regions of the worksite that may not otherwise be accessible.

As shown in FIG. 16, the mobility platform includes a first laser rangefinder 150A and a second laser rangefinder 150B. The first and second laser rangefinders may be employed to determine a position and/or orientation of the mobility platform based on distance measurements to a first passive landmark 300A and a second passive landmark 300B places in the worksite. The first passive landmark 300A and the second passive landmark 300B may be placed at known landmark position points (e.g., control points) such that measurements relative to the passive landmarks may be employed to determine an absolute position of the mobility platform within the worksite.

In the state shown in FIG. 16, the mobility platform 110 is disposed in the worksite. The fourth side 117 of the chassis 112 is facing the planned text 402 to be marked by the marking device 140. In the orientation shown in FIG. 16, the marking device 140 may not be able to reach the text 402, as the fourth side 117 of the chassis 112 would contact the obstacle 302 before the marking device could be positioned over the text. As shown in FIG. 17, a drive path for the mobility platform may include a change in orientation of the mobility platform. The wheel assemblies 118A, 118B, 118C, 118D may change in orientation to allow the chassis to rotate (e.g., counterclockwise) as shown in the dashed arrows. In the state shown in FIG. 17, the position of the mobility platform 110 may remain unchanged relative to the position in FIG. 16, where the position of the mobility platform is represented by a point (e.g., geometric center, center of mass, etc.). However, the orientation of the mobility platform has changed such that the first side 114 now faces the text 402. In the orientation of FIG. 17, the marking device 140 may still be unable to reach the text 402. Accordingly, the orientation may continue to change according to a drive path to orient the mobility platform to an appropriate orientation to allow the marking device to reach and mark the text 402, as shown in FIG. 18. In FIG. 18, the orientation has changed again with a further counterclockwise rotation (e.g., 90 degrees). Accordingly, the second side 115 now faces the text 402. In the orientation of FIG. 18, the marking device 140 may be able to reach the text 402. As shown in FIG. 19, the mobility platform may move in the orientation of FIG. 18 with the second side 115 facing the text 402. Once the marking device 140 is aligned with the planned text 402, marking fluid may be deposited to complete printed text 406 on the worksite floor.

Through the orientation changes of FIGS. 16-18, the first laser rangefinder 150A and the second laser rangefinder 150B may track the first passive landmark 300A and the second passive landmark 300B. In an initial orientation shown in FIG. 1614, the first laser rangefinder may be oriented toward the first passive landmark 300A, and the second laser rangefinder 150B may be oriented toward the second passive landmark 300B. In the change in orientation to the state of FIG. 17, there may be a crossover point between the first laser rangefinder and the second laser rangefinder. That is, if the first laser rangefinder 150A continues to track the first passive landmark 300A and the second laser rangefinder 150B tracks the second passive landmark 300B, the first laser rangefinder and second laser rangefinder may be oriented toward each other and may interfere with the measurements obtained by each laser rangefinder. For example, where each laser rangefinder is disposed on the same elevation plane and a target elevation range for each landmark is disposed on the same elevation plane, one laser rangefinder may physically block light emitted from the other laser rangefinder. Accordingly, a crossover point may be a point in a drive path with an orientation of the mobility platform where one laser rangefinder interferes with distance measurements of the other laser rangefinder.

In some embodiments, during generation of a drive path, crossover points may be identified such that at the crossover point the laser rangefinders may reacquire alternative passive landmarks to avoid interference. In some embodiments, the mobility platform itself may identify crossover points and initiate a reacquisition process for the laser rangefinders to ensure continued accurate distance measurements. In the example of FIG. 17, the first laser rangefinder 150A is commanded to acquire the second passive landmark 300B, and the second laser rangefinder 150B is commanded to acquire the first passive landmark 300A. The first laser rangefinder may be able to track the second passive landmark during further changes of orientation of the mobility platform without interference from the second laser rangefinder until another crossover point is reached. Likewise, the second laser rangefinder may be able to track the first passive landmark during further changes of orientation of the mobility platform without interference from the first laser rangefinder until another crossover point is reached. In some embodiments, first and second laser rangefinders may be positioned at different elevation planes on a mobility platform, such that the physical interference in distance measurements may be reduced or eliminated, which may correspondingly reduce crossover points and therefore eliminate reacquisition processes. The elimination of reacquisition processes may speed the overall operation of the mobility platform as it moves according to a drive path.

Figure 20:
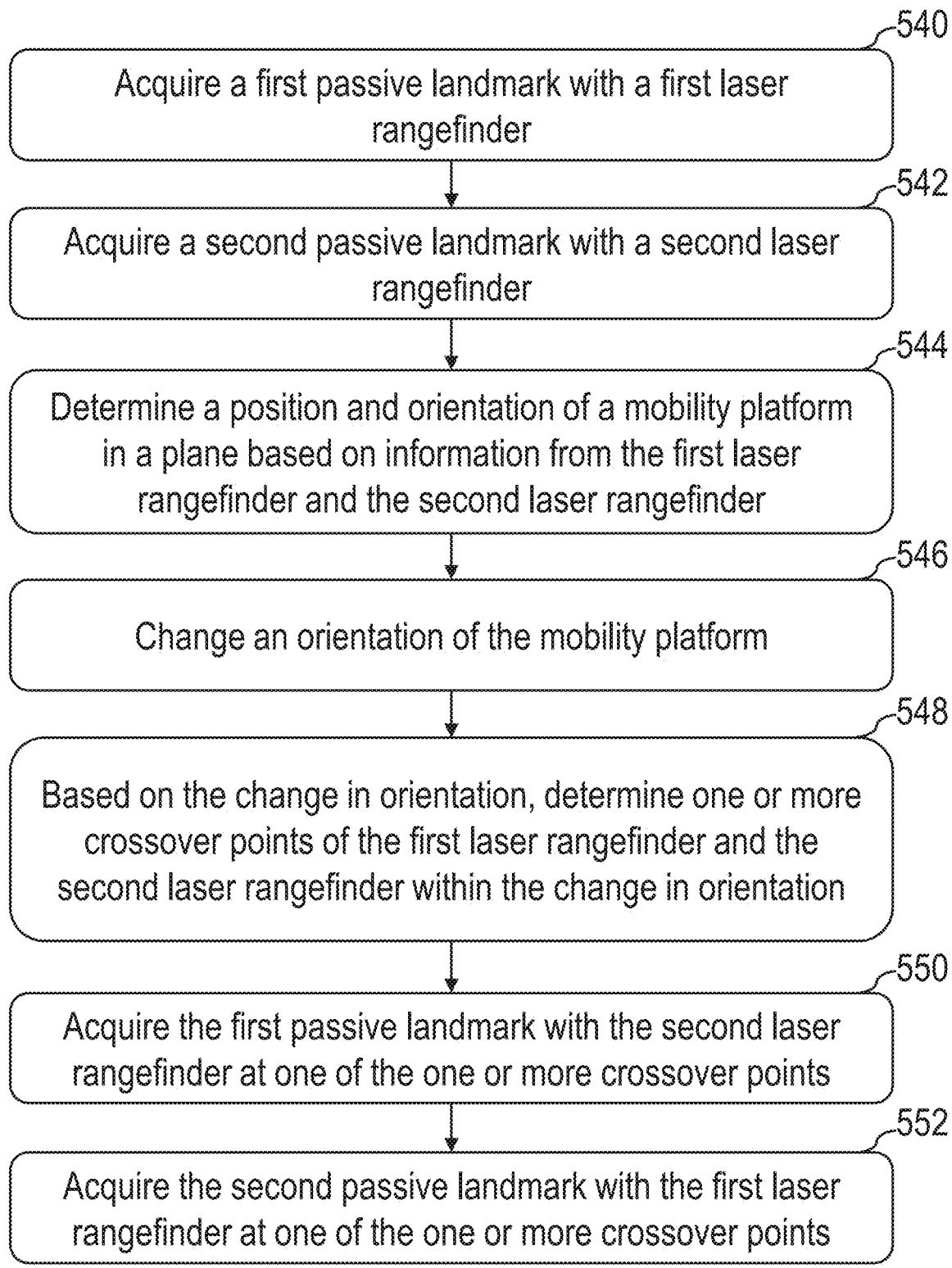
FIG. 20 is a block diagram for an exemplary embodiment of a method of operating a mobility platform.

FIG. 20 is a block diagram for an exemplary embodiment of a method of operating a mobility platform. In some embodiments, the method of FIG. 20 may be performed in whole or in part by a remote server of a construction assistance system as a part of a planning process for a drive path, and the output of the method of FIG. 20 may be provided to a mobility platform for execution within a worksite. In some embodiments, the method of FIG. 20 may be performed in whole or in part by a mobility platform in a worksite. In block 540, a first passive landmark is acquired by a first laser rangefinder according to exemplary methods described herein. In block 542, a second passive landmark is acquired by a second laser rangefinder according to exemplary methods described herein. In block 544, a position and orientation of the mobility platform is determined in a plane based on information from the first laser rangefinder and the second laser rangefinder. In block 546, an orientation of the mobility platform is changed. In some embodiments, a position of the mobility platform may be changed alternative to the change in orientation or in addition to the change in orientation. In block 548, based on the change in orientation, the method includes determining one or more crossover points of the first laser rangefinder and the second laser rangefinder within the change of orientation. In block 550, the method may include acquiring the first passive landmark with the second laser rangefinder at one of the one or more crossover points. In block 552 the method may include acquiring the second passive landmark with the first laser rangefinder at one of the one or more crossover points.

Figure 21:
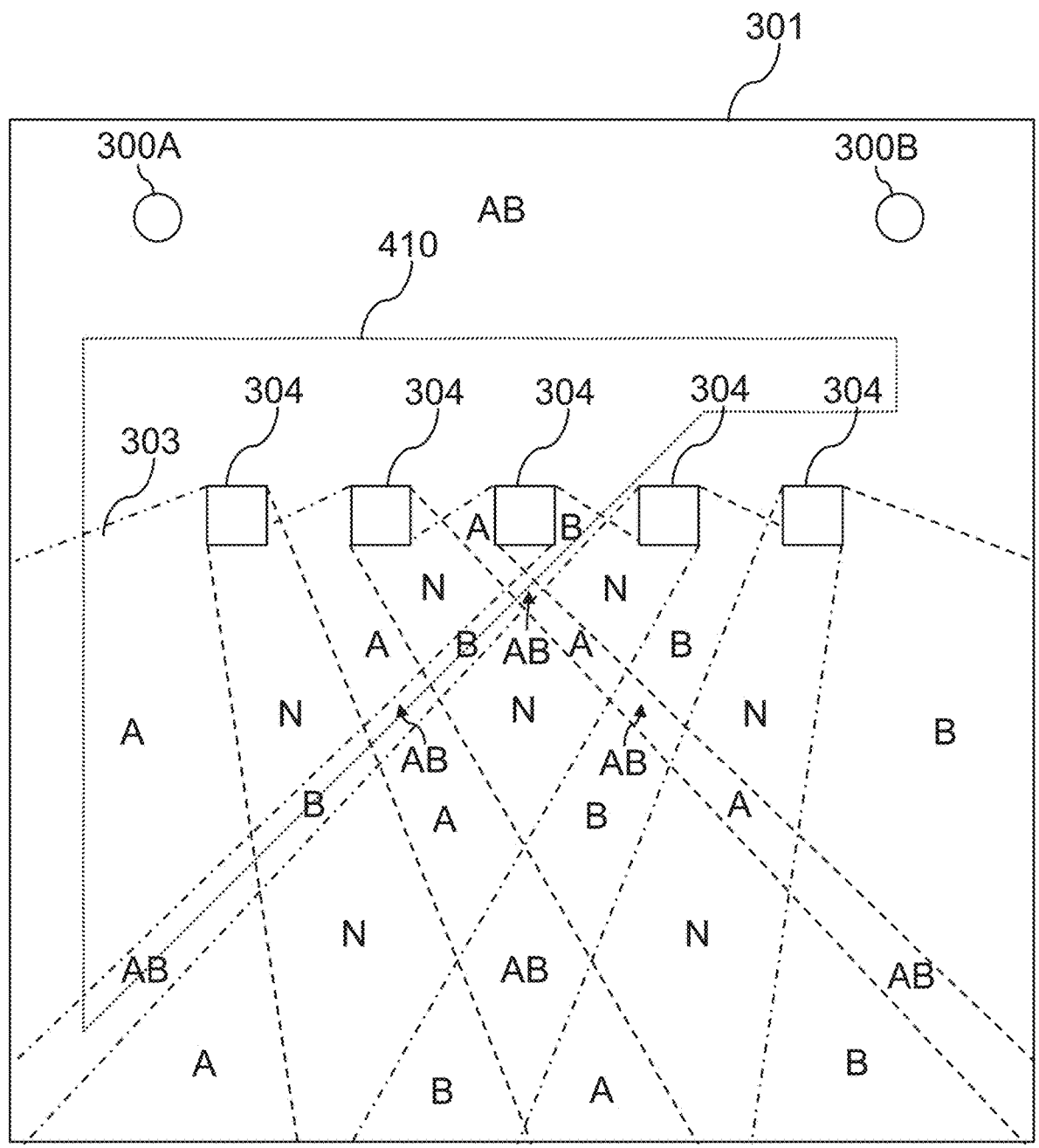
FIG. 21 is a schematic showing an exemplary embodiment a drive path and line of sight to two landmarks.

FIG. 21 is a schematic showing an exemplary embodiment a drive path 410 in a worksite 301 and line of sight to two passive landmarks 300A, 300B. In the embodiment of FIG. 21, the worksite is represented as a bounded box, however in some embodiments a worksite may be unbounded and may lack physical boundaries, as the present disclosure is not so limited. As shown in FIG. 21, a first passive landmark 300A and a second passive landmark 300B are placed in the worksite 301 at known points and may serve as references for position and orientation determination using laser rangefinder distance measurements as described herein. The drive path 410 represents a path a mobility platform may take within the worksite 301. The worksite of FIG. 21 includes a plurality of obstacles, which in the embodiment of FIG. 21 are columns 304. Line of sight between the various regions of the worksite 301 and the passive landmarks 300A, 300B are noted in text. Dashed lines indicate boundaries for line of sight to the first passive landmark 300A. Dash-dot lines indicate boundaries for line of sight to the second passive landmark 300B. Regions marked "A" have line of sight to the first passive landmark 300A only. Regions marked "B" have line of sight to the second passive landmark 300B only. Regions marked "AB" have line of sight to both the first passive landmark 300A and the second passive landmark 300B. Regions marked "N" have no line of sight to either the first passive landmark 300A or the second passive landmark 300B. A lack of line of sight means the mobility platform may not be able to measure a distance to the passive landmark that is block by an obstacle in the worksite. Accordingly, in regions where there is not line of sight to a particular passive landmark, that passive landmark may not be used for position and/or orientation determination.

According to some embodiments, line of sight to at least two landmarks may be used for a determination of position and orientation of a mobility platform. According to such embodiments, during a drive path 410 planning process, a landmark position placement process may occur. During the landmark placement process, positions for passive landmarks within the worksite may be determined (e.g., by a remote server based on the drive path 410). A user may then place the passive landmarks in the appropriate positions within the worksite to enable position and orientation determination by a mobility platform as the drive path is navigated and one or more associated tasks are performed. In some embodiments, a landmark placement process may include ensuring that at least two landmarks are within a line of sight to the mobility platform for all positions along the drive path 410. Accordingly, where there is line of sight to less than two passive landmarks, an additional passive landmark may be added to the worksite to supplement the already existing passive landmark locations.

Figure 22:
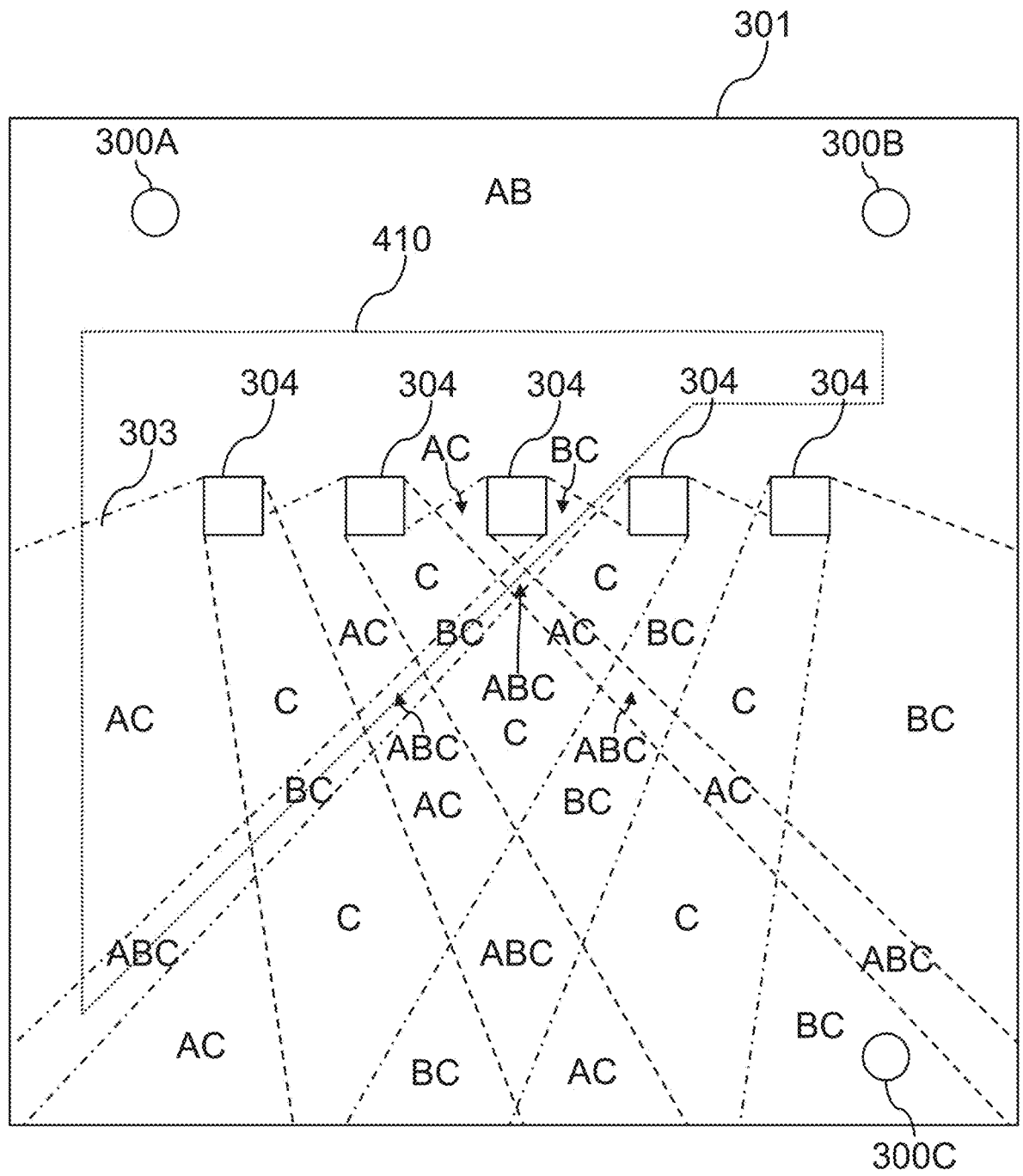
FIG. 22 is a schematic showing the drive path of FIG. 21 and line of sight to three landmarks.

In the drive path 410 of FIG. 21, the mobility platform may have line of sight to at least one of the first passive landmark 300A and the second passive landmark 300B for each position along the drive path. However, there are certain portions of the drive path where there is only line of sight to one of the first passive landmark 300A and the second passive landmark 300B. Accordingly, as shown in FIG. 22, a third passive landmark 300C may be added to the worksite 301 to supplement the first passive landmark 300A and the second passive landmark 300B. As shown in FIG. 22, with the third passive landmark added, each region is updated to reflect line of sight to the three passive landmarks. For each portion of the drive path 410 that had line of sight to less than two passive landmarks, the drive path now has line of sight to at least two passive landmarks. For example, region 303 and the portion of the drive path 410 therein only had line of sight to the first passive landmark 300A in FIG. 21. However, in FIG. 22, region 303 and the portion of the drive path 410 therein has line of sight to both the first passive landmark 300A and the newly placed third passive landmark 300C. Depending on the particular drive path, additional passive landmarks may be added to ensure line of sight coverage for each portion of the drive path. In some embodiments, additional passive landmarks may be added to ensure that there is line of sight to at least two passive landmarks for each region of the worksite 301, irrespective of the drive path 410.

Figure 23:
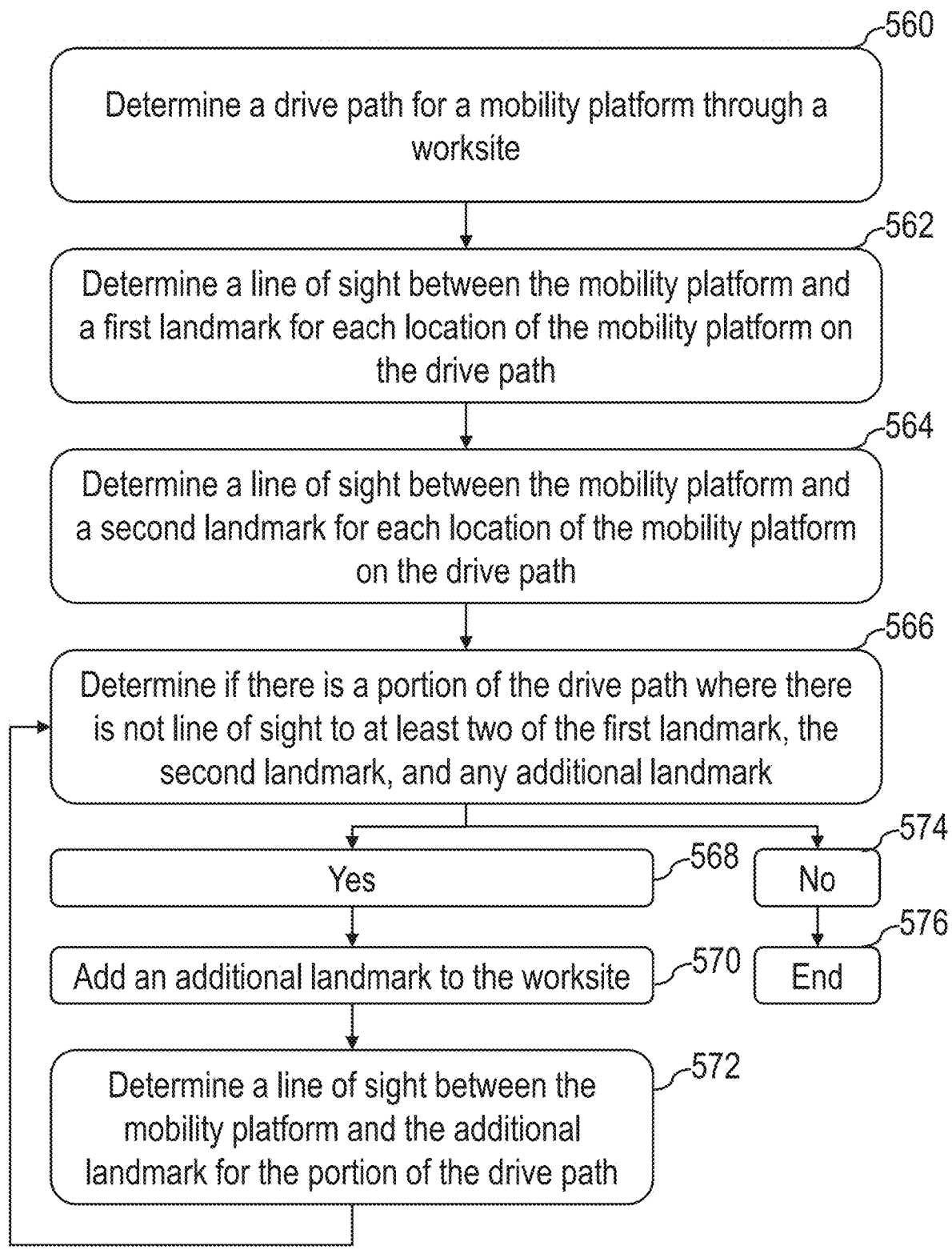
FIG. 23 is a block diagram for an exemplary embodiment of planning operation of a mobility platform.

FIG. 23 is a block diagram for an exemplary embodiment of planning operation of a mobility platform. In some embodiments, the method of FIG. 23 may be performed in whole or in part by a remote server of a construction assistance system as a part of a planning process for a drive path, and the output of the method of FIG. 23 may be provided to a mobility platform for execution within a worksite and a user for placement of landmarks in the worksite. In some embodiments, a "determination" may be a computation performed by a processor based on one or more data inputs and one or more sets of computer-readable instructions. In block 560, the method includes determining a drive path for a mobility platform through a worksite. The drive path may be based on the accomplishment of one or more tasks at one or more task locations within the worksite. In block 562, the method includes determining a line of sight between the mobility platform and a first landmark for each location of the mobility platform on the drive path. For example, the method may include generating a schematic similar to that of FIG. 21. In block 564, the method includes determining a line of sight between the mobility platform and a second landmark for each location of the mobility platform on the drive path. For example, the method may include generating a schematic similar to that of FIG. 21. In block 566, the method includes determining if there is a portion of the drive path where there is not line of sight to at least two of the first landmark, the second landmark, and any additional landmark. If the determination is no in block 574, the method may end and the drive path and landmark positions of the first landmark and the second landmark may be provided to a mobility platform and/or user in block 576. For example, the drive path and landmark positions may be communicated to the mobility platform via a communications network (e.g., wireless network). As another example, the drive path and/or landmark positions may be signified to a user so that the user may view the drive path and/or landmark positions. In some embodiments, the drive path and/or landmark positions may be displayed on a graphical user interface. In some embodiments, a user may accept, modify, or initiate regeneration of the drive path and/or landmark positions on the graphical user interface via user input. If the determination is yes in block 568, an additional landmark may be added to the worksite in block 570. In block 572, the method may include determining a line of sight between the mobility platform and the additional landmark for the portion of the drive path that lacks line of sight from block 566. Depending on the line of sight determined in block 572, the additional landmark position may be adjusted such that the entire portion of the drive path has line of sight to the additional landmark. The method may then return to block 566. Block 566 may function as a check that the entire drive path has line of sight to at least two passive landmarks in the worksite. Blocks 566, 568, 570, and 572 may be repeated as necessary until an entire drive path has appropriate line of sight coverage by passive landmarks.

Figure 24:
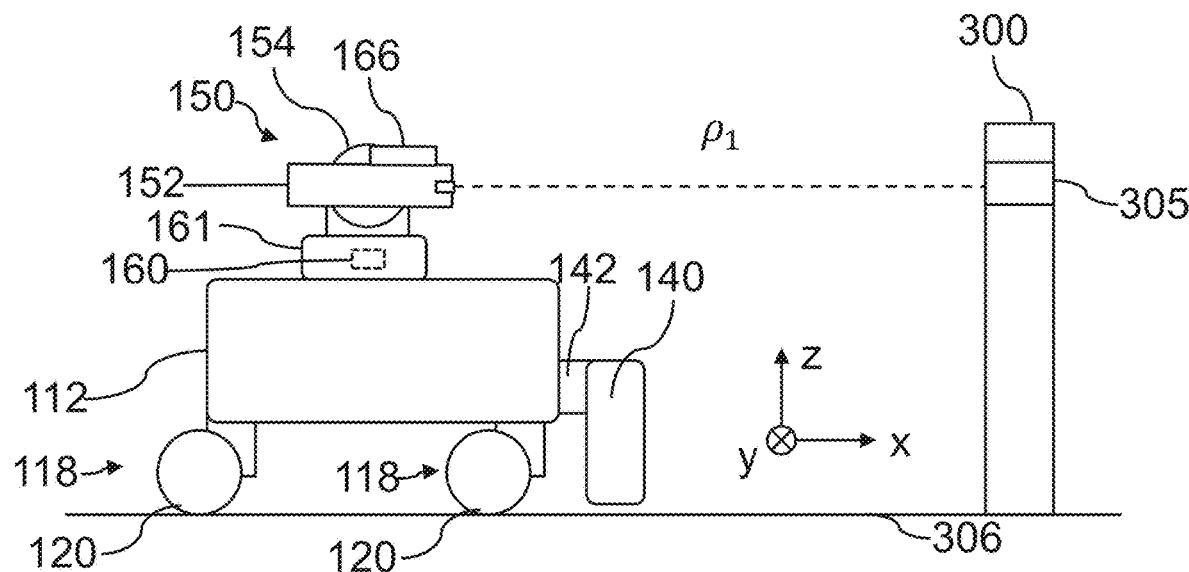
FIG. 24 is a side schematic view of an exemplary embodiment of a mobility platform with a first chassis pitch and a landmark.
Figure 25:
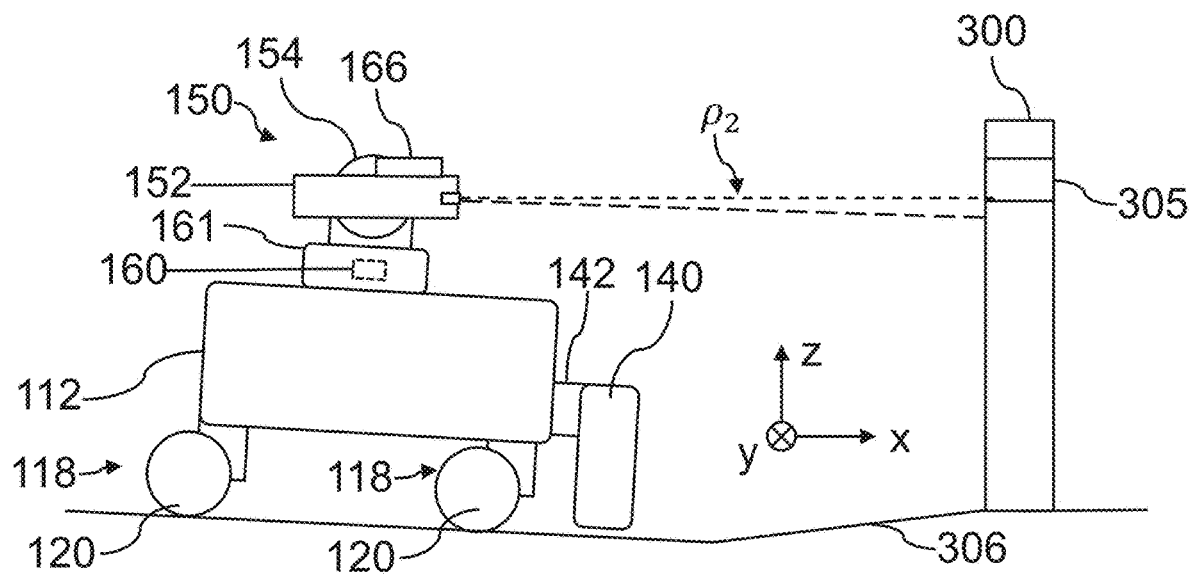
FIG. 25 is a side schematic view of the mobility platform FIG. 24 with a second chassis pitch.

FIG. 24 is a side schematic view of an exemplary embodiment of a passive landmark 300 and a mobility platform 110 with a first chassis pitch and FIG. 25 is a side schematic view of the mobility platform with a second chassis pitch. As shown in FIG. 24, the mobility platform is similar to that of FIGS. 5-6 and includes a chassis 112, wheel assemblies 118 including wheels 120, a laser rangefinder 150, and a marking device 140 attached to the chassis 112 via a carriage 142. The laser rangefinder 150 of FIGS. 24-25 operates similarly to that of FIGS. 7-9, and is able to adjust in a yaw direction (e.g., about the z axis) and a pitch direction (e.g., about the y axis or another axis disposed in the xy plane). In some embodiments as shown in FIGS. 24-25, the laser rangefinder 150 may include a camera 166 that may assist in feedback control of the laser rangefinder 150 and/or acquisition of the passive landmark 300 as described above.

According to the embodiment of FIGS. 24-25, the passive landmark 300 includes a landmark target range 305. The landmark target range 305 may be configured to be a location at an elevation that light emitted from the laser rangefinder 150 reflects off where the chassis 112 is horizontal (e.g., level) and the laser rangefinder 150 is also horizontal. For example, as shown in FIG. 24, the difference in pitch of the laser rangefinder to a pitch of the chassis 112 $\rho_1$ in the state of FIG. 24 is zero relative to a horizontal plane, and the light emitted from the laser rangefinder shown in the dashed line is configured to reflect off the landmark target range 305 on the passive landmark 300. The landmark target range 305 may have some tolerance as shown in FIGS. 24-25. In some embodiments, the landmark target range may have a different reflectivity, color, or other attribute compared to other portions of the passive landmark that may be detectable by the first laser rangefinder and/or the camera 166. In other embodiments, the target election range may be virtual, and the passive landmark 300 may have the same attributes for all elevations. As shown in FIG. 24, the mobility platform is disposed on a flat worksite floor 306 that is parallel to a horizontal plane (e.g., perpendicular to a direction of local gravity).

As shown in FIG. 25, in some cases the worksite floor 306 may not be completely flat and may change in elevation at different portions of the worksite. For example, as shown in FIG. 25, the mobility platform 110 is positioned on a decline in the worksite floor. The decline shown in FIG. 25 may be exaggerated for simplicity of explanation. Minor changes in worksite floor elevation may be important in construction practices, and the inventors have appreciated the benefits of measuring the topography of a worksite floor. In some embodiments, as the mobility platform 110 moves along a worksite floor, the laser rangefinder 150 may be maintained at a target elevation range. In some cases, the target elevation range may be aligned with the landmark target range 305. In some such embodiments, the pitch of the laser rangefinder may no longer be horizontal. The change of pitch of the laser rangefinder may be employed to determine a change in elevation of the mobility platform. Additionally, the change of the pitch of the laser rangefinder may be employed to determine a corresponding change in chassis pitch. Based on the chassis pitch, the elevation of the contact points between each of the wheels 120 may be determined based on the known distances between the wheels, chassis, and laser rangefinder. In some embodiments, the target elevation range may be maintaining alignment of the laser rangefinder with a horizontal plane. For example, as shown in FIG. 25, the laser rangefinder 150 may be kept horizontal, such that the light emitted from the laser rangefinder reflects from a lower portion of the passive landmark 300 compared to the state of FIG. 24. In some cases, maintaining the laser rangefinder within a horizontal plane may cause the light reflecting off the passive landmark 300 to fall outside of the landmark target range 305. A difference between the horizontal laser rangefinder pitch and the chassis pitch $\rho_2$ may be used to determine the chassis pitch. The chassis pitch may then be used to determine the elevation of the contact points between the wheels 120 and the floor 306. Such a process may be completed for the entirety of a drive path of the mobility platform, such that elevation data for each wheel 120 may be collected. The data may then be employed to generate a three-dimensional topographical map of the worksite floor 306 that may be beneficial for adjusting a construction plan, taking remedial measures to flatten the worksite floor, or otherwise informing user of the mobility platform.

In some embodiments, the process of determining an elevation of a worksite as described above for FIGS. 24-25 may extend to a second laser rangefinder. That is, in some embodiments a determination of elevation based on pitch information from a second laser rangefinder may performed. In some embodiments, use of a second laser rangefinder may allow a chassis roll angle to be determined. For example, the first laser rangefinder may fix a first point in three-dimensional space, and the second laser rangefinder may fix a second point in three-dimensional space. A unique three-dimensional vector between the first point and the second point may allow for a determination of orientation about the pitch and roll axes of the chassis 112 when combined with the pitch information from the first laser rangefinder and the second laser rangefinder. In this manner, the elevation of each of four wheels of a mobility platform may be determined based on the information from the first laser rangefinder and the second laser rangefinder.

Figure 26:
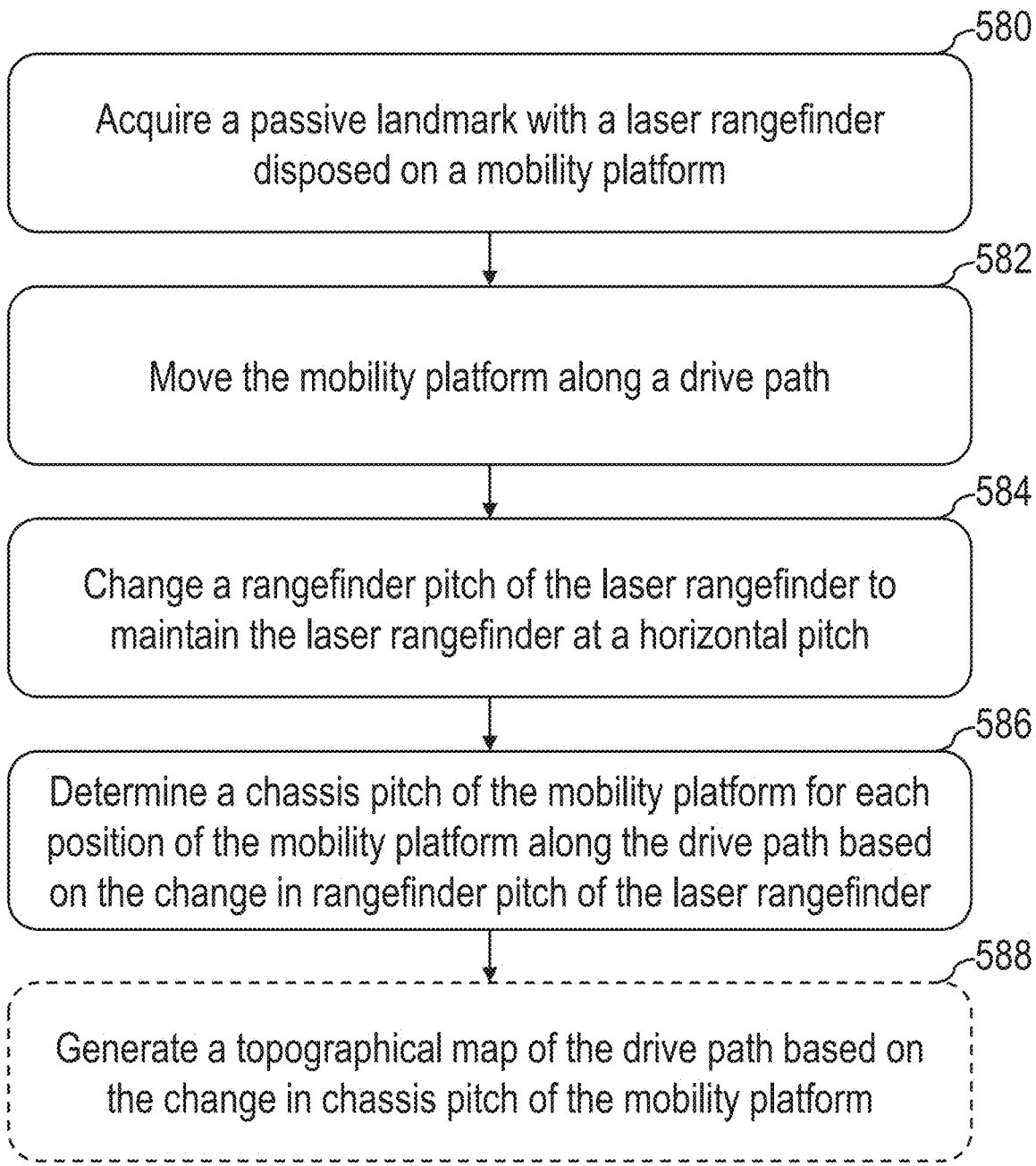
FIG. 26 is a block diagram for an exemplary embodiment of a method of operating a mobility platform.

FIG. 26 is a block diagram for an exemplary embodiment of a method of operating a mobility platform. In some embodiments, the method of FIG. 26 may be performed in whole or in part by a mobility platform in a worksite. In block 580, the method includes acquiring a passive landmark with a laser rangefinder (e.g., with a camera or sweep process). In block 582, the method includes moving the mobility platform along a drive path. In block 584, the method includes changing a rangefinder pitch of the laser rangefinder to maintain the laser rangefinder at a horizontal pitch (e.g., a target elevation range). In block 586, the method includes determining a chassis pitch of the mobility platform for each position of the mobility platform along the drive path based on the change in rangefinder pitch of the laser rangefinder. In optional block 588, the method includes generating a topographical map of the drive path based on the change in chassis pitch of the mobility platform. In some embodiments, data from blocks 584 and 586 may be sent to a remote server, which may process the data and perform the step of block 588.

Figure 27:
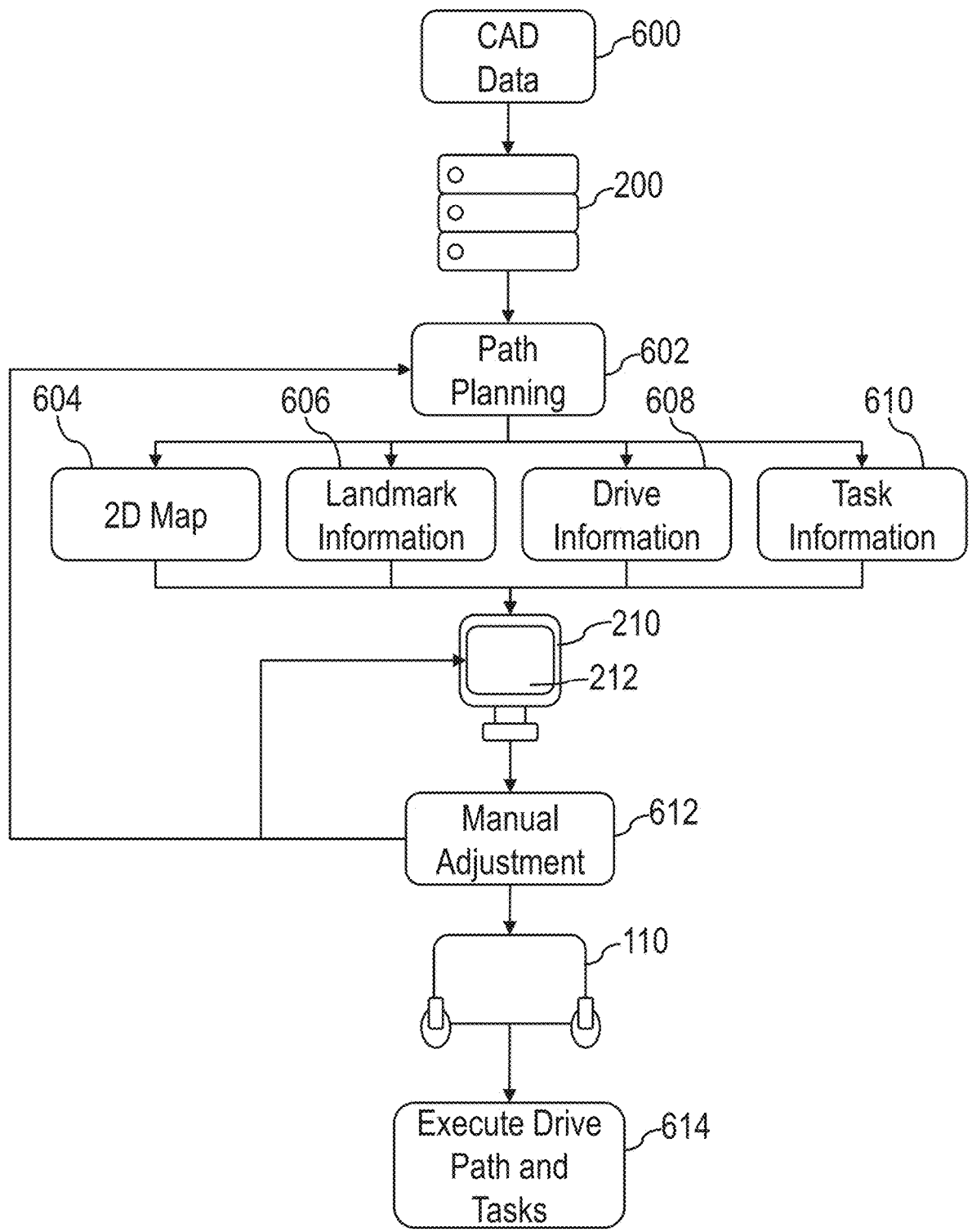
FIG. 27 is a block diagram for an exemplary embodiment of operating a construction assistance system.

FIG. 27 is a block diagram for an exemplary embodiment of operating a construction assistance system. The embodiment of FIG. 27 illustrates a process flow for a construction assistance system according to some embodiments. In block 600, CAD data or another file may be provided to a remote server 200 of the construction assistance system. As discussed above, the remote server may process the CAD data as a part of a path planning process in block 602. As a part of the path planning process, the remote server may generate a 2D map of a worksite in block 604, may generate landmark positions for landmark placement in a worksite in block 606, may generate drive information for moving the mobility platform along a drive path in block 608, and may generate task information 610 for the completion of one or more tasks at one or more task locations within the worksite. Input during the path planning process of block 602 may be received from a user at a user workstation 210 (e.g., via a graphical user interface 212). For example, a user may specify certain tasks and task locations for the task information 610. The completed drive path may be provided to the workstation 210 by the remote server 200 for validation and adjustment by a user. A user may verify the accuracy of a path plan, make appropriate corrections, or add additional input and recomplete the path planning process in block 612. The user may also validate the drive path, which may then be transmitted to the mobility platform 110 for execution. The mobility platform may execute the drive path and complete the tasks in block 614. Prior to execution of the drive path, a user may place passive landmarks in a worksite according to the landmark information of block 606.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

EXAMPLES

In one example, a mobility platform is provided. The mobility platform is configured to execute one or more tasks in a worksite with a first passive landmark disposed at a first known landmark position and a second passive landmark disposed at a second known landmark position. The mobility platform comprises: a chassis; a drive system supporting the chassis, wherein the drive system comprises at least two wheels, wherein the drive system is configured to move the mobility platform within the worksite; a first laser rangefinder disposed on the chassis at a first location; a second laser rangefinder disposed on the chassis at a second location different than the first location; and at least one processor configured to: acquire the first passive landmark with the first laser rangefinder, acquire the second passive landmark with the second laser rangefinder, determine a first position of the chassis based on: a first distance measured by the first laser rangefinder between the first location and the first known landmark position, and a second distance measured by the second laser rangefinder between the second location and the second known landmark position, and determine a first orientation of the mobility platform based on first yaw angle information from at least one of the first laser rangefinder and the second laser rangefinder.

Optionally, the mobility platform may include one or more of the following attributes:
  a. The drive system is a holonomic drive system.
  b. The drive system comprises four wheel assemblies, wherein each of the four wheel assemblies comprises: a wheel configured to rotate about a wheel axis, a first actuator configured to rotate the wheel about the wheel axis, and a second actuator configured to rotate the wheel about a pivot axis perpendicular to the wheel axis.
  c. The mobility platform further comprises four wheel odometers, wherein each one of the four wheel odometers is configured to measure a distance traveled by one of the four wheel assemblies, wherein the at least one processor is further configured to estimate a change in position of the chassis from the first position based on odometry information from the four wheel odometers.
  d. The mobility platform further comprises a marking device disposed on the chassis and configured to deposit marking material on a floor of the worksite.
  e. Acquiring the first passive landmark with the first laser rangefinder comprises: sweep the worksite with the first laser rangefinder to collect first sweep information; detect the first known landmark position of the first passive landmark based on the first sweep information; and orient the first laser rangefinder toward the first passive landmark based on the first known landmark position.
  f. Detecting the first known landmark position of the first passive landmark comprises detecting a shape of the first passive landmark.
  g. Detecting the first known landmark position of the first passive landmark comprises detecting a color of the first passive landmark.
  h. The mobility platform further comprises at least one camera, wherein acquiring the first passive landmark comprises: identifying the first known landmark position of the first passive landmark with the at least one camera; and orienting the first laser rangefinder toward the first passive landmark based on the first known landmark position.
  i. The at least one processor is further configured to, based on information from the at least one camera: track the first passive landmark with the first laser rangefinder; and track the second passive landmark with the second laser rangefinder.
  j. The at least one processor is further configured to command the drive system to move the mobility platform along a drive path to perform the one or more tasks at one or more task locations in the worksite.
  k. The one or more tasks comprise marking a floor of the worksite with a marking material.
  l. The at least one processor is further configured to, based on odometry information from at least one odometry sensor: track the first passive landmark with the first laser rangefinder; and track the second passive landmark with the second laser rangefinder.
  m. The at least one processor is further configured to command the drive system to stop the mobility platform at the one or more task locations in the worksite, and, upon commanding the drive system to stop: reacquire the first passive landmark with the first laser rangefinder; reacquire the second passive landmark with the second laser rangefinder; determine a second position of the chassis based on: the first distance measured by the first laser rangefinder between the first location and the first known landmark position, and the second distance measured by the second laser rangefinder between the second location and the second known landmark position, and determine a second orientation of the mobility platform based on second yaw angle information from at least one of the first laser rangefinder and the second laser rangefinder.
  n. The at least one processor is further configured to: detect a discontinuity in the first distance measured by the first laser rangefinder; and upon detecting the discontinuity in the first distance measured by the first laser rangefinder, reacquire the first passive landmark with the first laser rangefinder.
  o. The at least one processor is further configured to: detect a discontinuity in the first distance measured by the first laser rangefinder; and upon detecting the discontinuity in the first distance measured by the first laser rangefinder, acquire a third passive landmark disposed in the worksite at a third known landmark position with the first laser rangefinder.
  p. The discontinuity in the first distance measured by the first laser rangefinder is a change in the measured first distance above a range change threshold.
  q. The at least one processor is further configured to command the drive system to move the mobility platform to a third orientation based on the drive path and the one or more task locations.
  r. The at least one processor is further configured to: determine a crossover point of the first laser rangefinder and the second laser rangefinder within the movement of the mobility platform to the third orientation; acquire the first passive landmark with the second laser rangefinder at the crossover point; and acquire the second passive landmark with the first laser rangefinder at the crossover point.
  s. The at least one processor is further configured to: acquire a third passive landmark disposed at a third unknown landmark position with the first laser rangefinder; and determine the third unknown landmark position based on: the first position of the chassis, a third distance measured by the first laser rangefinder between the first location and the third unknown landmark position, and yaw angle information from the first laser rangefinder.

In another example, a mobility platform may operate in a worksite according to a method. The mobility platform comprises a chassis, a first laser rangefinder disposed at a first location on the chassis, a second laser rangefinder disposed at a second location on the chassis, and a drive system. The method comprises: acquiring a first passive landmark disposed at a first known landmark position with the first laser rangefinder; acquiring a second passive landmark disposed at a second known landmark position with the second laser rangefinder; determine a first position of the chassis based on: a first distance measured by the first laser rangefinder between the first location and the first known landmark position, and a second distance measured by the second laser rangefinder between the second location and the second known landmark position, and determine a first orientation of the mobility platform based on first yaw angle information from at least one of the first laser rangefinder and the second laser rangefinder.

Optionally, the method may include one or more of the following attributes:
  a. Acquiring the first passive landmark comprises: sweeping the worksite with the first laser rangefinder to collect first sweep information; detecting the first known landmark position of the first passive landmark based on the first sweep information; and orienting the first laser rangefinder toward the first passive landmark based on the first known landmark position.
b. Detecting the first known landmark position of the first passive landmark comprises detecting a shape of the first passive landmark.
c. Detecting the first known landmark position of the first passive landmark comprises detecting a color of the first passive landmark.
d. The method further comprises acquiring the first passive landmark comprises: identifying the first known landmark position of the first passive landmark with at least one camera of the mobility platform; and orienting the first laser rangefinder toward the first passive landmark based on the first known landmark position.
e. The method further comprises, based on information from the at least one camera: tracking the first passive landmark with the first laser rangefinder; and tracking the second passive landmark with the second laser rangefinder.
f. The method further comprises moving the mobility platform along a drive path to perform one or more tasks at one or more task locations in the worksite.
g. The one or more tasks comprise marking a floor of the worksite with a marking material.
h. The method further comprises, based on odometry information from at least one odometry sensor of the mobility platform: tracking the first passive landmark with the first laser rangefinder, and tracking the second passive landmark with the second laser rangefinder.
i. The method further comprises stopping the mobility platform at the one or more task locations in the worksite, and, upon stopping the mobility platform: reacquiring the first passive landmark with the first laser rangefinder; reacquiring the second passive landmark with the second laser rangefinder; determining a second position of the chassis based on: the first distance measured by the first laser rangefinder between the first location and the first known landmark position, and the second distance measured by the second laser rangefinder between the second location and the second known landmark position, and determining a second orientation of the mobility platform based on second yaw angle information from at least one of the first laser rangefinder and the second laser rangefinder.
j. The method further comprises detecting a discontinuity in the first distance measured by the first laser rangefinder; and upon detecting the discontinuity in the first distance measured by the first laser rangefinder, reacquiring the first passive landmark with the first laser rangefinder.
k. The method further comprises detecting a discontinuity in the first distance measured by the first laser rangefinder; and upon detecting the discontinuity in the first distance measured by the first laser rangefinder, acquiring a third passive landmark disposed in the worksite at a third known landmark position with the first laser rangefinder.
l. The discontinuity in the first distance measured by the first laser rangefinder is a change in the measured first distance above a range change threshold.
m. The method further comprises moving the mobility platform to a third orientation based on the drive path and the one or more task locations.
n. The method further comprises determining a crossover point of the first laser rangefinder and the second laser rangefinder within the movement of the mobility platform to the third orientation; acquiring the first passive landmark with the second laser rangefinder at the crossover point; and acquiring the second passive landmark with the second laser rangefinder at the crossover point.
o. The method further comprises acquiring a third passive landmark disposed at a third unknown landmark position with the first laser rangefinder; and determining the third unknown landmark position based on: the first position of the chassis, a third distance measured by the first laser rangefinder between the first location and the third unknown landmark position, and yaw angle information from the first laser rangefinder.

In another example, a non-transitory computer-readable storage medium storing instructions is provided. The instructions, when executed by at least one processor, cause the at least one processor to perform a method for operating a mobility platform in a worksite. The mobility platform comprises a chassis, a first laser rangefinder disposed at a first location on the chassis, a second laser rangefinder disposed at a second location on the chassis, and a drive system. The method comprises: acquiring a first passive landmark disposed at a first known landmark position with the first laser rangefinder; acquiring a second passive landmark disposed at a second known landmark position with the second laser rangefinder; determine a first position of the chassis based on: a first distance measured by the first laser rangefinder between the first location and the first known landmark position, and a second distance measured by the second laser rangefinder between the second location and the second known landmark position, and determine a first orientation of the mobility platform based on first yaw angle information from at least one of the first laser rangefinder and the second laser rangefinder.

Optionally, the method may include one or more of the following attributes:
a. Acquiring the first passive landmark comprises: sweeping the worksite with the first laser rangefinder to collect first sweep information; detecting the first known landmark position of the first passive landmark based on the first sweep information; and orienting the first laser rangefinder toward the first passive landmark based on the first known landmark position.
b. Detecting the first known landmark position of the first passive landmark comprises detecting a shape of the first passive landmark.
c. Detecting the first known landmark position of the first passive landmark comprises detecting a color of the first passive landmark.
d. The method further comprises acquiring the first passive landmark comprises: identifying the first known landmark position of the first passive landmark with at least one camera of the mobility platform; and orienting the first laser rangefinder toward the first passive landmark based on the first known landmark position.
e. The method further comprises, based on information from the at least one camera: tracking the first passive landmark with the first laser rangefinder; and tracking the second passive landmark with the second laser rangefinder.
f. The method further comprises moving the mobility platform along a drive path to perform one or more tasks at one or more task locations in the worksite.

g. The one or more tasks comprise marking a floor of the worksite with a marking material.
h. The method further comprises, based on odometry information from at least one odometry sensor of the mobility platform: tracking the first passive landmark with the first laser rangefinder, and tracking the second passive landmark with the second laser rangefinder.
i. The method further comprises stopping the mobility platform at the one or more task locations in the worksite, and, upon stopping the mobility platform: reacquiring the first passive landmark with the first laser rangefinder; reacquiring the second passive landmark with the second laser rangefinder; determining a second position of the chassis based on: the first distance measured by the first laser rangefinder between the first location and the first known landmark position, and the second distance measured by the second laser rangefinder between the second location and the second known landmark position, and determining a second orientation of the mobility platform based on second yaw angle information from at least one of the first laser rangefinder and the second laser rangefinder.
j. The method further comprises detecting a discontinuity in the first distance measured by the first laser rangefinder; and upon detecting the discontinuity in the first distance measured by the first laser rangefinder, reacquiring the first passive landmark with the first laser rangefinder.
k. The method further comprises detecting a discontinuity in the first distance measured by the first laser rangefinder; and upon detecting the discontinuity in the first distance measured by the first laser rangefinder, acquiring a third passive landmark disposed in the worksite at a third known landmark position with the first laser rangefinder.
l. The discontinuity in the first distance measured by the first laser rangefinder is a change in the measured first distance above a range change threshold.
m. The method further comprises moving the mobility platform to a third orientation based on the drive path and the one or more task locations.
n. The method further comprises determining a crossover point of the first laser rangefinder and the second laser rangefinder within the movement of the mobility platform to the third orientation; acquiring the first passive landmark with the second laser rangefinder at the crossover point; and acquiring the second passive landmark with the second laser rangefinder at the crossover point.
o. The method further comprises acquiring a third passive landmark disposed at a third unknown landmark position with the first laser rangefinder; and determining the third unknown landmark position based on: the first position of the chassis, a third distance measured by the first laser rangefinder between the first location and the third unknown landmark position, and yaw angle information from the first laser rangefinder.

In yet a further example, a method of placing landmarks in a worksite is provided. The method comprises: obtaining obstacle information within the worksite; with at least one processor: computing a drive path for a mobility platform through the worksite based on one or more tasks to be performed in the worksite at one or more task locations, computing a first landmark position for a first passive landmark within the worksite, computing a second landmark position for a second passive landmark within the worksite, computing a line of sight between the mobility platform and the first passive landmark at the first landmark position and the second passive landmark at the second landmark position for each location on the drive path, computing if there is a portion of the drive path where there is a line of sight to less than both of the first passive landmark and the second passive landmark, and upon determining there is a portion of the drive path where there is line of sight to less than both the first passive landmark and the second passive landmark, computing a third landmark position for a third passive landmark at the worksite; and signifying the first landmark position, second landmark position and third landmark position to a user.

Optionally, the method may include one or more of the following attributes.
a. Computing the line of sight between the mobility platform and the first passive landmark at the first landmark position and the second passive landmark at the second landmark position is based on the obstacle information.
b. The third landmark position has line of sight to the portion of the drive path where there is line of sight to less than both of the first passive landmark or the second passive landmark.
c. The method further comprises: with the at least one processor, computing that an entirety of the drive path has line of sight to at least two of the first passive landmark, the second passive landmark, and the third passive landmark; and communicating the drive path, the first landmark position, the second landmark position, and the third landmark position to the mobility platform.
d. The method further comprises: with the at least one processor, computing a reorientation of the mobility platform within the drive path based on the one or more task locations and the obstacle information.
e. The method further comprises: with the at least one processor: computing a crossover point of a first laser rangefinder and a second laser rangefinder of the mobility platform within the reorientation of the mobility platform; and adjusting at least one of the first landmark position, the second landmark position, and the third landmark position to eliminate the crossover point of the first laser rangefinder and the second laser rangefinder.
f. The method further comprises: with the at least one processor: computing a line of sight between the mobility platform and the first passive landmark at the first landmark position, the second passive landmark at the second landmark position, and the third passive landmark at the third landmark position for each location of the mobility platform on the drive path; computing if there is a second portion of the drive path where there is line of sight to less than at least two of the first passive landmark, the second passive landmark, and the third passive landmark; and upon computing there is a second portion of the drive path where there is line of sight to less than at least two of the first passive landmark, the second passive landmark, and the third passive landmark, computing a fourth landmark position for a fourth passive landmark at the worksite.
g. The method further comprises: placing the first passive landmark at the first landmark position in the worksite; placing the second passive landmark at the second landmark position in the worksite; and placing the third passive landmark at the third landmark position in the worksite.

h. Signifying the first landmark position, the second landmark position, and the third landmark position to a user comprises displaying the first landmark position, the second landmark position, and the third landmark position at a graphical user interface.

In yet another example, a non-transitory computer-readable storage medium storing instructions is provided. The instructions, when executed by at least one processor, cause the at least one processor to perform a method of placing landmarks in a worksite. The method comprises: computing a drive path for a mobility platform through the worksite based on one or more tasks to be performed in the worksite at one or more task locations, computing a first landmark position for a first passive landmark within the worksite, computing a second landmark position for a second passive landmark within the worksite, computing a line of sight between the mobility platform and the first passive landmark at the first landmark position and the second passive landmark at the second landmark position for each location on the drive path, computing if there is a portion of the drive path where there is a line of sight to less than both of the first passive landmark and the second passive landmark, and upon determining there is a portion of the drive path where there is line of sight to less than both the first passive landmark and the second passive landmark, computing a third landmark position for a third passive landmark at the worksite; and signifying the first landmark position, second landmark position and third landmark position to a user.

Optionally, the method may include one or more of the following attributes.

a. Computing the line of sight between the mobility platform and the first passive landmark at the first landmark position and the second passive landmark at the second landmark position is based on the obstacle information.

b. The third landmark position has line of sight to the portion of the drive path where there is line of sight to less than both of the first passive landmark or the second passive landmark.

c. The method further comprises: with the at least one processor, computing that an entirety of the drive path has line of sight to at least two of the first passive landmark, the second passive landmark, and the third passive landmark; and communicating the drive path, the first landmark position, the second landmark position, and the third landmark position to the mobility platform.

d. The method further comprises: with the at least one processor, computing a reorientation of the mobility platform within the drive path based on the one or more task locations and the obstacle information.

e. The method further comprises: with the at least one processor: computing a crossover point of a first laser rangefinder and a second laser rangefinder of the mobility platform within the reorientation of the mobility platform; and adjusting at least one of the first landmark position, the second landmark position, and the third landmark position to eliminate the crossover point of the first laser rangefinder and the second laser rangefinder.

f. The method further comprises: with the at least one processor: computing a line of sight between the mobility platform and the first passive landmark at the first landmark position, the second passive landmark at the second landmark position, and the third passive landmark at the third landmark position for each location of the mobility platform on the drive path; computing if there is a second portion of the drive path where there is line of sight to less than at least two of the first passive landmark, the second passive landmark, and the third passive landmark; and upon computing there is a second portion of the drive path where there is line of sight to less than at least two of the first passive landmark, the second passive landmark, and the third passive landmark, computing a fourth landmark position for a fourth passive landmark at the worksite.

g. The method further comprises: placing the first passive landmark at the first landmark position in the worksite; placing the second passive landmark at the second landmark position in the worksite; and placing the third passive landmark at the third landmark position in the worksite.

h. Signifying the first landmark position, the second landmark position, and the third landmark position to a user comprises displaying the first landmark position, the second landmark position, and the third landmark position at a graphical user interface.

In yet another example, a method for operating a mobility platform in a worksite is provided. The mobility platform comprises a chassis, a first laser rangefinder disposed on the chassis, and a drive system comprising at least one wheel. The method comprises: acquiring a first passive landmark with the first laser rangefinder; moving the mobility platform along a drive path with the drive system; changing a first rangefinder pitch of the first laser rangefinder to maintain the first laser rangefinder at a first target elevation range on the first passive landmark as the mobility platform moves along the drive path; determining a chassis pitch of the mobility platform for each position of the mobility platform along the drive path based on the change in the first rangefinder pitch of the first laser rangefinder; and for each position of the mobility platform along the drive path, determining an elevation of the worksite at the at least one wheel based on the chassis pitch.

Optionally, the method may include one or more of the following attributes:

a. Changing the first rangefinder pitch comprises commanding an actuator to move the first laser rangefinder.

b. The drive system is a holonomic drive system.

c. The at least one wheel is four wheels, wherein the drive system comprises four wheel assemblies, wherein each of the four wheel assemblies comprises: a wheel of the four wheels configured to rotate about a wheel axis, a first actuator configured to rotate the wheel about the wheel axis, and a second actuator configured to rotate the wheel about a pivot axis perpendicular to the wheel axis.

d. The mobility platform further comprises a second laser rangefinder disposed on the chassis, wherein the method further comprises: acquiring a second passive landmark with the second laser rangefinder; changing a second rangefinder pitch of the second laser rangefinder to maintain the second laser rangefinder at a second target elevation range on the second passive landmark as the mobility platform moves along the drive path; determining a second chassis pitch of the mobility platform for each position of the mobility platform along the drive path based on the change in the second rangefinder pitch of the second laser rangefinder; and for each position of the mobility platform along the drive path, determining an elevation of the worksite at the at least one wheel based on the chassis pitch and the second chassis pitch.

e. The method further comprises generating a topographical map of the drive path based on elevation of the worksite for each position of the mobility platform along the drive path.
f. Acquiring the first passive landmark comprises: sweeping the worksite with the first laser rangefinder to collect first sweep information; detecting a first landmark position of the first passive landmark based on the first sweep information; and orienting the first laser rangefinder toward the first passive landmark based on the first landmark position.
g. Detecting the first landmark position of the first passive landmark comprises detecting a shape of the first passive landmark.
h. Detecting the first landmark position of the first passive landmark comprises detecting a reflectivity threshold of the first passive landmark.
i. Detecting the first landmark position of the first passive landmark comprises detecting a color of the first passive landmark.
j. Acquiring the first passive landmark comprises: identifying a first landmark position of the first passive landmark with at least one camera of the mobility platform; and orienting the first laser rangefinder toward the first passive landmark based on the first landmark position.
k. The method further comprises: based on odometry information from at least one odometry sensor of the mobility platform, tracking the first passive landmark with the first laser rangefinder.
l. The method further comprises detecting a discontinuity in information from the first laser rangefinder; and upon detecting the discontinuity in the information from the first laser rangefinder, reacquiring the first passive landmark with the first laser rangefinder.
m. The method further comprises: detecting a discontinuity in information from the first laser rangefinder; and upon detecting the discontinuity in the information from the first laser rangefinder, acquiring a third passive landmark disposed in the worksite with the first laser rangefinder.
n. Discontinuity in the information is a change in distance measured above a range change threshold.

In yet another example, a non-transitory computer-readable storage medium storing instructions is provided. The instructions, when executed by at least one processor, cause the at least one processor to perform a method for operating a mobility platform. The mobility platform comprises a chassis, a first laser rangefinder disposed on the chassis, and a drive system comprising at least one wheel. The method comprises: acquiring a first passive landmark with the first laser rangefinder; moving the mobility platform along a drive path with the drive system; changing a first rangefinder pitch of the first laser rangefinder to maintain the first laser rangefinder at a first target elevation range on the first passive landmark as the mobility platform moves along the drive path; determining a chassis pitch of the mobility platform for each position of the mobility platform along the drive path based on the change in the first rangefinder pitch of the first laser rangefinder; and for each position of the mobility platform along the drive path, determining an elevation of the worksite at the at least one wheel based on the chassis pitch.

Optionally, the method may include one or more of the following attributes:
a. Changing the first rangefinder pitch comprises commanding an actuator to move the first laser rangefinder.
b. The drive system is a holonomic drive system.
c. The at least one wheel is four wheels, wherein the drive system comprises four wheel assemblies, wherein each of the four wheel assemblies comprises: a wheel of the four wheels configured to rotate about a wheel axis, a first actuator configured to rotate the wheel about the wheel axis, and a second actuator configured to rotate the wheel about a pivot axis perpendicular to the wheel axis.
d. The mobility platform further comprises a second laser rangefinder disposed on the chassis, wherein the method further comprises: acquiring a second passive landmark with the second laser rangefinder; changing a second rangefinder pitch of the second laser rangefinder to maintain the second laser rangefinder at a second target elevation range on the second passive landmark as the mobility platform moves along the drive path; determining a second chassis pitch of the mobility platform for each position of the mobility platform along the drive path based on the change in the second rangefinder pitch of the second laser rangefinder; and for each position of the mobility platform along the drive path, determining an elevation of the worksite at the at least one wheel based on the chassis pitch and the second chassis pitch.
e. The method further comprises generating a topographical map of the drive path based on elevation of the worksite for each position of the mobility platform along the drive path.
f. Acquiring the first passive landmark comprises: sweeping the worksite with the first laser rangefinder to collect first sweep information; detecting a first landmark position of the first passive landmark based on the first sweep information; and orienting the first laser rangefinder toward the first passive landmark based on the first landmark position.
g. Detecting the first landmark position of the first passive landmark comprises detecting a shape of the first passive landmark.
h. Detecting the first landmark position of the first passive landmark comprises detecting a reflectivity threshold of the first passive landmark.
i. Detecting the first landmark position of the first passive landmark comprises detecting a color of the first passive landmark.
j. Acquiring the first passive landmark comprises: identifying a first landmark position of the first passive landmark with at least one camera of the mobility platform; and orienting the first laser rangefinder toward the first passive landmark based on the first landmark position.
k. The method further comprises: based on odometry information from at least one odometry sensor of the mobility platform, tracking the first passive landmark with the first laser rangefinder.
l. The method further comprises detecting a discontinuity in information from the first laser rangefinder; and upon detecting the discontinuity in the information from the first laser rangefinder, reacquiring the first passive landmark with the first laser rangefinder.
m. The method further comprises: detecting a discontinuity in information from the first laser rangefinder; and upon detecting the discontinuity in the information from the first laser rangefinder, acquiring a third passive landmark disposed in the worksite with the first laser rangefinder.

n. Discontinuity in the information is a change in distance measured above a range change threshold.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A mobility platform configured to execute one or more tasks in a worksite comprising a first passive landmark disposed at a first known landmark position and a second passive landmark disposed at a second known landmark position, the mobility platform comprising:
   a chassis;
   a drive system supporting the chassis, wherein the drive system comprises at least two wheels, wherein the drive system is configured to move the mobility platform within the worksite;
   a first laser rangefinder disposed on the chassis at a first location;
   a second laser rangefinder disposed on the chassis at a second location different than the first location; and
   a plurality of wheel odometers, wherein each of the plurality of wheel odometers is associated with a respective wheel of the at least two wheels and is configured to measure a distance traveled by the respective wheel;
   at least one processor configured to:
      acquire the first passive landmark with the first laser rangefinder,
      acquire the second passive landmark with the second laser rangefinder,
      determine a first position of the chassis based on:
         a first distance measured by the first laser rangefinder between the first location and the first known landmark position, and
         a second distance measured by the second laser rangefinder between the second location and the second known landmark position,
      determine a first orientation of the mobility platform based on first yaw angle information from at least one of the first laser rangefinder and the second laser rangefinder; and
      estimate a change in position of the chassis from the first position based on odometry information from the plurality of wheel odometers.

2. The mobility platform of claim 1, wherein:
   the drive system comprises four wheel assemblies, wherein each of the four wheel assemblies comprises:
      a wheel configured to rotate about a wheel axis,
      a first actuator configured to rotate the wheel about the wheel axis, and
      a second actuator configured to rotate the wheel about a pivot axis perpendicular to the wheel axis.

3. The mobility platform of claim 1, further comprising a marking device disposed on the chassis and configured to deposit marking material on a floor of the worksite.

4. The mobility platform of claim 1, wherein acquiring the first passive landmark with the first laser rangefinder comprises:
   sweep the worksite with the first laser rangefinder to collect first sweep information;
   detect the first known landmark position of the first passive landmark based on the first sweep information; and
   orient the first laser rangefinder toward the first passive landmark based on the first known landmark position.

5. The mobility platform of claim 4, wherein detecting the first known landmark position of the first passive landmark comprises:
   detecting a shape of the first passive landmark; and/or
   detecting a color of the first passive landmark.

6. The mobility platform of claim 1, further comprising at least one camera, wherein acquiring the first passive landmark comprises:
   identifying the first known landmark position of the first passive landmark with the at least one camera; and
   orienting the first laser rangefinder toward the first passive landmark based on the first known landmark position.

7. The mobility platform of claim 6, wherein the at least one processor is further configured to, based on information from the at least one camera and/or from the plurality of wheel odometers:
   track the first passive landmark with the first laser rangefinder; and
   track the second passive landmark with the second laser rangefinder.

8. The mobility platform of claim 1, wherein the at least one processor is further configured to command the drive system to stop the mobility platform at one or more task locations in the worksite, and, upon commanding the drive system to stop:
   reacquire the first passive landmark with the first laser rangefinder;
   reacquire the second passive landmark with the second laser rangefinder;
   determine a second position of the chassis based on:
      the first distance measured by the first laser rangefinder between the first location and the first known landmark position, and
      the second distance measured by the second laser rangefinder between the second location and the second known landmark position, and determine a second orientation of the mobility platform based on second yaw angle information from at least one of the first laser rangefinder and the second laser rangefinder.

9. The mobility platform of claim 8, wherein the at least one processor is further configured to:
command the drive system to move the mobility platform to a third orientation based on a drive path and the one or more task locations;
determine a crossover point of the first laser rangefinder and the second laser rangefinder within movement of the mobility platform to the third orientation;
acquire the first passive landmark with the second laser rangefinder at the crossover point; and
acquire the second passive landmark with the first laser rangefinder at the crossover point.

10. The mobility platform of claim 1, wherein the at least one processor is further configured to:
detect a discontinuity in the first distance measured by the first laser rangefinder; and
upon detecting the discontinuity in the first distance measured by the first laser rangefinder:
reacquire the first passive landmark with the first laser rangefinder; and/or
acquire a third passive landmark disposed in the worksite at a third known landmark position with the first laser rangefinder.

11. The mobility platform of claim 10, wherein the discontinuity in the first distance measured by the first laser rangefinder is a change in the measured first distance above a range change threshold.

12. The mobility platform of claim 1, wherein the at least one processor is further configured to:
acquire a third passive landmark disposed at a third unknown landmark position with the first laser rangefinder; and
determine the third unknown landmark position based on:
the first position of the chassis,
a third distance measured by the first laser rangefinder between the first location and the third unknown landmark position, and
yaw angle information from the first laser rangefinder.

13. A method for operating a mobility platform in a worksite, the mobility platform comprising a chassis, a first laser rangefinder disposed at a first location on the chassis, a second laser rangefinder disposed at a second location on the chassis, a drive system that includes at least two wheels, and a plurality of wheel odometers that are each associated with a respective wheel of the at least two wheels and configured to measure a distance traveled by the respective wheel, the method comprising:
acquiring a first passive landmark disposed at a first known landmark position with the first laser rangefinder;
acquiring a second passive landmark disposed at a second known landmark position with the second laser rangefinder;
determining a first position of the chassis based on:
a first distance measured by the first laser rangefinder between the first location and the first known landmark position, and
a second distance measured by the second laser rangefinder between the second location and the second known landmark position,
determining a first orientation of the mobility platform based on first yaw angle information from at least one of the first laser rangefinder and the second laser rangefinder; and
estimating a change in position of the chassis from the first position based on odometry information from the plurality of wheel odometers.

14. The method of claim 13, wherein acquiring the first passive landmark comprises:
sweeping the worksite with the first laser rangefinder to collect first sweep information;
detecting the first known landmark position of the first passive landmark based on the first sweep information; and
orienting the first laser rangefinder toward the first passive landmark based on the first known landmark position.

15. The method of claim 14, wherein detecting the first known landmark position of the first passive landmark comprises:
detecting a shape of the first passive landmark; and/or
detecting a color of the first passive landmark.

16. The method of claim 13, wherein acquiring the first passive landmark comprises:
identifying the first known landmark position of the first passive landmark with at least one camera of the mobility platform; and
orienting the first laser rangefinder toward the first passive landmark based on the first known landmark position.

17. The method of claim 13, further comprising, based on information from at least one camera and/or from the plurality of odometers:
tracking the first passive landmark with the first laser rangefinder; and
tracking the second passive landmark with the second laser rangefinder.

18. The method of claim 13, further comprising stopping the mobility platform at one or more task locations in the worksite, and, upon stopping the mobility platform:
reacquiring the first passive landmark with the first laser rangefinder;
reacquiring the second passive landmark with the second laser rangefinder;
determining a second position of the chassis based on:
the first distance measured by the first laser rangefinder between the first location and the first known landmark position, and
the second distance measured by the second laser rangefinder between the second location and the second known landmark position, and
determining a second orientation of the mobility platform based on second yaw angle information from at least one of the first laser rangefinder and the second laser rangefinder.

19. The method of claim 13, further comprising:
detecting a discontinuity in the first distance measured by the first laser rangefinder; and
upon detecting the discontinuity in the first distance measured by the first laser rangefinder:
reacquiring the first passive landmark with the first laser rangefinder; and/or
acquiring a third passive landmark disposed in the worksite at a third known landmark position with the first laser rangefinder.

20. A non-transitory computer-readable storage medium storing instructions that, when executed by at least one processor, cause the at least one processor to perform a method for operating a mobility platform in a worksite, the mobility platform comprising a chassis, a first laser rangefinder disposed at a first location on the chassis, a second laser rangefinder disposed at a second location on the chassis, a drive system that includes at least two wheels, and a plurality of wheel odometers that are each associated with a respective wheel of the at least two wheels and configured to measure a distance traveled by the respective wheel, the method comprising:
- acquiring a first passive landmark disposed at a first known landmark position with the first laser rangefinder;
- acquiring a second passive landmark disposed at a second known landmark position with the second laser rangefinder;
- determining a first position of the chassis based on:
  - a first distance measured by the first laser rangefinder between the first location and the first known landmark position, and
  - a second distance measured by the second laser rangefinder between the second location and the second known landmark position,
- determining a first orientation of the mobility platform based on first yaw angle information from at least one of the first laser rangefinder and the second laser rangefinder; and
- determining a change in position of the chassis from the first position based on odometry information from the plurality of wheel odometers.

* * * * *